(12) United States Patent
Yamaguchi et al.

(10) Patent No.: US 7,923,883 B2
(45) Date of Patent: Apr. 12, 2011

(54) STATOR

(75) Inventors: Kazuyuki Yamaguchi, Kariya (JP); Kenji Endo, Kariya (JP); Yoshio Kato, Komaki (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 181 days.

(21) Appl. No.: 12/150,059

(22) Filed: Apr. 23, 2008

(65) Prior Publication Data
US 2008/0258570 A1      Oct. 23, 2008

(30) Foreign Application Priority Data

Apr. 23, 2007   (JP) ................................. 2007-112582

(51) Int. Cl.
  *H02K 1/00*      (2006.01)
(52) U.S. Cl. ...................................................... 310/179
(58) Field of Classification Search ................... 310/179, 310/184, 197, 198, 206, 207
See application file for complete search history.

(56) References Cited

U.S. PATENT DOCUMENTS

| | | | | |
|---|---|---|---|---|
| 3,942,055 A | * | 3/1976 | Hoffmeyer | 310/216.111 |
| 4,241,274 A | * | 12/1980 | Brammerlo | 310/216.071 |
| 4,780,636 A | * | 10/1988 | Gandhi et al. | 310/49.23 |
| 4,801,832 A | * | 1/1989 | Neumann | 310/216.111 |
| 5,336,956 A | * | 8/1994 | Haner | 310/179 |
| 5,747,910 A | * | 5/1998 | Haner | 310/180 |
| 5,915,643 A | * | 6/1999 | Dolgas | 242/433 |
| 7,170,211 B2 | * | 1/2007 | Chen et al. | 310/207 |

FOREIGN PATENT DOCUMENTS

| | | |
|---|---|---|
| JP | 56-041736 | 4/1981 |
| JP | 10-028346 | 1/1998 |

* cited by examiner

*Primary Examiner* — Dang D Le
(74) *Attorney, Agent, or Firm* — Locke Lord Bissell & Liddell LLP

(57) ABSTRACT

The present invention provides a stator coiled in a spiral, capable of mechanically inserting a wound coil in the slot of a stator core. In a stator in which coils are overlapped in a spiral when viewed from the end surface of the stator core after each of one sides of a plurality of coils wound in advance is inserted in the slot of the stator core and each of the other sides of the plurality of coils is inserted in a different slot, by repeating the inserting operation twice or more, the loop of the coils overlapped in a spiral are piled in two layers or more in the radius direction of the stator core and the total coil sectional area inserted in the slots of the stator core is larger than a prescribed value based on the inside radius of the stator core.

7 Claims, 62 Drawing Sheets

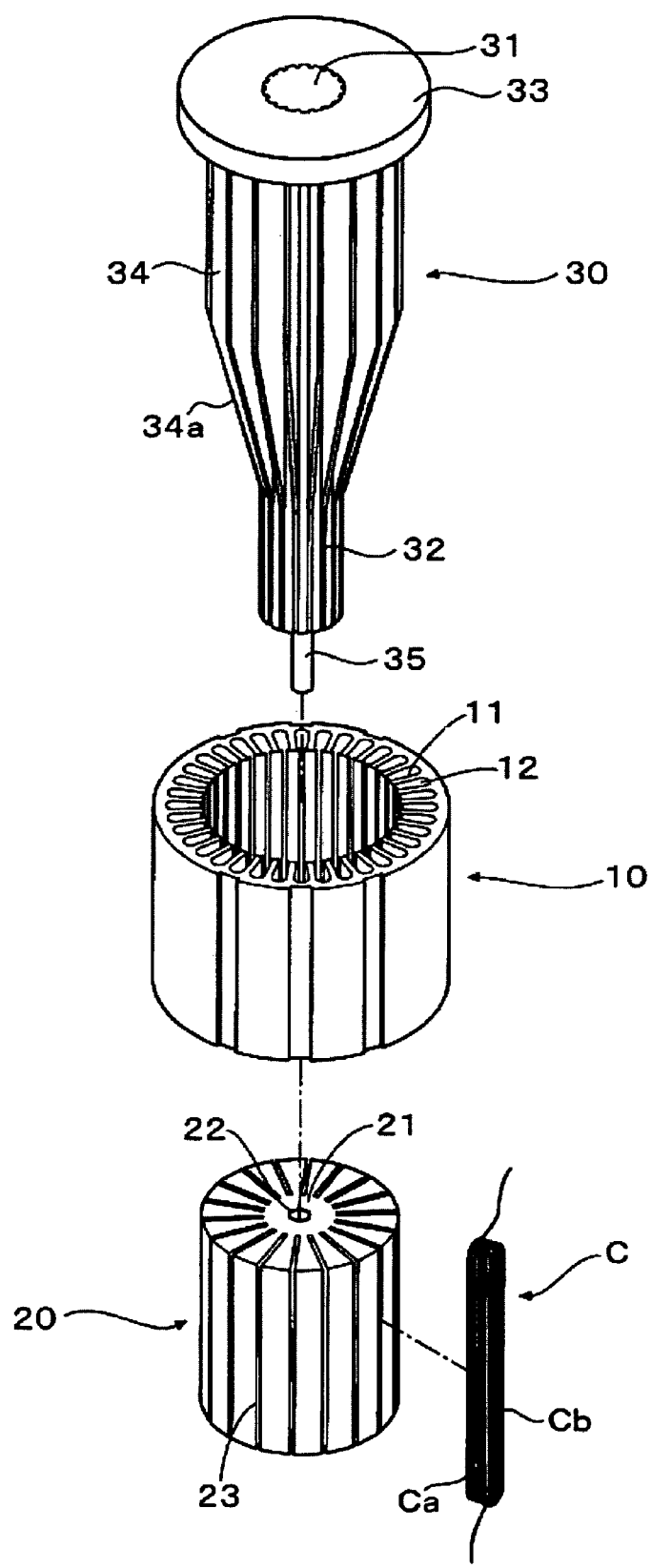
F I G. 1

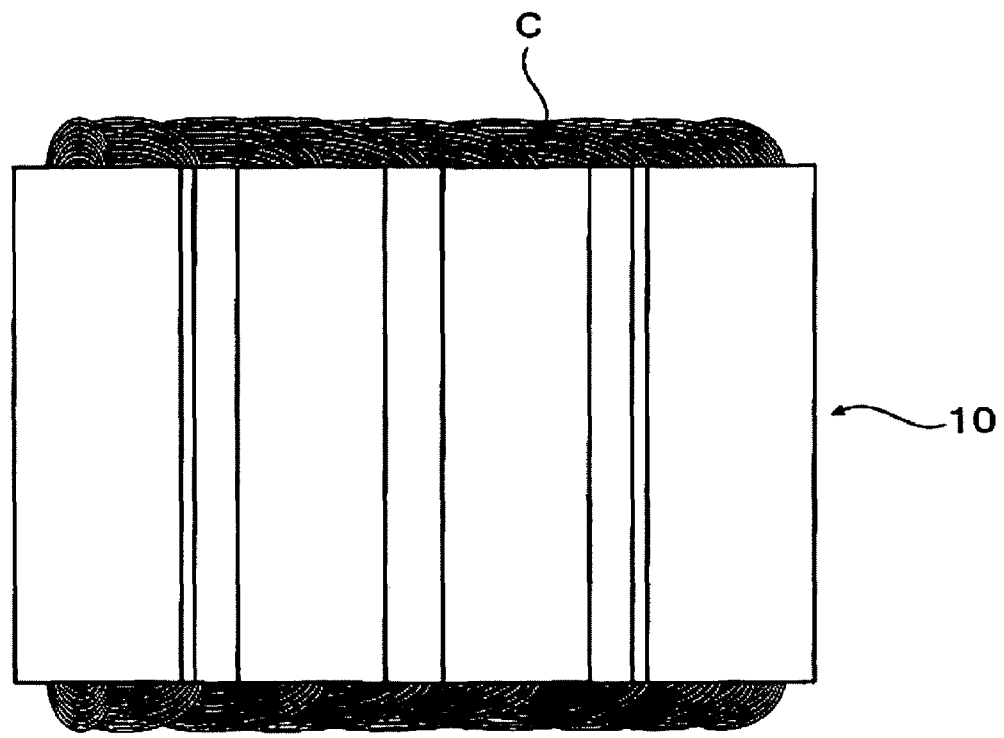
F I G. 1 6

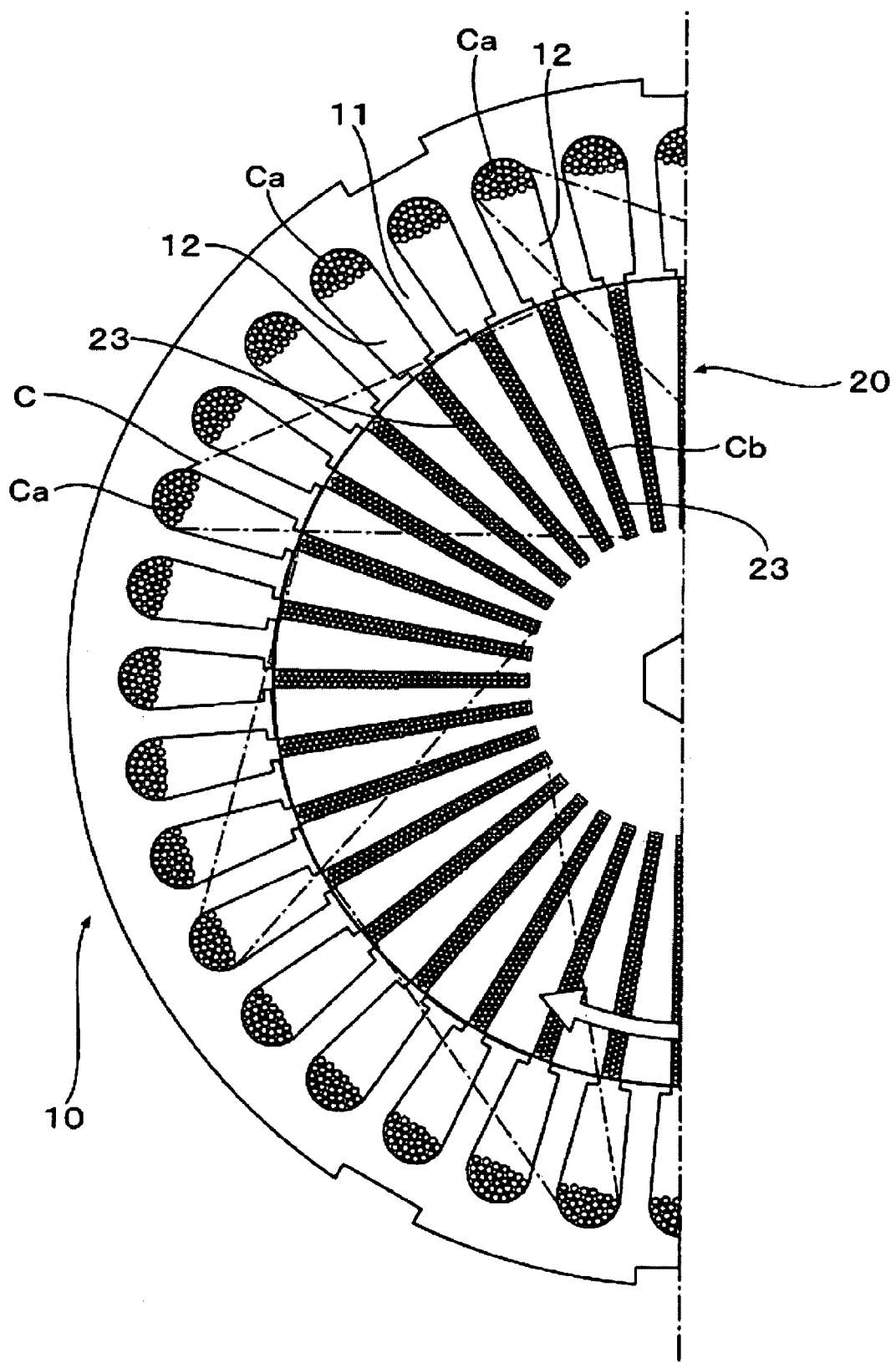
F I G. 19

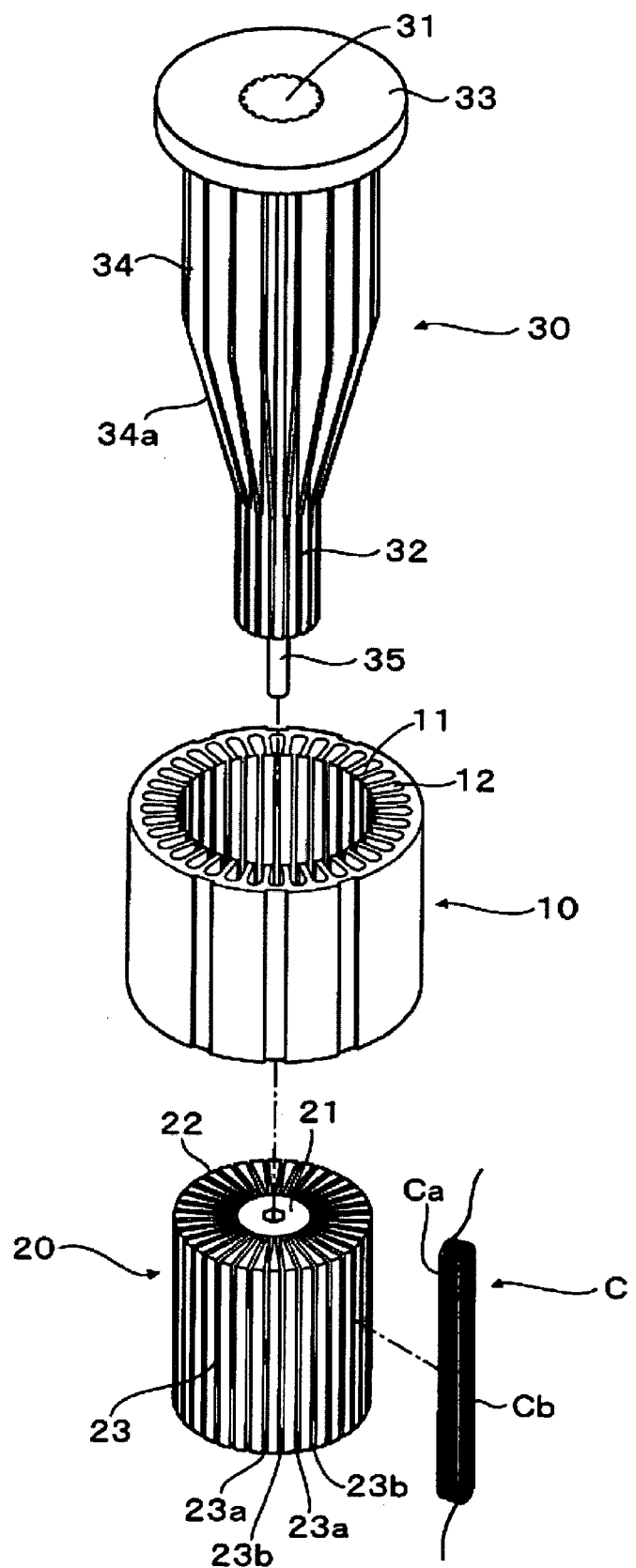
F I G. 2 3

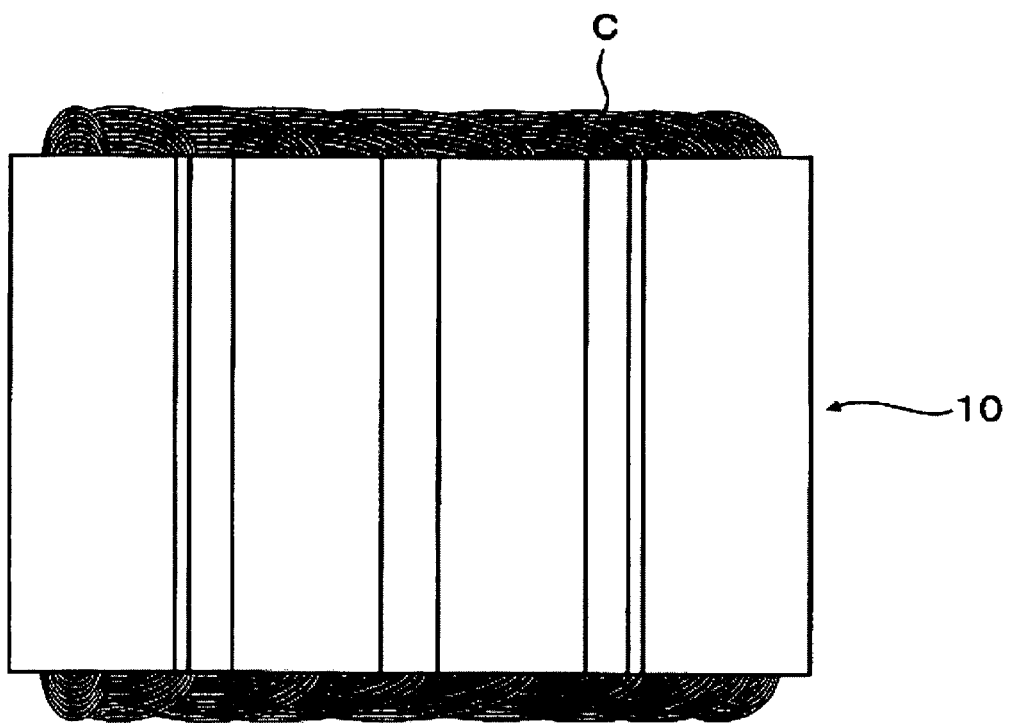
F I G. 3 4

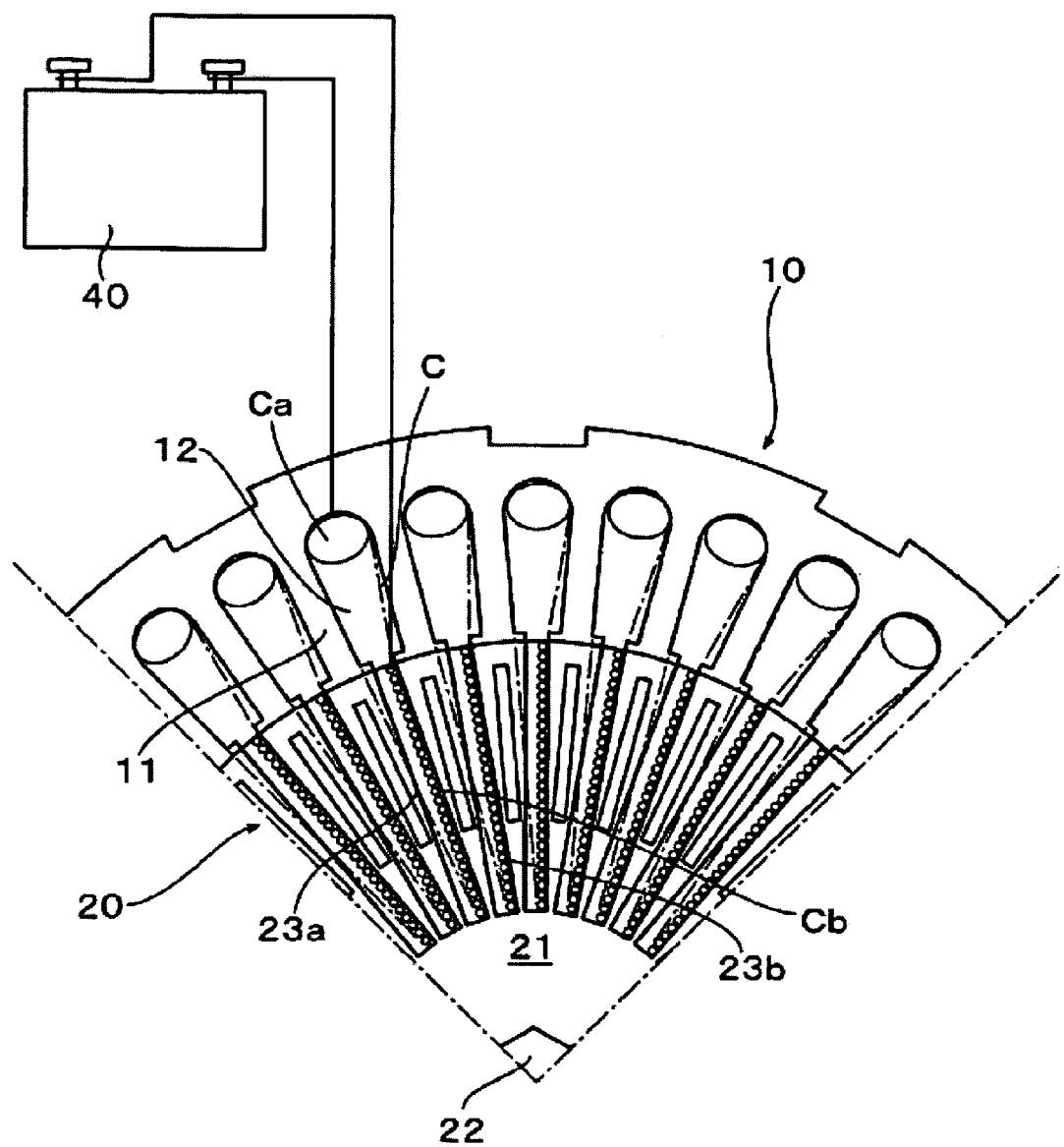
F I G. 5 2

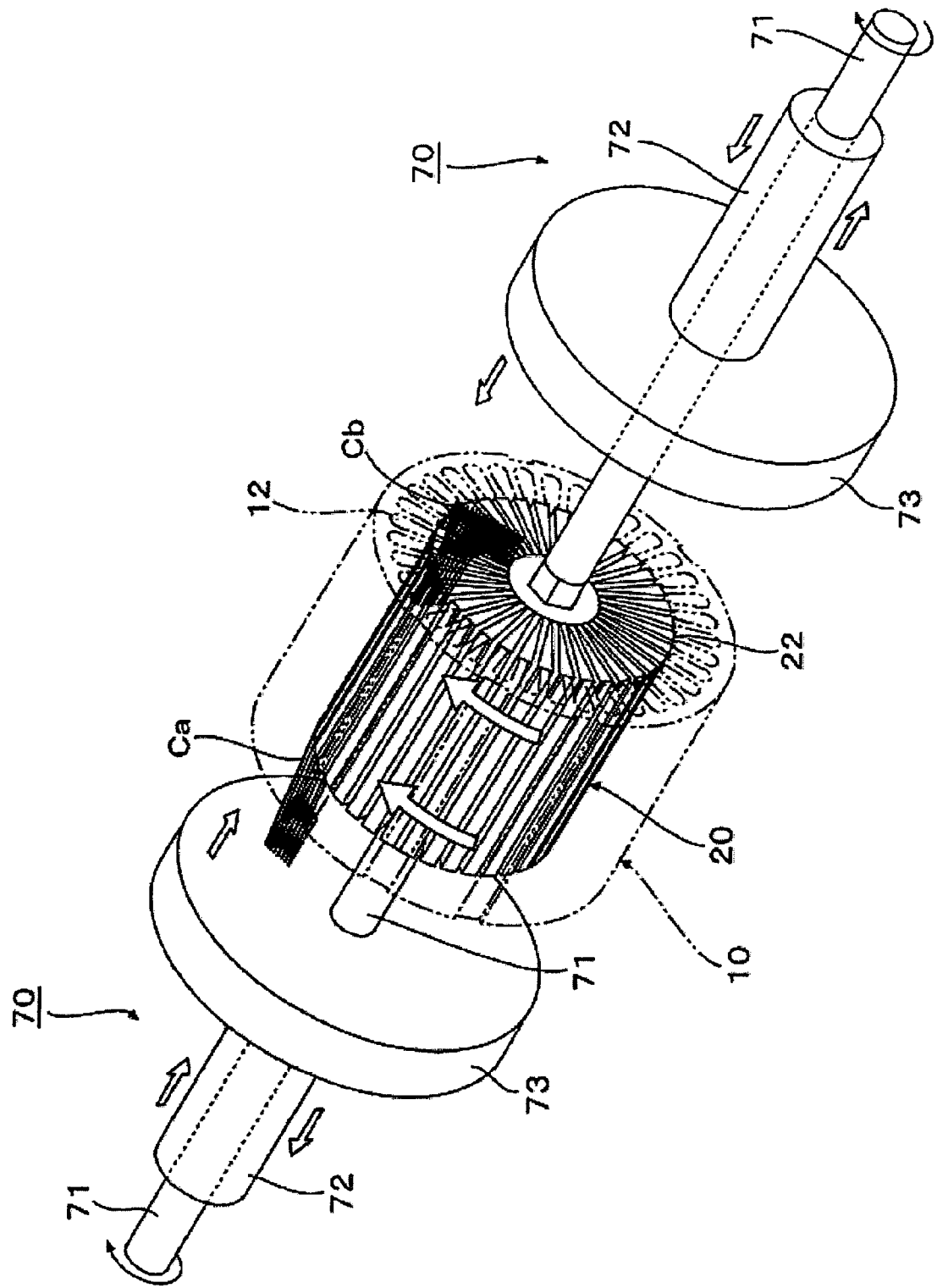
F I G. 57

(A)
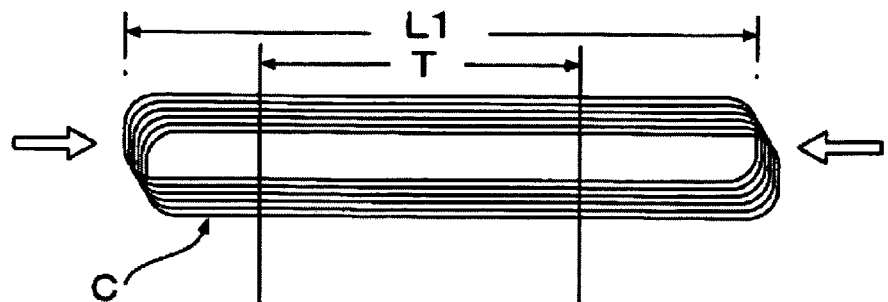
(B)
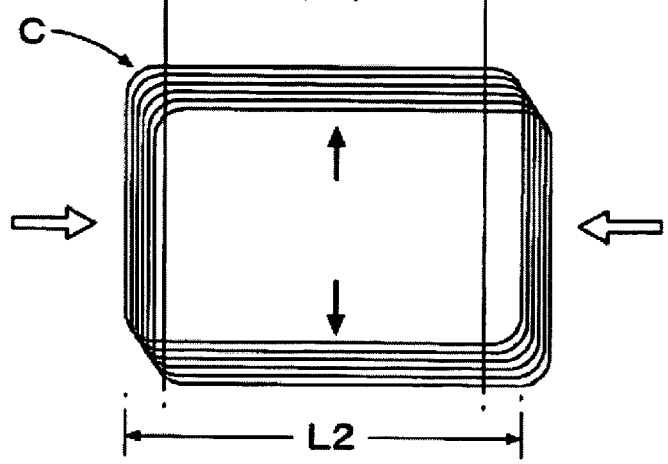
FIG. 58

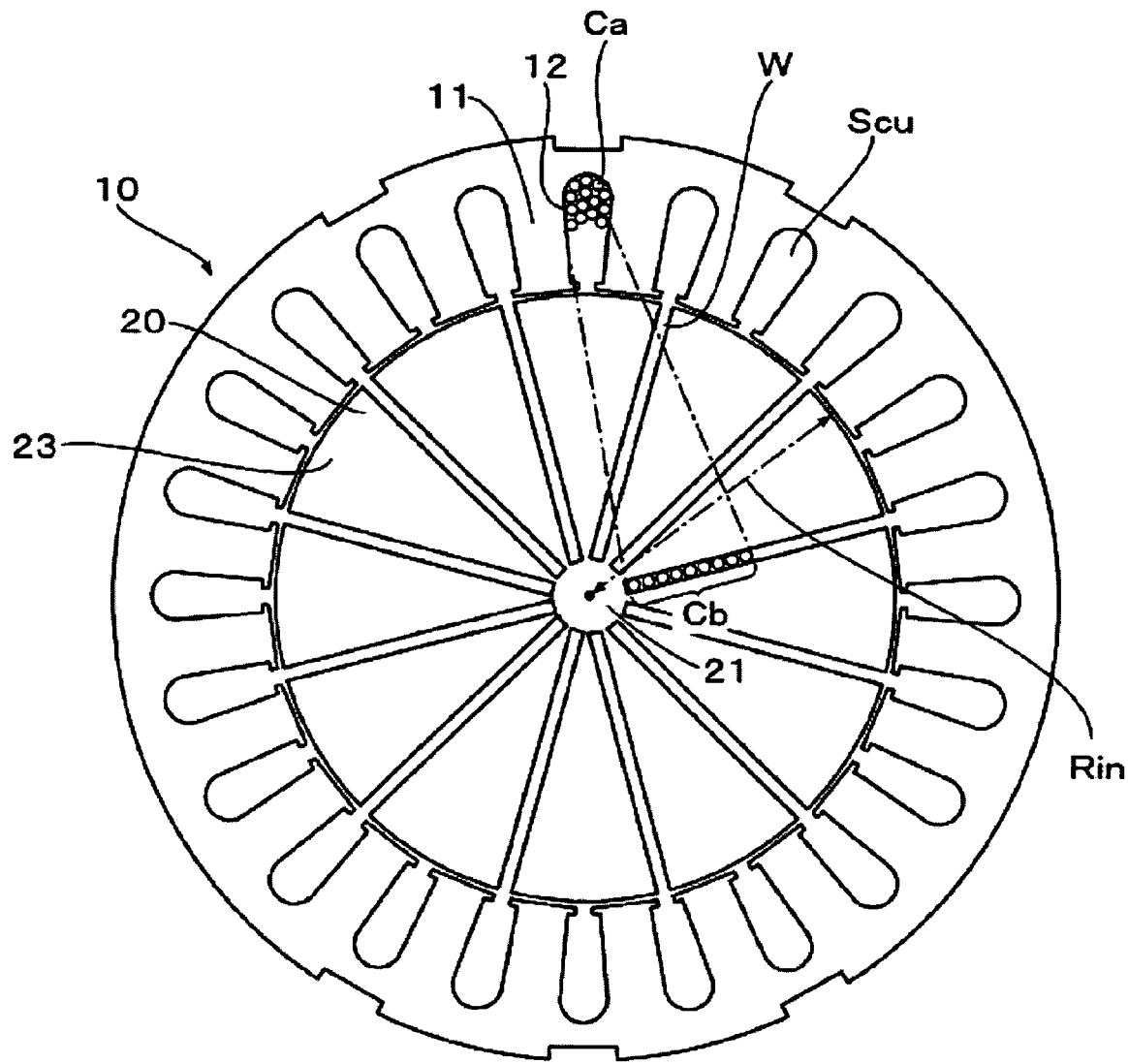
F I G. 6 1

STATOR

BACKGROUND OF THE INVENTION

1. Field of the Invention

The present invention relates to a stator in which one side of each of a plurality of coils wound in advance is inserted in the slot of its core and then the other side of each of the plurality of coils is inserted in another slot and the coils overlap each other in a spiral when viewed from the end surface of the stator core.

2. Description of the Related Art

As the manufacturing method of a stator with a wound coil, a direct winding method of winding in series a coil wound around the inner teeth of the stator core and a coil insertion method of inserting a coil wounded in advance in the slot of the stator core are mainly known.

However, since these methods can form only a coil in which each magnetic pole is concentrically wound, a motor using such a stator core causes torque unevenness due to a phenomenon that the magnetic force generation density in a running direction becomes uneven. Since this torque unevenness makes the motor vibrate or cause noise, various methods are proposed in order to solve this problem.

As a motor whose torque unevenness is remarkably reduced, a motor using a stator in which after one side of each of a plurality of coils wound in advance is inserted in the slot of its core, the other side of each of the plurality of coils is inserted in another slot and when viewed from the end surface of the stator core the coils overlap each other in a spiral (hereinafter called "spirally coiled stator") is known.

The stator obtained thus has a short coil end and a fairly uniform compact height. Simultaneously, since its torque unevenness is small when used for a motor, the vibration and noise of the motor can be reduced.

However, in the above-described spirally coiled stator, each of both sides of a coil must be inserted in a slot while overlapping it on another coil and it is difficult to mechanize the work. Therefore, since a coil wound in advance must be manually inserted in the slot of the stator core, its manufacturing workability is low and its manufacturing costs becomes high.

As the technology concerning the above-described spirally coiled stator, Patent Document 1 of Japanese Patent Application Publication No. S56-41736 discloses the manufacturing method of a multiphase armature coil featured by consecutively winding so as to accommodate a plurality of adjacent pole same-phase coils in every another slot using a two-layered multiphase armature coil having less than one of slot per each pole per phase and then performing the same two-layer winding using the remaining slots (see FIG. 4 of the Patent Application Publication No. S56-41736).

Patent Document 2 of Japanese Patent Application Publication No. H10-28346 discloses a brushless DC motor in which two-step winding is applied to the inner teeth of one slot of a stator and one-step winding is applied to every another slot (see FIG. 1 of the Patent Application Publication No. H10-28346).

However, the above-described Patent Documents 1 and 2 do not disclose a method for mechanizing the work of inserting a wound coil in the slot of the stator core. Therefore, the coil must be manually inserted, a motor cannot be manufactured industrially in low costs and in high coil occupancy.

SUMMARY OF THE INVENTION

It is an object of the present invention to provide a spirally wound stator which achieves the mechanization of the work of inserting a wound coil in the slot of a stator core and a high market share.

In order to attain the object, the present invention provides a stator in which one side of each of a plurality of coils wound in advance is inserted in the slot of its core and then the other side of each of the plurality of coils is inserted in another slot and when viewed from the end surface of the stator core, the coils overlap each other in a spiral, and also the loop of coils overlapped in the spiral shape is piled in two ore more layers in the radius direction of its core and the total cross areas of coils inserted in the slot of the stator core is larger than a value predetermined on the basis of the inside radius of the stator core.

In the stator of the present invention, the work of inserting a wound coil in the slot of its core can be mechanized. When it is used for a motor, its torque unevenness is small and the vibration and noise of the motor can be reduced. Simultaneously, its coil end is short, its height is fairly uniform and compact and also the coil occupancy in the slot is high.

One preferred aspect of the present invention is to provide a stator which satisfies the following expression (1) when the total coil areas inserted in the slot of the stator core, the inside radius of the stator core, the number of slots and the diameter of a coil wire are Scu, Rin, Slot and d, respectively.

$$Scu > Rin \cdot d - Slot \cdot d^2 / 4\pi \qquad (1)$$

Another preferred aspect of the present invention is to provide a stator which satisfies the following expression (2) when the total coil areas inserted in the slot of the stator core, the inside radius of the stator core, the number of slots and the diameter of a coil wire are Scu, Rin, Slot and d, respectively.

$$Scu > 2 \cdot Rin \cdot d - Slot \cdot d^2 / \pi \qquad (2)$$

Another preferred aspect of the present invention is to provide a stator which satisfies the following expression (3) when the total coil areas inserted in the slot of the stator core, the inside radius of the stator core, the number of slots and the diameter of a coil wire are Scu, Rin, Slot and d, respectively.

$$Scu > Rin \cdot d - Slot \cdot d^2 / 2\pi \qquad (3)$$

Another preferred aspect of the present invention is to provide a stator which satisfies the following expression (4) when the total coil areas inserted in the slot of the stator core, the inside radius of the stator core, the number of slots and the diameter of a coil wire are Scu, Rin, Slot and d, respectively.

$$Scu > 2 \cdot Rin \cdot d - 2 \cdot Slot \cdot d^2 / \pi \qquad (4)$$

Another preferred aspect of the present invention is to provide a stator which satisfies the following expression (5) when the total coil areas inserted in the slot of the stator core, the inside radius of the stator core, the number of slots and the diameter of a coil wire are Scu, Rin, Slot and d, respectively.

$$Scu > Rin \cdot d - Slot \cdot d^2 / 8\pi \qquad (5)$$

In the stators which satisfy the above-described expressions (1)~(5), the work of inserting a wound coil in the slot of the stator core can be mechanized.

Another preferred aspect of the present invention provide a stator in the one-layer loop between coils overlapped in the above-described spiral of which one side of each coil constituting the one-layer loop is inserted in each slot.

According to the above-described aspects, since in the one-layer loop between coils overlapped in the above-described spiral, one side of each coil constituting the one-layer loop is inserted in each slot, when the loop between coils overlapped in the above-described spiral is overlapped in two or more layers, the overlap between coils in its radius direction becomes more uniform and their coil ends becomes more uniform and compact. Therefore, the coil occupancy ratio in the slot can be made higher and the coil end becomes shorter to obtain a higher-performance stator.

According to the present invention, the work of inserting a wound coil in the slot of a stator core can be mechanized. When it is used for a motor, its torque unevenness is small and the vibration and noise of the motor can be reduced. Furthermore, a stator in which the coil end is short, the coil height is fairly uniform and compact and also the coil occupancy ratio in the slot is high can be provided.

BRIEF DESCRIPTION OF THE DRAWINGS

FIG. 1 is the perspective view of one example of a manufacturing device for manufacturing the stator according to the present invention.

FIG. 16 is the side view of the stator core.

FIG. 19 shows a state where the jig is rotated by a prescribed angle against the stator core in the preferred embodiment.

FIG. 23 is the perspective view of another preferred embodiment of the manufacturing device for manufacturing the stator according to the present invention.

FIG. 34 is the side view of the stator.

FIG. 52 is a partially enlarged top view showing a state where one side of the coil is inserted in the slot in the preferred embodiment.

FIG. 57 shows a rotation assisting jig usable in each of the above-described preferred embodiments.

FIG. 58 shows states before and after pressing the coil end by the rotation assisting jig.

FIG. 61 shows a state where the holding groove is rotated and positioned in a prescribed slot by rotating the jig in the preferred embodiment.

DESCRIPTION OF THE PREFERRED EMBODIMENTS

The preferred embodiments of the present invention are described below with reference to the drawings.

Figure 2:
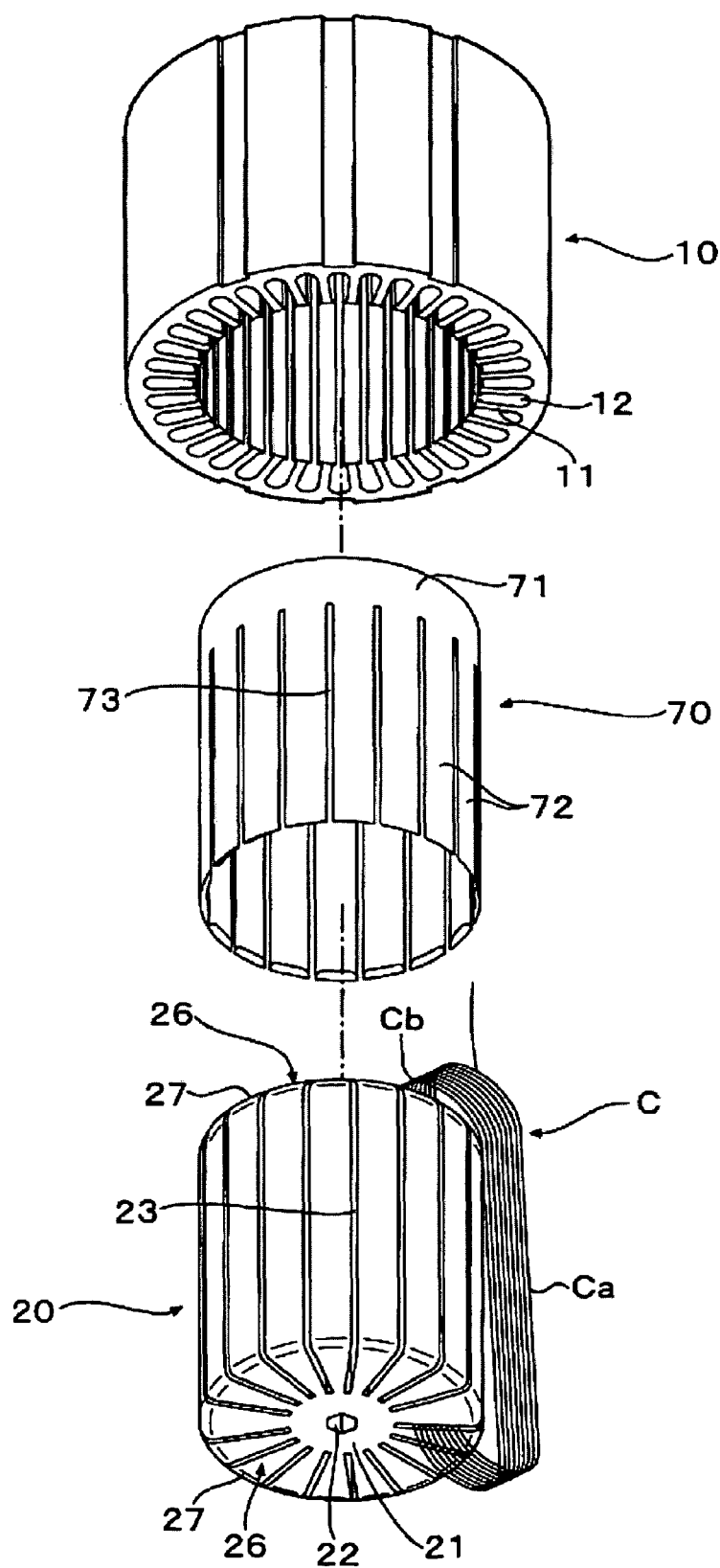
FIG. 2 is a perspective view showing a relationship between a jig, an auxiliary member, and stator core in the manufacturing device.

FIGS. 1 and 2 show one example of the device for manufacturing the stator of the present invention.

In FIGS. 1 and 2, a reference numeral 10 is a stator core and the stator core 10 comprises inner teeth 11 in its inner perimeter. Then, a slot 12 is formed between the inner teeth 11.

This manufacturing device comprises a jig 20 almost cylindrical as a whole, which is inserted in the inner perimeter of the stator core 10. The jig 20 comprises a shaft unit 21 at the center, a hole 22 provided at the center of the top end surface of this shaft unit 21 and a plurality of holding grooves 23 radiantly formed from the outer perimeter of the shaft unit 21 toward the cylindrical outer perimeter of the shaft unit 21.

The holding grooves 23 are formed with a pitch integer times as that of the slot 12 of the stator core 10. Although in the case of this example, the holding grooves 23 are formed with pitch double the pitch of the slot 12 of the stator core 10 and half the number of the slots 12 of the holding grooves 23 are formed. In this example, the holding grooves 23 are radiantly formed from the outer perimeter of the shaft unit 21 of the jig 20 toward the radius direction, the holding grooves 23 can be also, for example, in a curve, such as a spiral and the like and formed in inclination against the radial direction. In this case, the number of coil sides that can be accommodated in the holding grooves can be increased.

One side Ca of a coil C is projected from the jig 20 and the other side Cb is inserted in the holding groove 23 of the jig 20. Then, the coil C is arrayed along the perimeter of the jig 20. Especially, as shown in FIG. 2, the jig 20 comprises an end edge 27 which is rounded in an R shape between its perimeter surface and its end surface 26. The end surface means the surface of the end in an inserting direction of the jig 20 in an inserting direction in the case of inserting the jig 20 in the inner perimeter of the stator core 10 and the end edge means around a square positioned between the perimeter surface and an end surface as described above.

An auxiliary member 70 is disposed on one end surface of the jig 20. The auxiliary member 70 forms a cylinder as a whole and comprises a base 71 and a plurality of plate-shaped blades 72 extending in the shaft direction at prescribed intervals along the perimeter direction from the base 71. Then, a slit-shaped space 73 is formed between the blades 72. The auxiliary member 70 is provided in such a way that the isolated end of the blade 72 may touches one end surface of the jig 20. At this moment, one side Ca of the coil C held by the jig 20 in the above-described aspects is inserted in each piece of corresponding space 73 of the blade 72 and one side Ca is set in a state projected on the outer radius side.

The outer perimeter of the blade 72 of the auxiliary member 70 touches the inner perimeter of the inner teeth 11 of the stator core 10, is rotated and positioned in such a way that the space 73 may be positioned in a place corresponding to the slot 12 of the stator core 10 and is inserted in the stator core 10.

Back to FIG. 1 again, this manufacturing device comprises a pressing jig 30 as a pushing means for pressing the other side Cb of the coil C inserted in and held by the holding groove 23 of the jig 20 to a corresponding slot 12 of the stator core 10. This pressing jig 30 comprises a shaft 31 at the center. A guide groove 32 is formed at prescribed intervals in the perimeter direction along the shaft 31. The radius of the bottom shaft end 35 of the shaft 31 is shortened and is inserted in the hole 22 of the jig 20.

A ring 33 is mounted on the outer perimeter of the shaft 31 in a state capable of vertically sliding. The ring 33 comprises inner teeth fitted in the guide groove 32 of the shaft 31 in its inner perimeter. A plurality of plate-shaped pushers 34 is mounted on the bottom surface of the ring 33. Each pusher 34 is fitted in the corresponding guide groove 31 of the shaft 31 and mounted radiantly against the shaft 31. The pusher 34 comprises a taper 34a which gradually becomes narrow toward the shaft 31, in the lower section. In the case of this preferred embodiment, the guide groove 32 of the shaft 31 and the pusher 34 are formed in such a number and a pitch as to be placed in every another slot 12 of the stator core 10.

FIGS. 3~15 show an example of manufacturing a stator according to one preferred embodiment of the present invention using the above-described manufacturing device.

As described earlier, the other side Cb of the coil C is inserted in the holding groove 23 of the jig 20 and a plurality of coils C is arrayed along the perimeter of the jig 20 in advance. In this state, the auxiliary member 70 is installed on the end surface of the jig 20 while inserting the coil C each piece of space 73 of each blade 72 of the auxiliary member 70. The coil C is held in a state where one side Ca is projected from the jig 20 and the auxiliary member 70.

Figure 4:
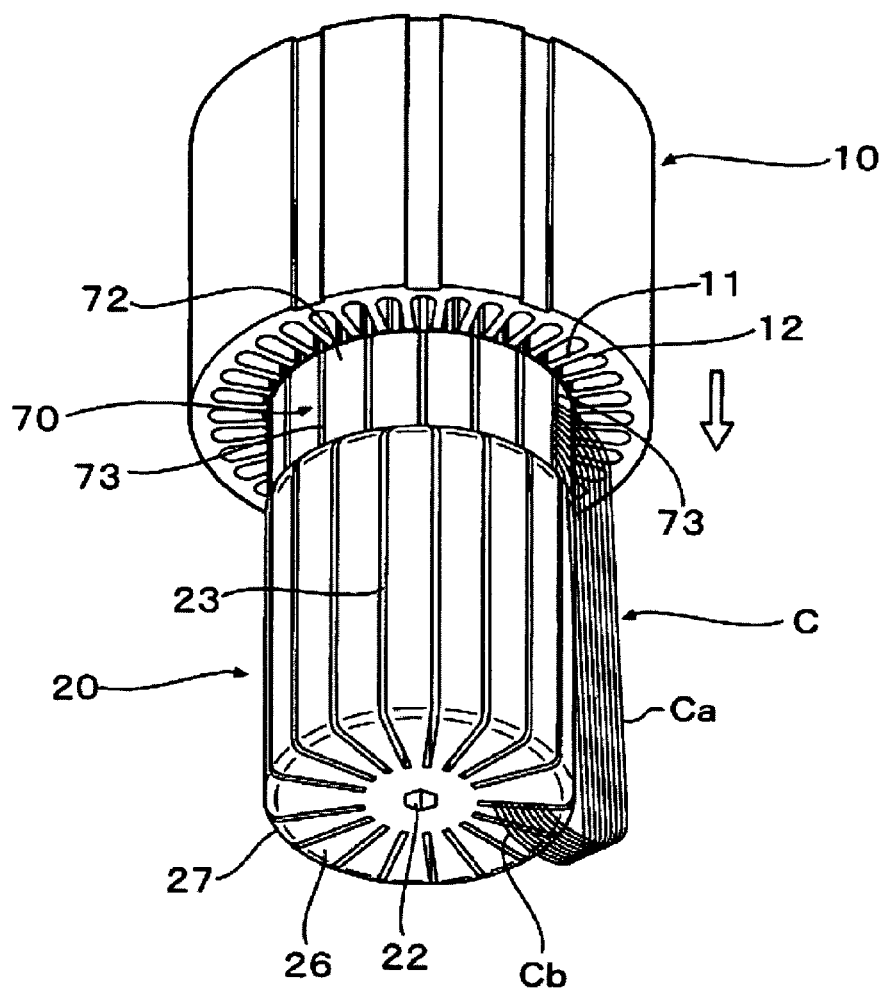
FIG. 4 is a perspective view showing a state where the jig is inserted in the inner perimeter of the stator core from the auxiliary member side in the preferred embodiment.

In this state, the jig 20 is started to insert in the inner perimeter of the stator core 10 from the auxiliary member 70 side. At this moment, as shown in FIG. 4, the blade 72 touches the inner perimeter of the inner teeth 11 of the stator core 10 and is rotated and positioned in such a way that the space 73 of the blade 72 may be positioned in relation to the slot 12 of the stator core 10. The space 73 of the blade 72 is positioned between the holding grooves 23 of the jig 20 and one side Ca of the coil C, projected from the space 73 is disposed in such a way as to run on the end edge 27 of the jig 20.

Figure 5:
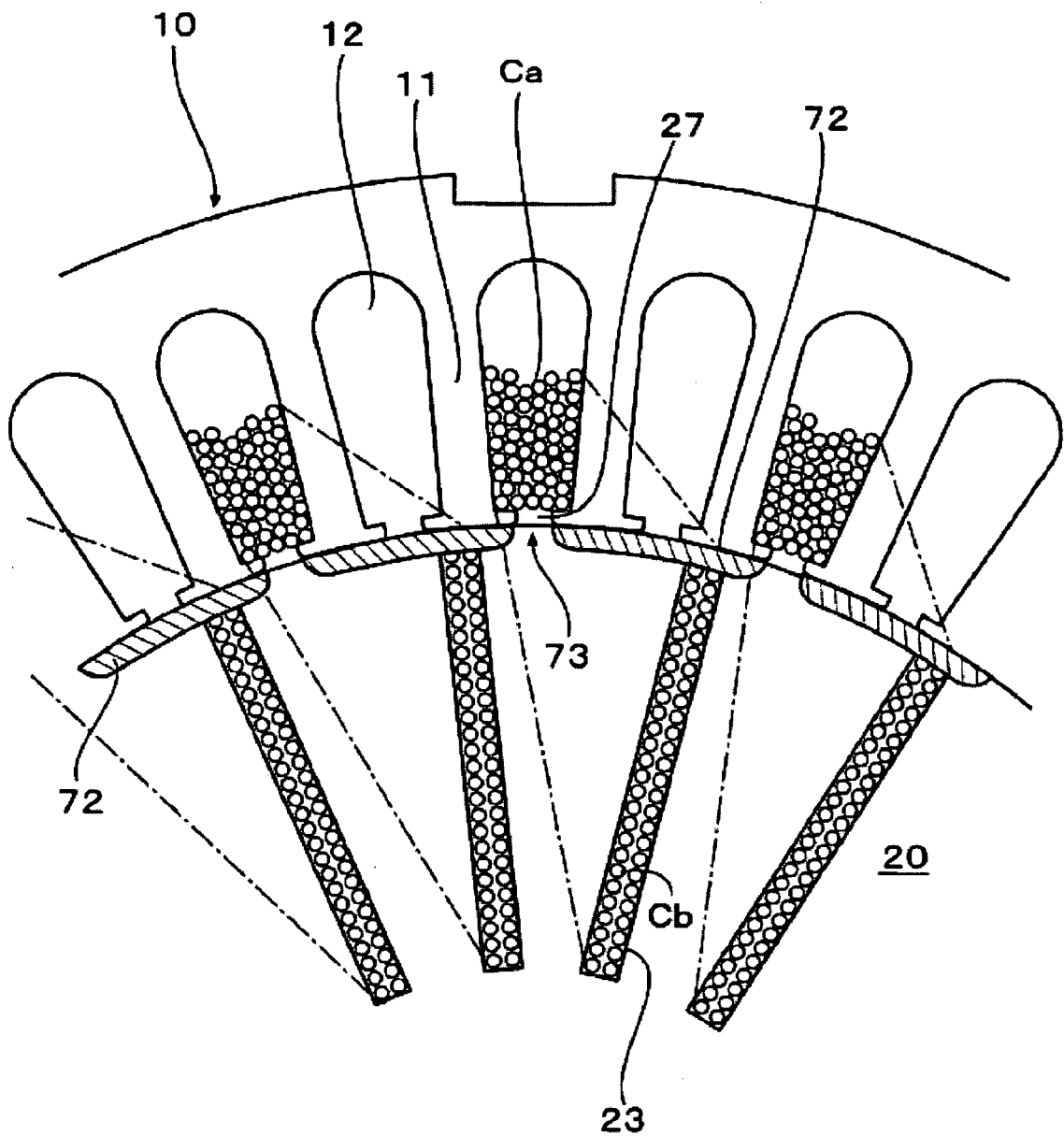
FIG. 5 is a partially enlarged cross section view showing a state where the jig is inserted in the inner perimeter of the stator core in the preferred embodiment.
Figure 6:
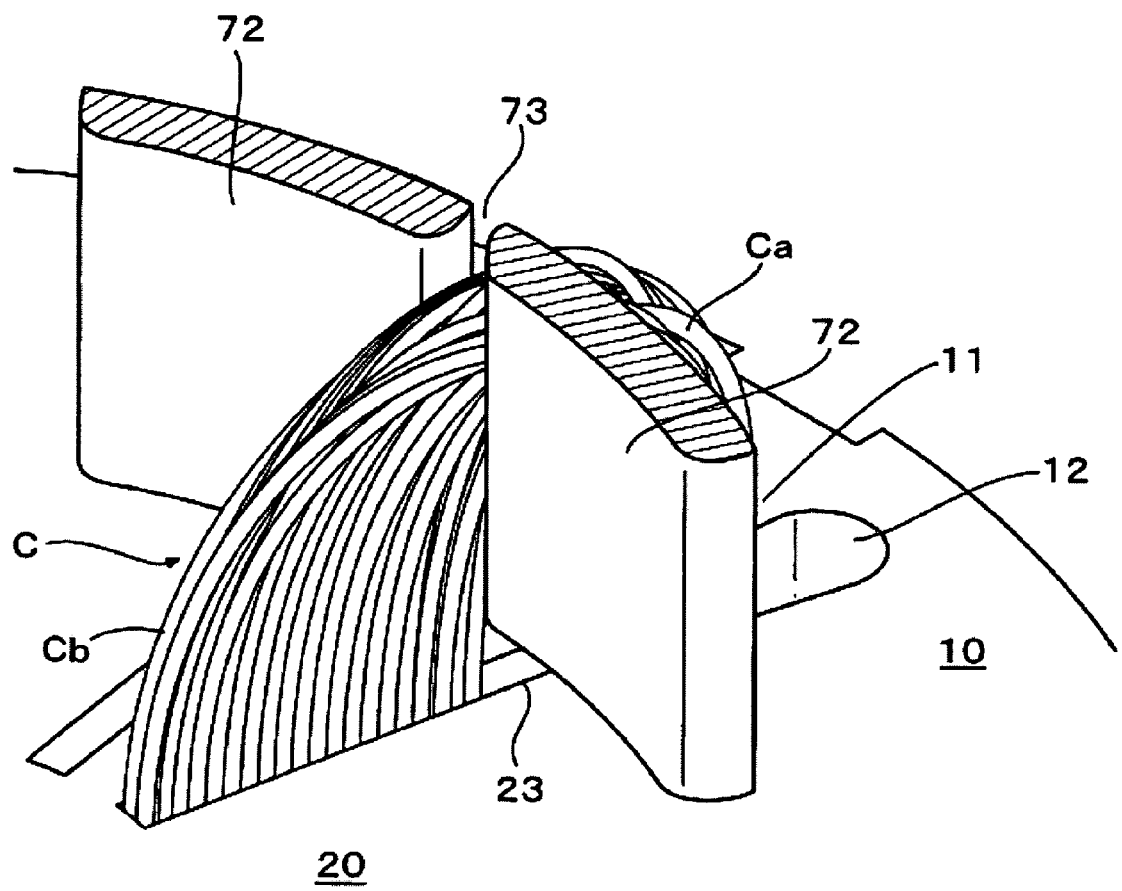
FIG. 6 is a partially enlarged cross section view showing a state where one side of a coil is inserted in the slot of the stator core through space between the blades of the auxiliary member in the preferred embodiment.

When the jig 20 is continued to insert in the inner perimeter of the stator core 10 from the auxiliary member 70 side thus, as shown in FIGS. 5 and 6, one side Ca of the coil C is pressed into the slot 12 of the stator core 10 by the end edge 27 of the jig 20 using the space 73 between blades 72 as a guide. At this moment, since both sides of the blade 72 form a semi-cylindrical R shape in such a way that the space 73 may expand on the inside radius side and the end edge 27 of the jig 20 is also rounded in an R shape, the coil C is smoothly inserted in the slot 12 without being damaged. By forming an angle in such a way that the holding groove 23 may not match the slot 12 when touching the blade 72 on the inner perimeter of the inner teeth of the stator core 10, the other side Cb of the coil C in the holding groove 23 can be prevented from being inserted in the slot 12 when inserting the jig 20 in the inner perimeter of the stator core 10.

Figure 7:
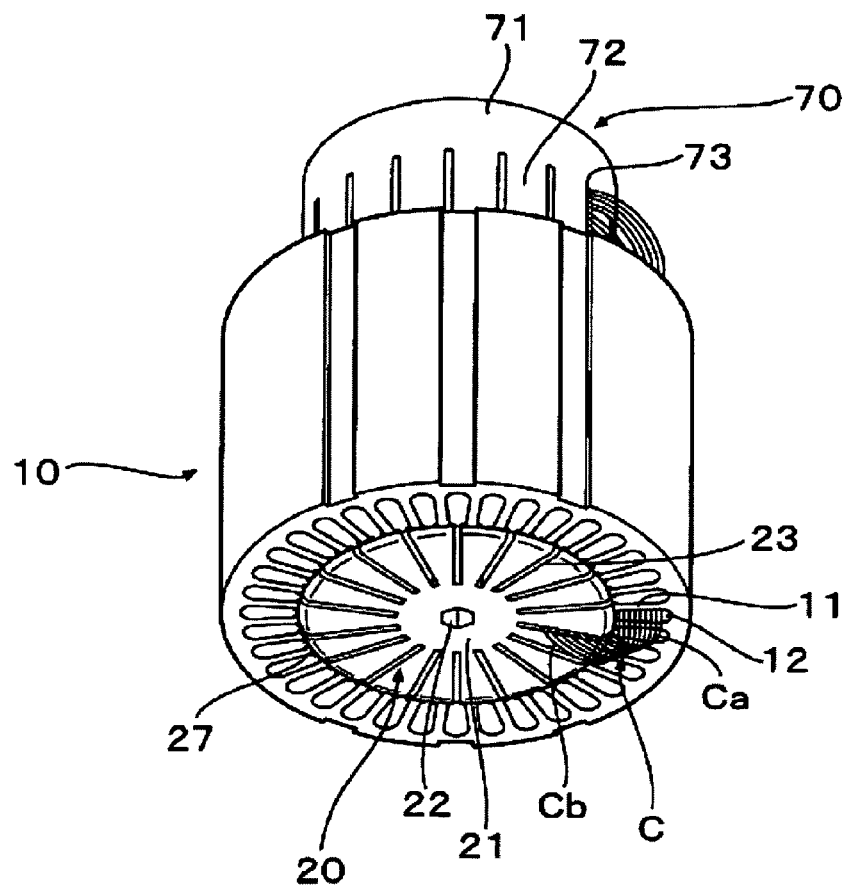
FIG. 7 is a perspective base view showing a state where the jig is inserted in the inner perimeter of the stator core in the preferred embodiment.
Figure 8:
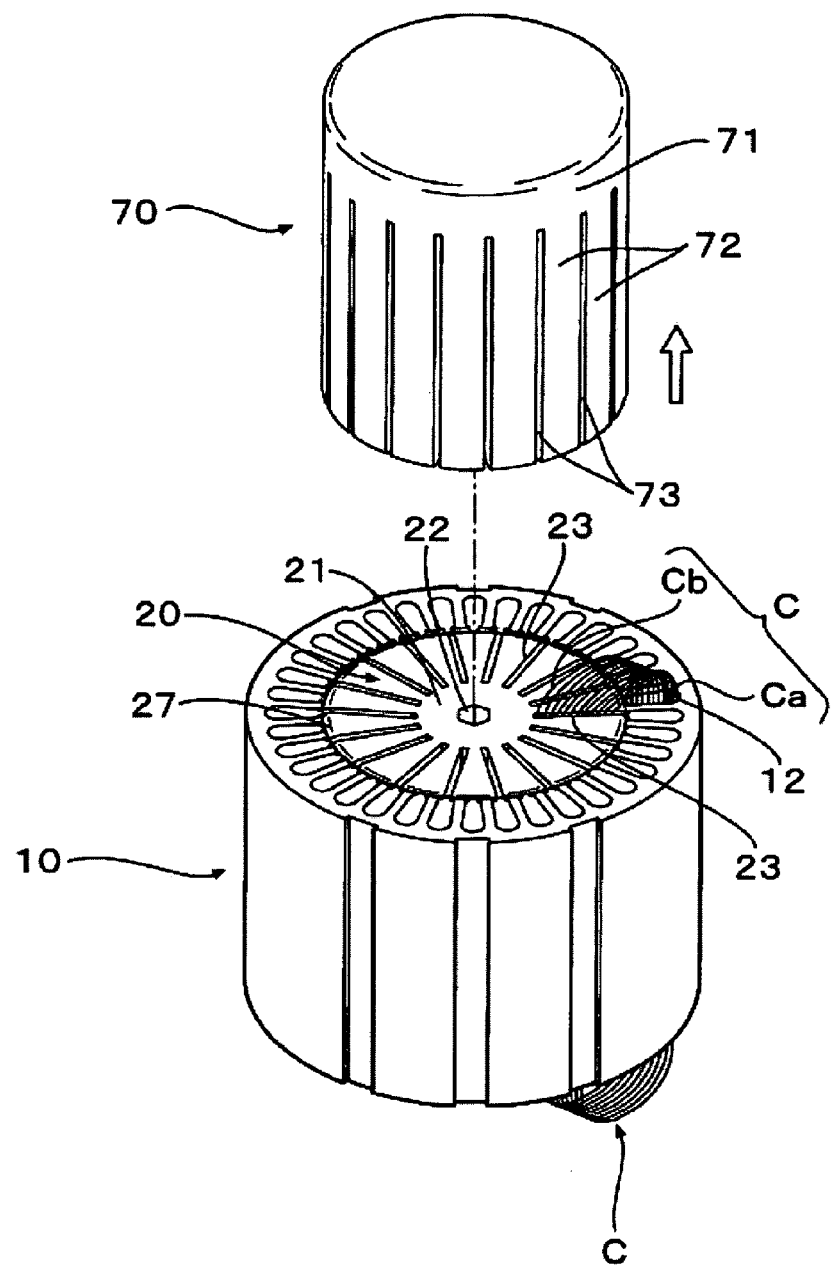
FIG. 8 is a perspective view showing a state where the auxiliary member is removed in the preferred embodiment.

FIG. 7 shows a state where the jig 20 is completely inserted in the inner perimeter of the stator core 10 thus. In each perspective view of this preferred embodiment, although only one coil is shown for convenience' sake, actually the coil C is held in each holding groove 23 of the jig 20. In this state, one side Ca of the coil C is inserted in a corresponding slot 12 and the other side Cb is inserted in a corresponding holding groove 23. In this state, as shown in FIG. 8, the auxiliary member 70 is separated from the end surface of the jig 20 and each coil C is removed from the space 73.

Figure 9:
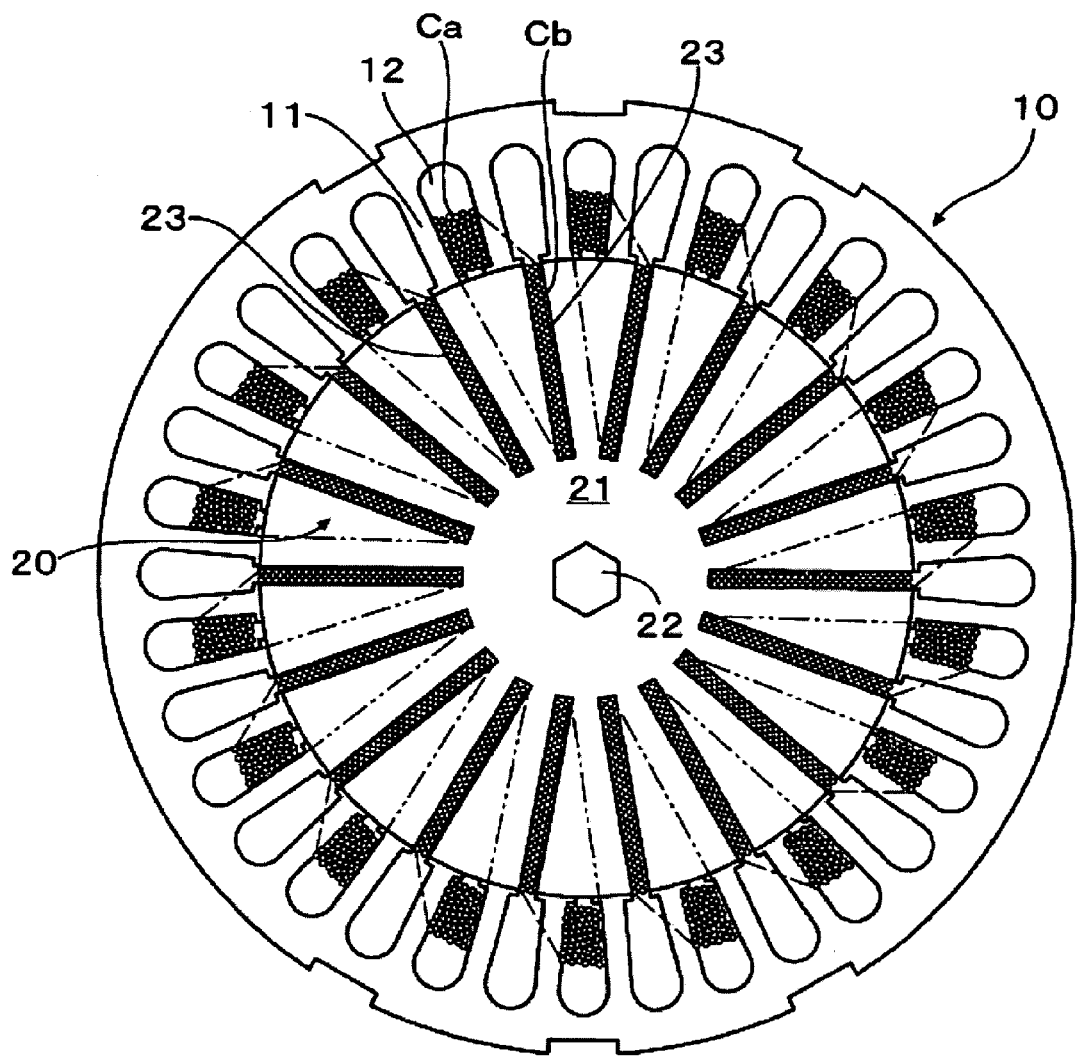
FIG. 9 is a top view showing a state where the jig is inserted in the inner perimeter of the stator core in the preferred embodiment.
Figure 10:
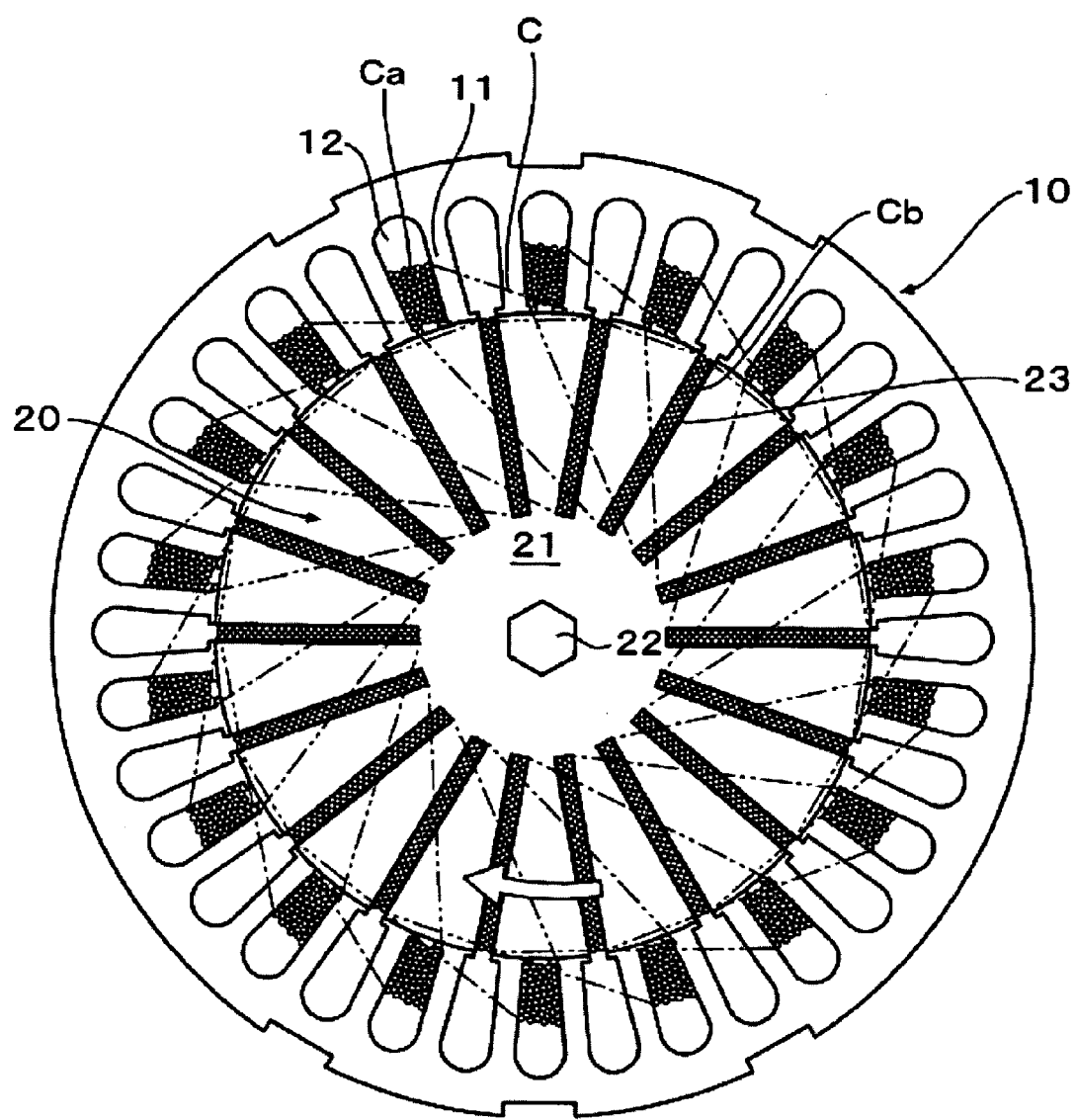
FIG. 10 is a top view showing a state where the jig is rotated by a prescribed angle against the stator core in the preferred embodiment.

FIG. 9 shows this state in a plan. Specifically, one side Ca of the coil C is inserted in the corresponding slot 12 of the stator core 10 and the other side Cb is inserted in and held by the holding groove 23 adjacent the slot 12 in which the one side Ca is inserted. In this state, as shown in FIG. 10, the jig 20 is rotated by a prescribed angle in a prescribed direction and is positioned in such a way that the other side Cb of the coil C held in the holding groove 23 can match a prescribed slot 12. In the case of this preferred embodiment, it is rotated in such a way that the holding groove 23 in which the other side Cb is held can match the sixth slot 12 ahead from one in which one side Ca is held.

Figure 11:
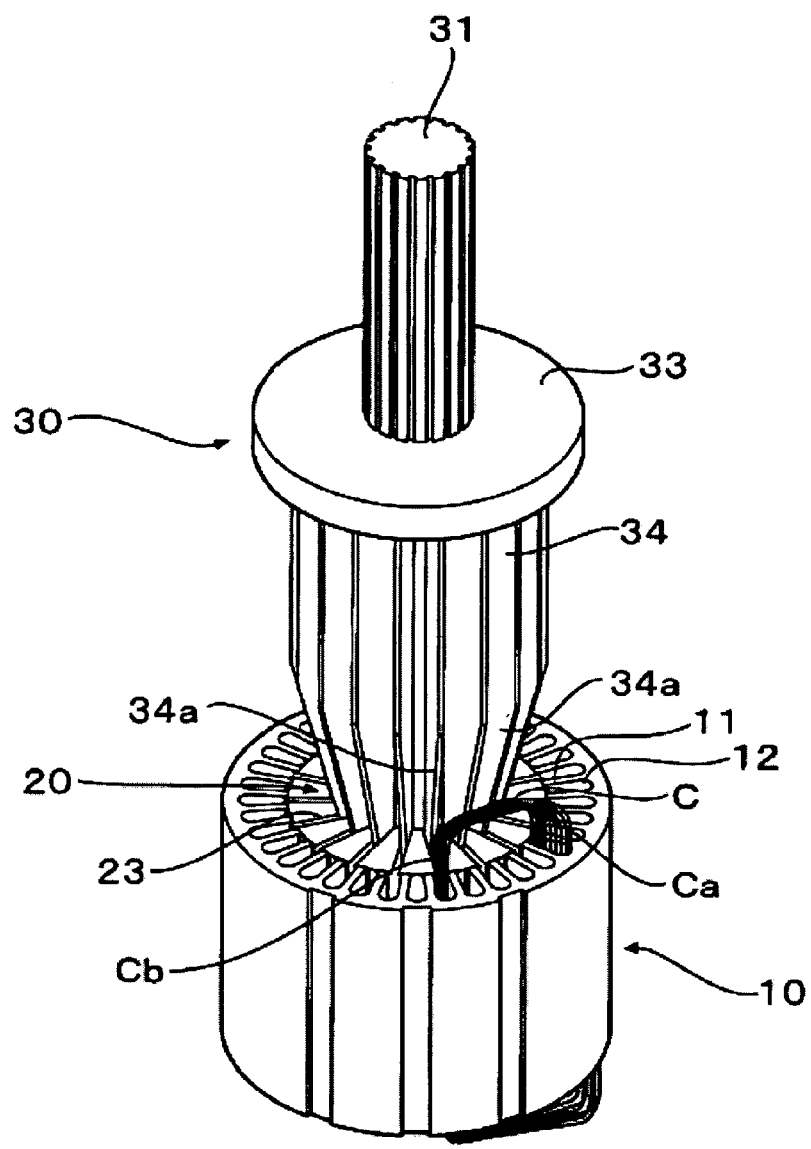
FIG. 11 is a perspective view showing a state where the other side of the coil held in the holding groove of the jig is pushed out to the outer radius side by a pressing jig in the preferred embodiment.

Then, as shown in FIG. 11, the other side Cb of the coil C held in the holding groove 23 of the jig 20 is pressed out on the outside radius side using the earlier-described pressing jig 30 and is inserted in the corresponding slot 12 of the stator core 10. Specifically, the pressing jig 30 shown in FIG. 2 is installed in the upper section of the jig 20 and is rotated and positioned in such a way the pusher 34 can match the holding groove 23.

Figure 12:
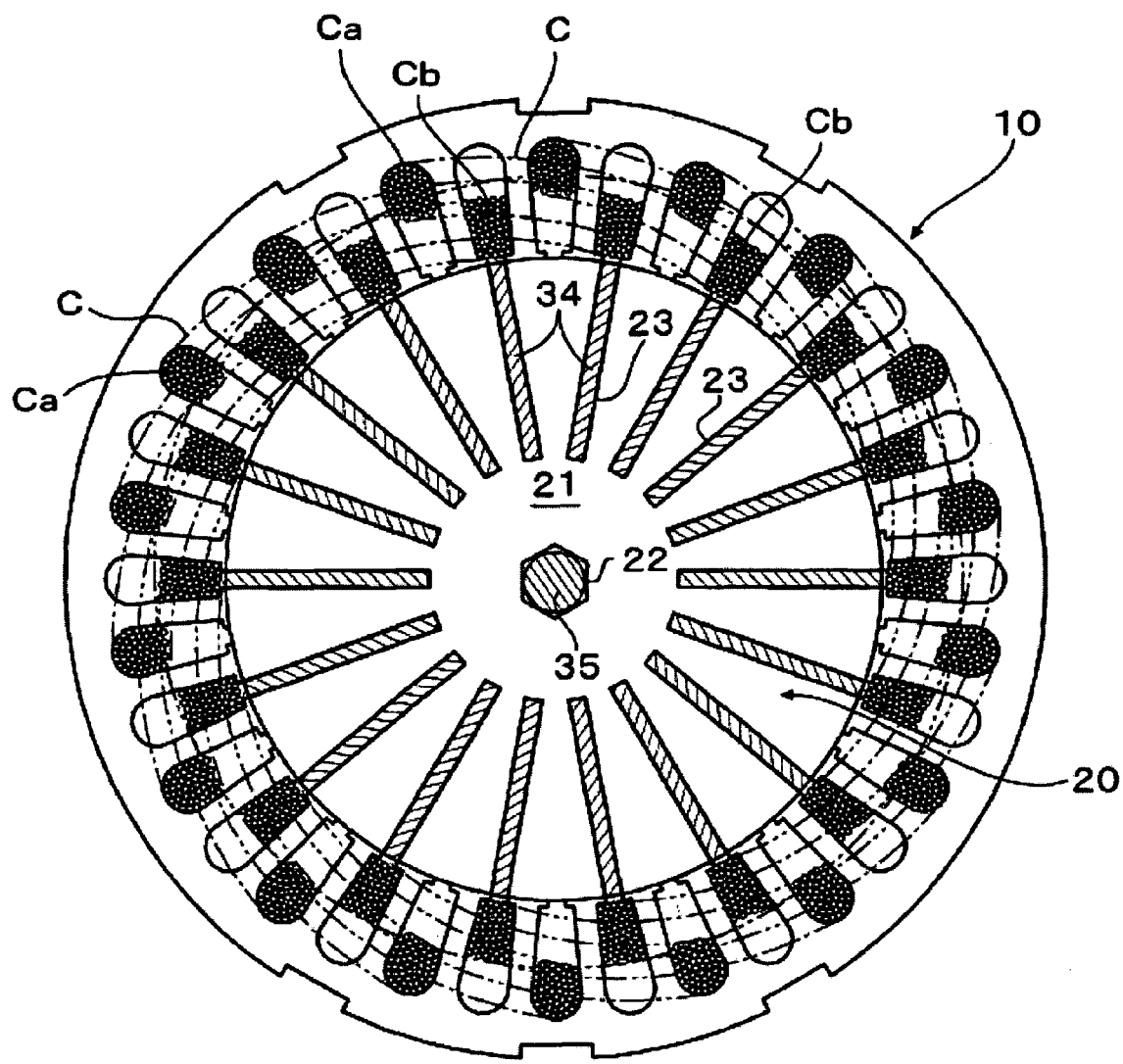
FIG. 12 is a top view showing a state where the other side of the coil held in the holding groove of the jig is inserted in the slot of the stator core in the preferred embodiment.

Then, the ring 33 is slid downward against the shaft 31 and the pusher 34 is started to be inserted in the holding groove 23 first from its bottom end. Then, the other side Cb of the coil C inserted in the holding groove 23 is pressed out on the outside radius side by the taper 34a of the pusher 34 and is inserted in the slot 12 of the stator core 10. FIG. 12 shows a state where the other side Cb of the coil C is completely inserted in a corresponding slot 12 thus.

Thus, one side Ca of the coil C is inserted in one slot 12 and the other side Cb is the sixth slot 12 ahead from one in which one side Ca is inserted. Since this insertion work is simultaneously applied to a plurality of coils, the coil C are inserted in such a way that their coil ends may form a spiral when viewed from the end surface of the stator core 10.

Figure 13:
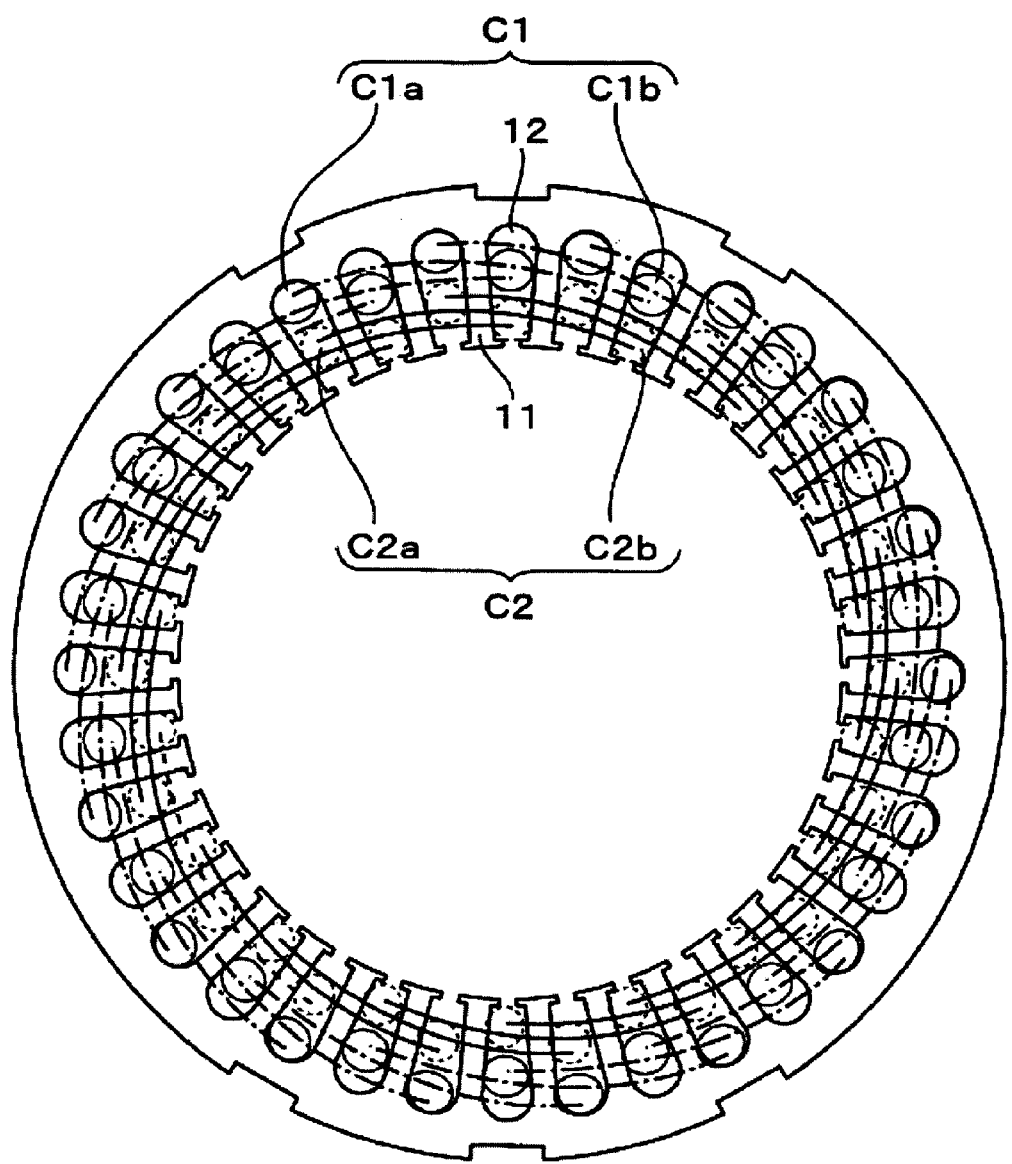
FIG. 13 shows a state where the inserting operation is repeated twice in the preferred embodiment.
Figure 14:
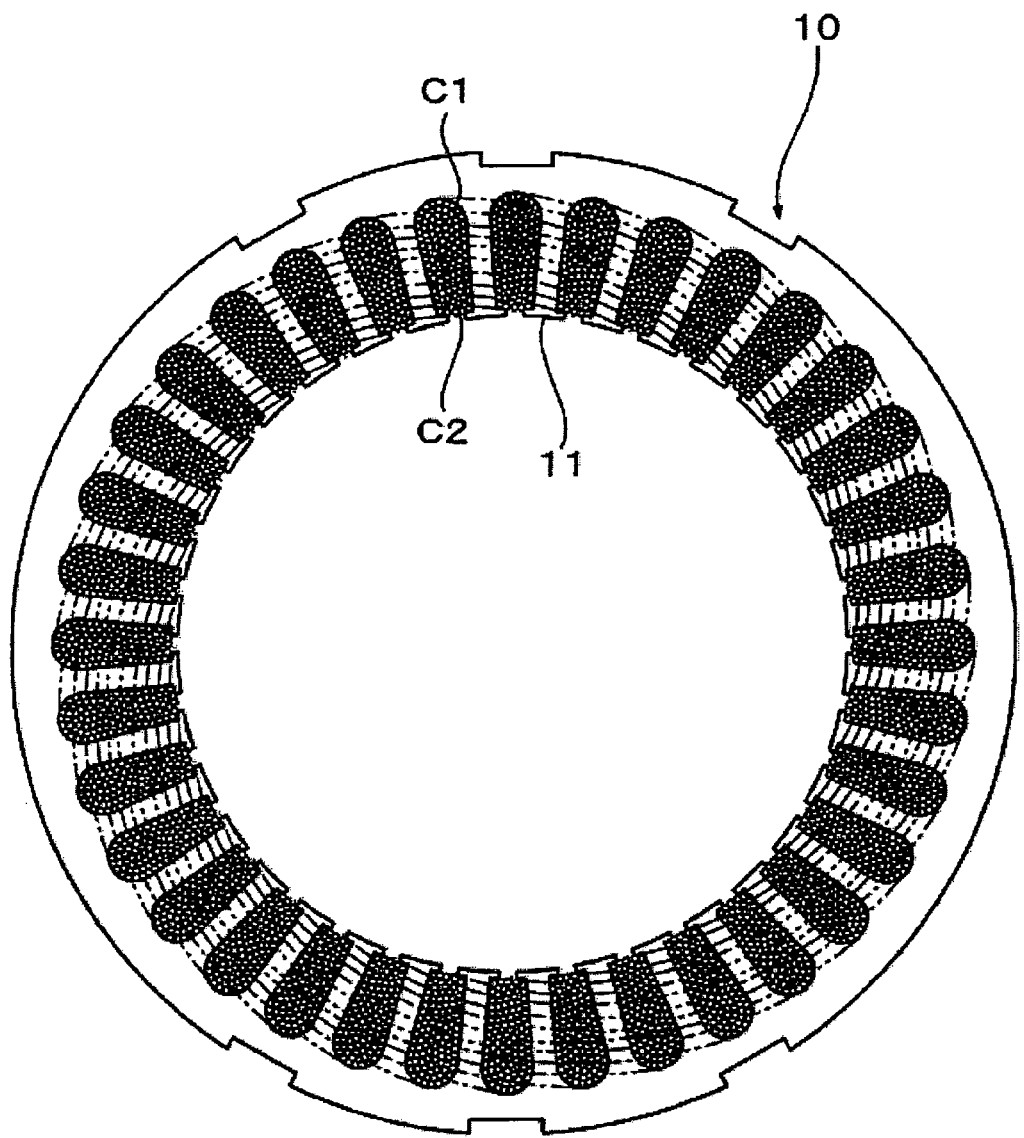
FIG. 14 is the cross section view of the coil filled in the slot of the stator core obtained in the preferred embodiment.

Then, in this preferred embodiment, the above-described insertion process is repeated once. As a result, as shown in FIG. 13, in each slot 12 of the stator core 10, one side C1a or the other side C1b of a coil C1 inserted in the first process is inserted in the outside radius side of the slot 12 and one side C2a or the other side C2b of a coil C2 inserted in the second process is inserted in the inside radius side of the slot 12. Specifically, one sides C1a and C2a of the coils C1 and C2 are overlapped outside and inside and are alternately inserted in every another slot 12 of the stator core 10, and the other sides C1b and C2b of the coils C1 and C2 are overlapped outside and inside and are alternately inserted in the slot 12 between them. As a result, as shown in FIG. 14, the coils are fully inserted in the slot 12 of the stator core 10 and a stator having a high coil occupancy ratio in its slot can be obtained.

Figure 15:
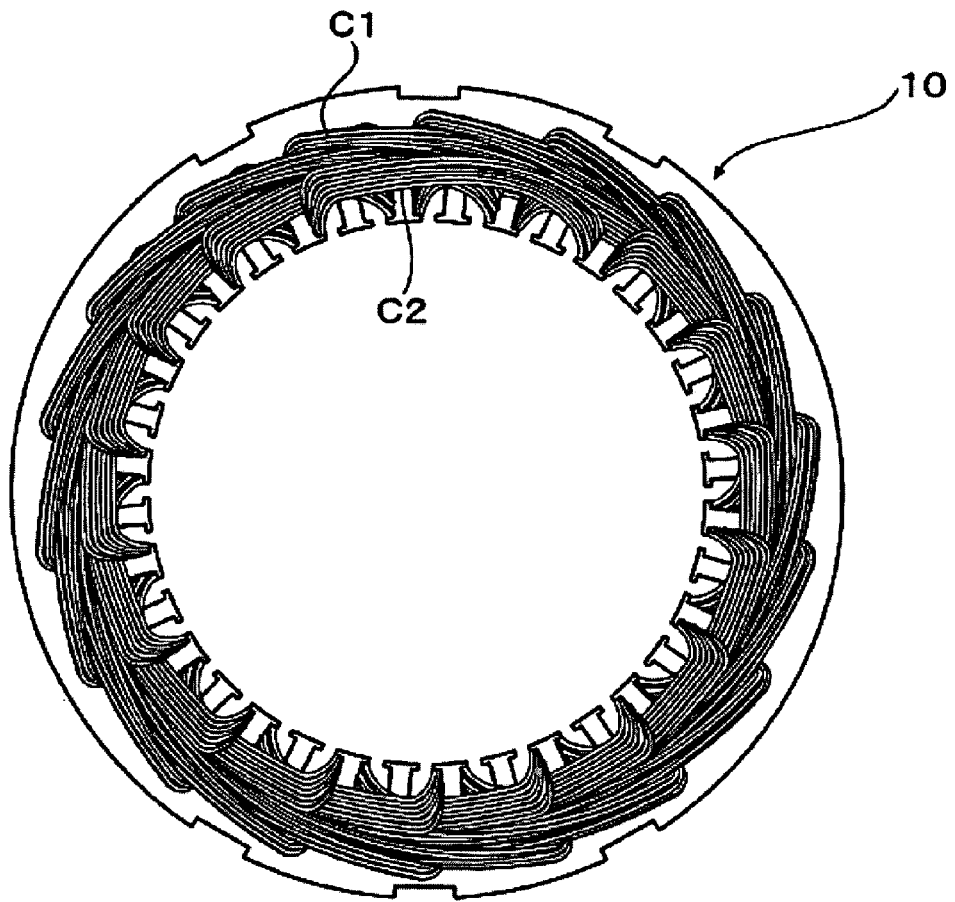
FIG. 15 is a top view showing the shape of the coil end of the stator obtained in the preferred embodiment.

In the stator formed thus, as shown in FIGS. 13 and 15, the coil ends of the coils C1 inserted in the first process are formed in a spiral on the outside radius side and similarly the coil ends of the coils C2 inserted in the second process are formed in a spiral in its inside. Thus, in the stator formed thus, the double spiral shape of the coil ends is formed. As shown in FIG. 16, the height of the coil end of the coil C, which projects from each end surface of the stator core 10 is fairly low and uniform across the entire perimeter.

Since the other side Cb of the coil C held by the jig 20 is inserted after one side Ca is inserted and the jig 20 is rotated and positioned, the coil C is appropriately expanded in the perimeter direction and inserted. Since the coil C is inserted from the inside radius side against the inner teeth 11 of the stator core 10 differently from a normal method of inserting a coil from one end toward the other end of stator core, the coil C is appropriately expanded in the perimeter direction and inserted. Therefore, the coil end can be reduced.

Since in this stator, coils C are partially overlapped and arrayed in the perimeter direction, cogging-torque unevenness becomes very little and vibration and noise can be remarkably reduced when using this stator for a motor. Since the coil ends are compact and uniformly project, the stator core 10 and a motor using it can be made compact.

Figure 17:
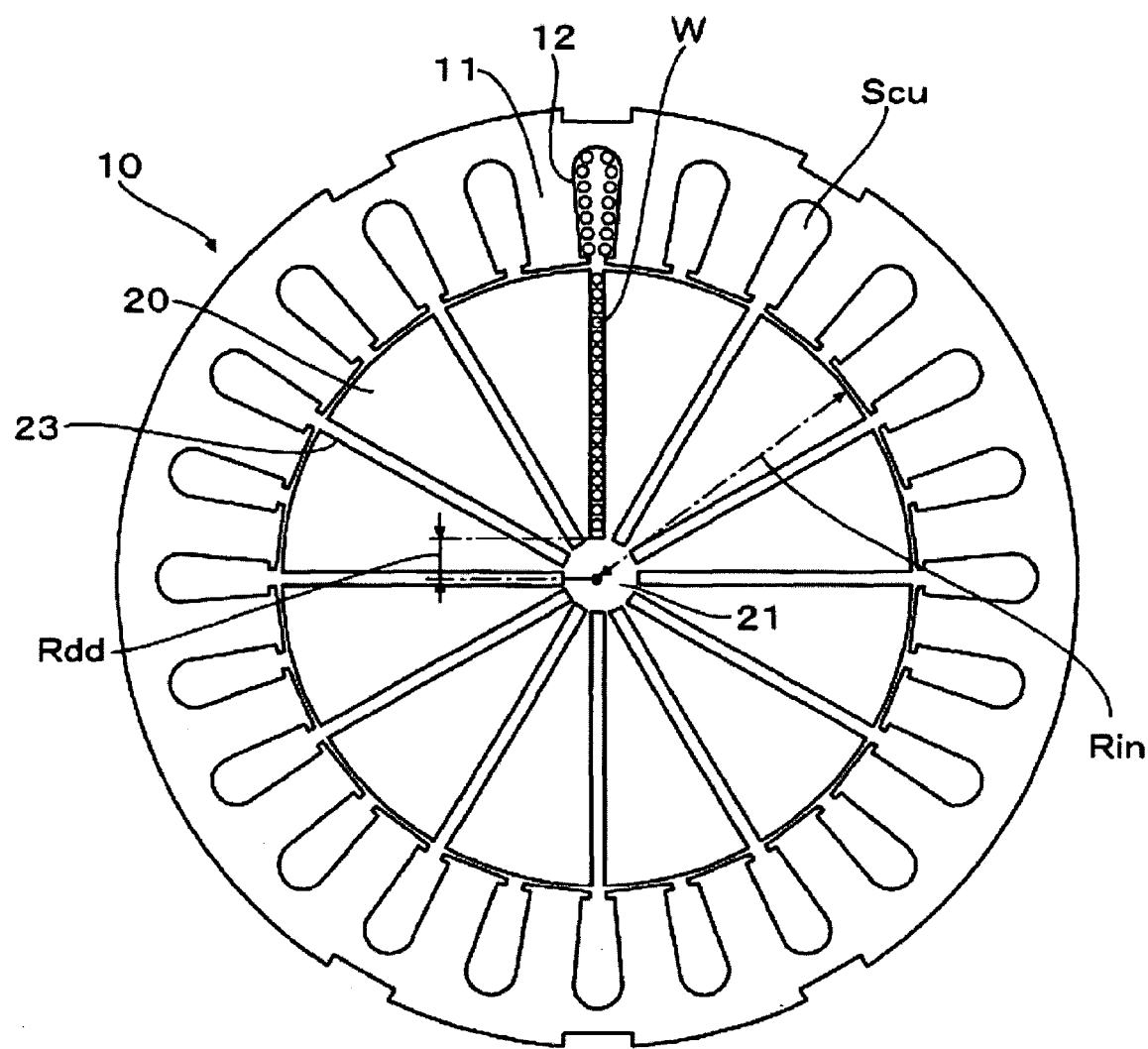
FIG. 17 shows the relationship between the holding groove of the jig and the slot of the stator core in the preferred embodiment.

FIG. 17 typically shows a state where the coil wire W is inserted in the slot 12 from inside the holding groove 23 of the jig 20. If it is assumed that the coil wires W are aligned in a row in the holding groove 23 when the total coil sectional areas inserted in the slot 12 of the stator core 10, the inside radius of the stator core 10, the radius of the shaft unit 21, the number of slots and the diameter of the coil wire are Scu, Rin, Rdd, Slot and d, respectively, the total sectional area of the coil wires W that can be inserted in the holding groove 23 becomes at most (Rin−Rdd)×d, which is the maximum total sectional area of the coil wires W that can be inserted in the slot 12 by one operation.

However, since the stator of the present invention targets one in which the coils C overlapped in a spiral are inserted in such a way as to form a multiple loop by repeating the above-described inserting operation twice or more, in the stator obtained in this preferred embodiment, the total sectional area of the coil wires W inserted in the slot 12 becomes at least larger than the total sectional area of the coil wires W calculated according to the above-described (Rin−Rdd)×d. Since the perimeter of the shaft unit 21 can be falsely expressed by d×(Slot/2), the radius Rdd of the shaft unit 21 can be obtained by dividing this by $2\pi$, that is, according to d×Slot/$4\pi$. Therefore, the stator core obtained in this preferred embodiment is one which satisfies the following expression (1).

$$\text{Scu} > (\text{Rin}-\text{Rdd}) \times d = \{\text{Rin}-(d \times \text{Slot}/4\pi)\} \times d = \text{Rin} \cdot d - \text{Slot} \cdot d^2/4\pi \quad (1)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots and the diameter of the coil wire, respectively.

FIGS. 18~22 show the manufacturing example of the stator in another preferred embodiment of the present invention.

Figure 3:
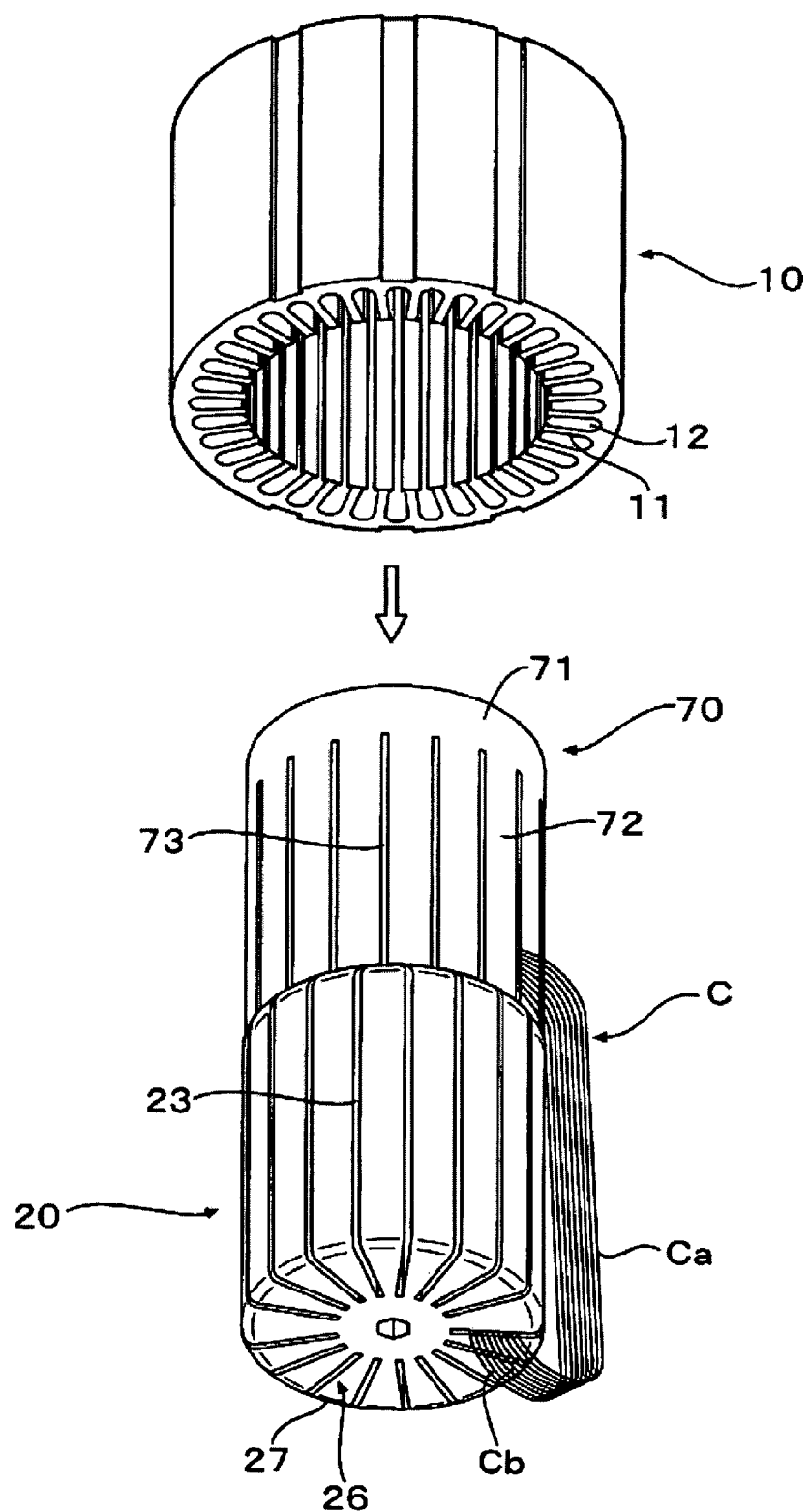
FIG. 3 is a perspective view showing a state where a coil is held by the jig and the auxiliary member is set in this jig in one preferred embodiment of a manufacturing method for manufacturing the stator according to the present invention using the manufacturing device.
Figure 18:
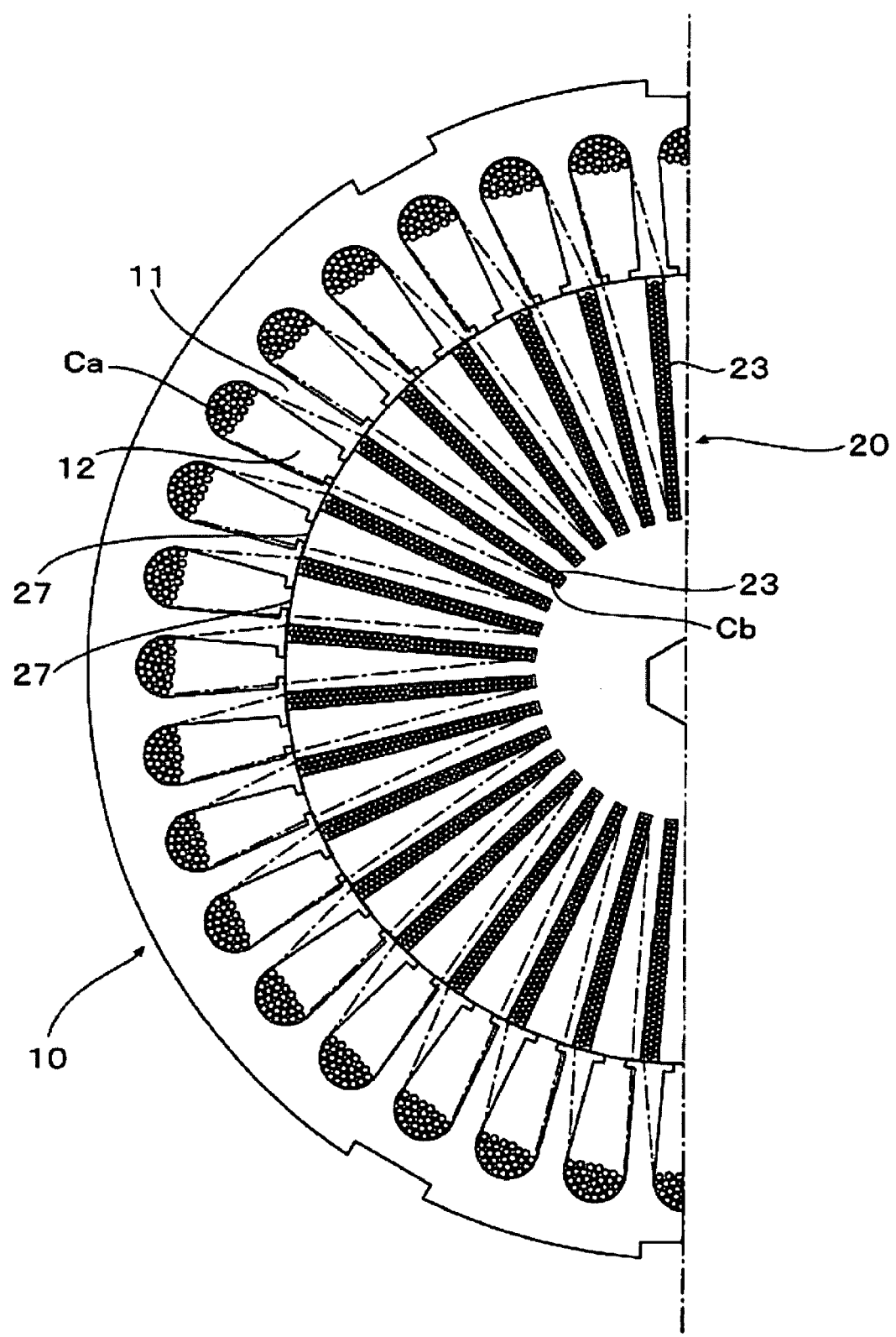
FIG. 18 shows a state where the jig is inserted in the inner perimeter of the stator core, one side of the coil is inserted in the slot of the stator core and the other side is held in the holding groove of the jig in another preferred embodiment of the manufacturing method for manufacturing the stator according to the present invention.

In this preferred embodiment, the same number of the holding grooves 23 of the jig 20 as those of the slots 12 of the stator core 10 is provided. Specifically, the holding grooves 23 are provided for every pitches of the slot 12. The other side Cb of each coil C is inserted in the holding groove 23 of the jig 20 and each coil is arrayed along the perimeter direction of the jig 20 with one side Ca projected. In that state, the earlier-described auxiliary member 70 is installed and one side Ca of the coil C is projected through the space 73 of the blade 72 of the auxiliary member 70. Then, by rotating and positioning the blade 72 of the auxiliary member 70 in such a way as to touch the inner perimeter of each inner tooth of the stator core 10 and inserting the jig 20 in the inner perimeter of the stator core 10 from the auxiliary member 70 side, one side Ca of the coil C, projected by the end edge 27 of the jig 20 is pressed and inserted in the corresponding slot 12 of the stator core 10 through the space 73 of the blade 72. FIG. 18 shows a state where one side Ca of the coil C is inserted in each corresponding slot 12 of the stator core 10 thus in the same manner as shown in FIGS. 3~5. The other side Cb of the coil C is inserted and held in the holding groove 23 of the jig 20 adjacent the slot 12.

Figure 20:
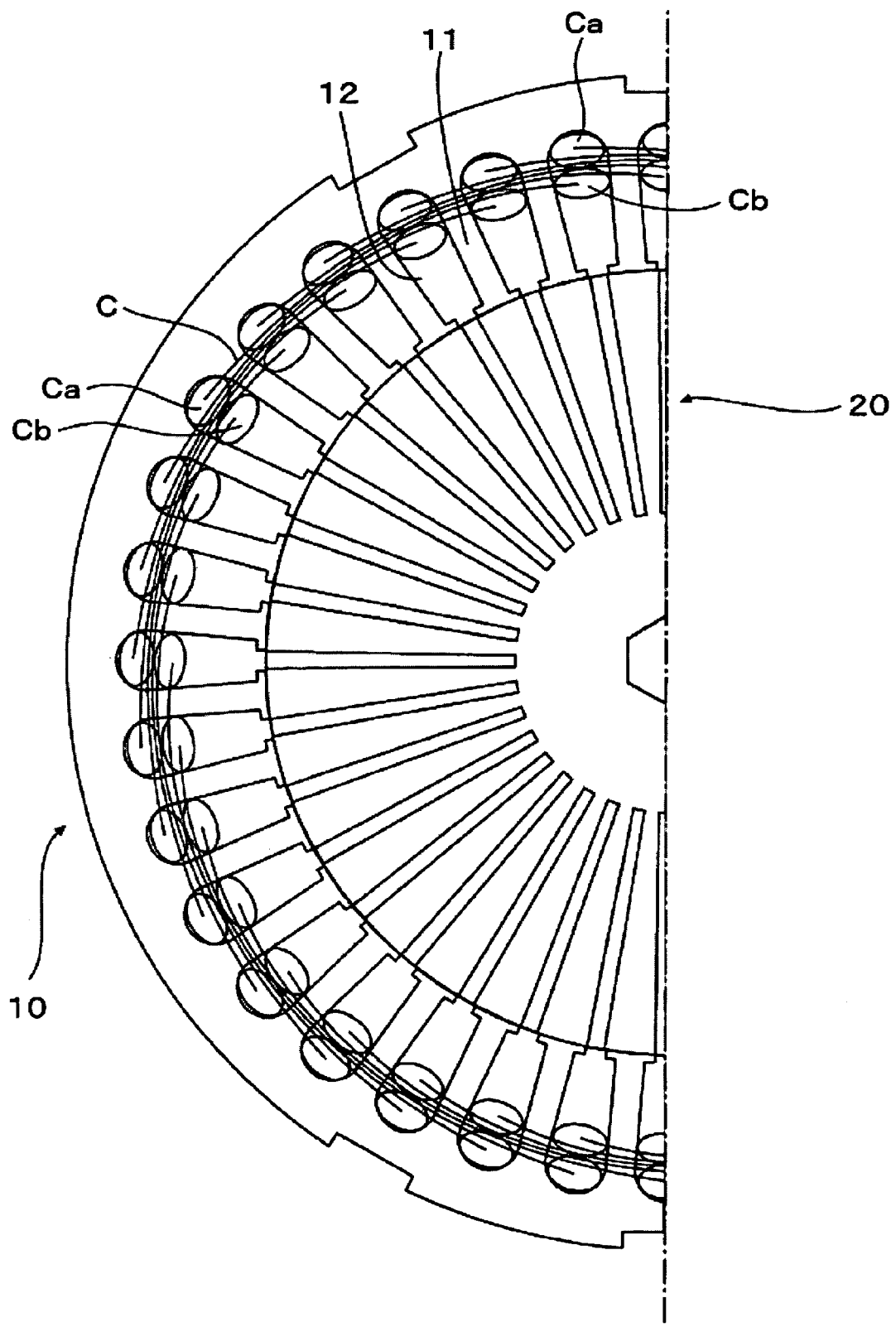
FIG. 20 shows a state where the other side of the coil held in the holding groove of the jig is inserted in the slot of the stator core in the preferred embodiment.

Then, as shown in FIG. 19, the jig 20 is rotated by a prescribed angle and positioned in such a way that the holding groove 23 holding the other side Cb of the coil C can match the sixth slot 12 ahead from one in which one side Ca is inserted. In this state, the other side Cb of the coil C in the holding groove 23 is pushed out to the outside radius and is inserted in a corresponding slot 12 using the earlier-described pushing means, such as the pressing jig 30 shown in FIG. 1. As a result, as shown in FIG. 20, one side Ca of the coil C is inserted in the outside radius side of each slot 12 and the other side Cb of the coil C on the inside radius side of the slot 12. Thus, two coils are inserted in one slot 12. Then, a coil with one side Ca and the other side Cb positioned on the outside and inside radius sides, respectively, form coil ends overlapped in a spiral on the end surface of the stator core 10.

Figure 21:
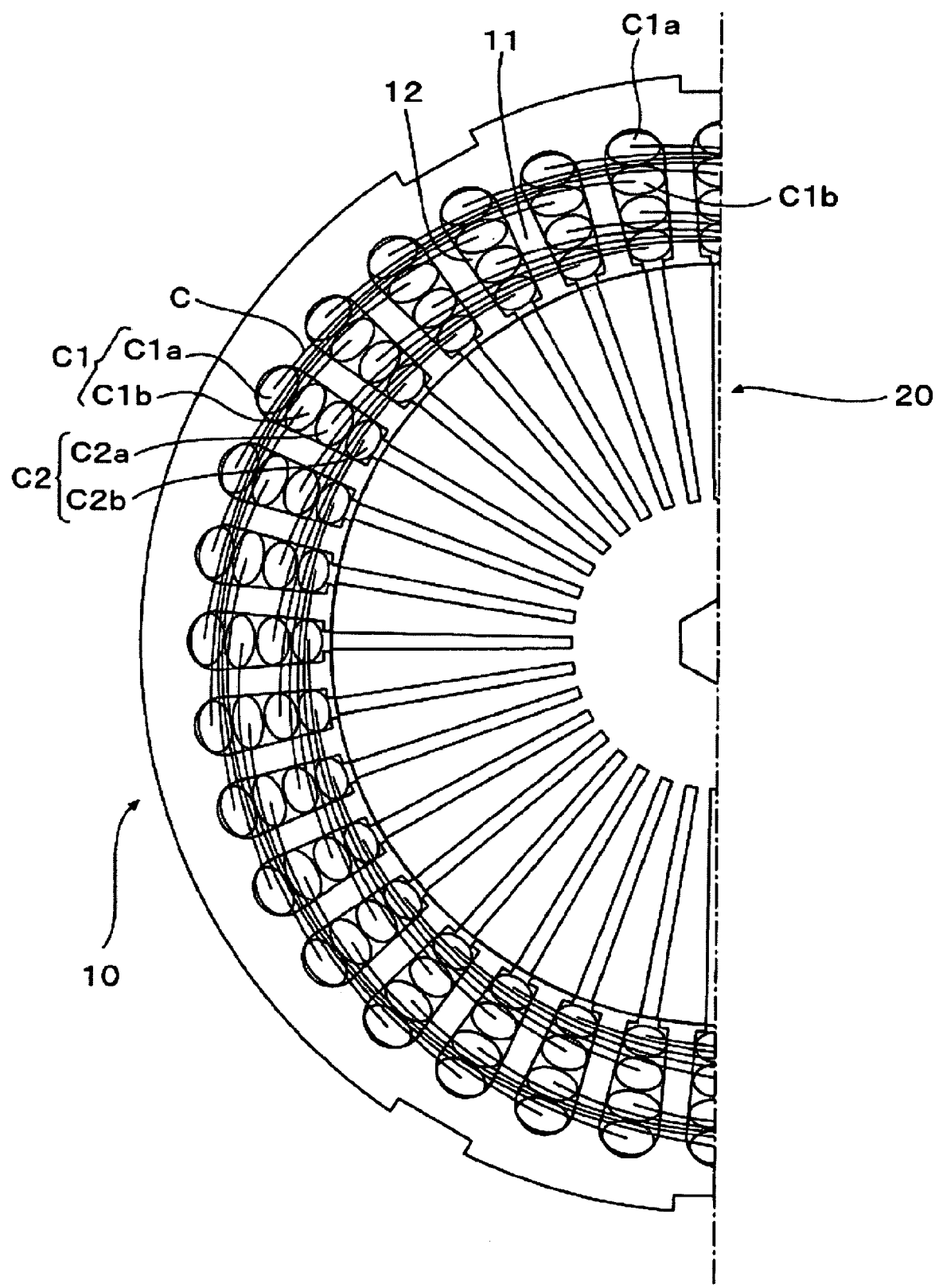
FIG. 21 shows a state where the inserting operation is repeated twice in the preferred embodiment.

In this preferred embodiment, by repeating the above-described inserting operation twice, as shown in FIG. 21, four coils are inserted in one slot 12. Specifically, a stator in which coil ends overlapped in a spiral are doubly formed as shown in FIG. 20 is obtained.

Figure 22:
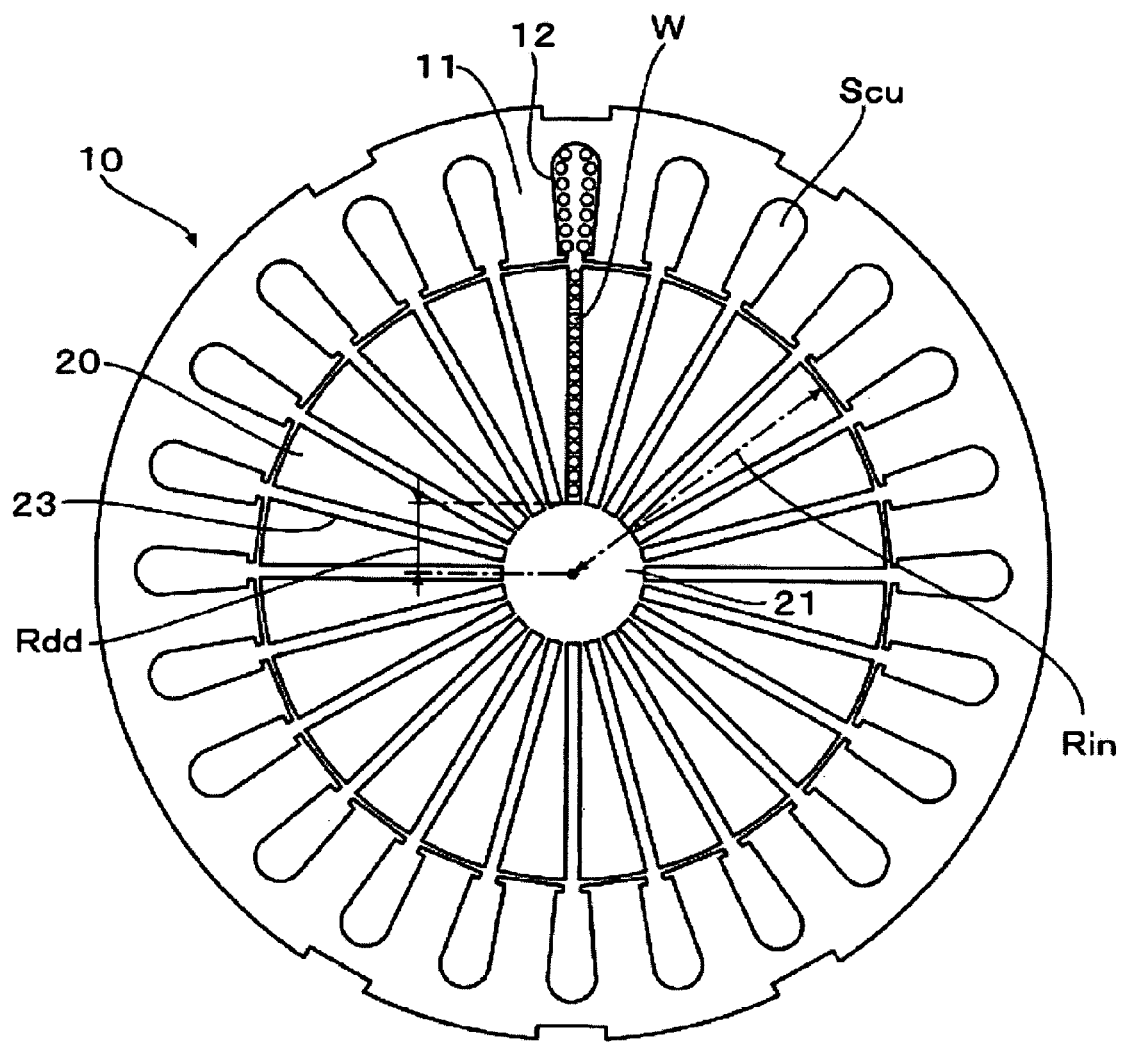
FIG. 22 shows a relationship between the holding groove of the jig and the slot of the stator core in the preferred embodiment.

FIG. 22 typically shows a state where the coil wire W is inserted in the slot 12 from inside the holding groove 23 of the jig 20 in the preferred embodiment. If it is assumed that the coil wires W are aligned in a row in the holding groove 23 when the total coil sectional areas inserted in the slot 12 of the stator core 10, the inside radius of the stator core 10, the radius of the shaft unit 21, the number of slots and the diameter of the coil wire are Scu, Rin, Rdd, Slot and d, respectively, the total sectional area of the coil wires W that can be placed in the holding groove 23 becomes at most (Rin−Rdd)×d, which is the maximum total sectional area of the coil wires W that can be inserted in the slot 12 from one holding groove 23.

In this preferred embodiment, since two coil wires W held in two holding groove 23 are inserted in one slot 12 by one inserting operation, the maximum total sectional area of the coil wires W that can be inserted in the slot 12 by one inserting operation (a series of inserting operations shown in FIGS. 18~20) becomes twice the above, that is, 2×(Rin−Rdd)×d.

However, since in this preferred embodiment a stator in which the coils C overlapped in a spiral are inserted in such a way as to form a multiple loop by repeating the above-described inserting operation twice is targeted, in the stator obtained in this preferred embodiment, the total sectional area of the coil wires W inserted in the slot 12 becomes at least larger than the total sectional area of the coil wires W calculated according to the above-described 2×(Rin−Rdd)×d. Since the perimeter of the shaft unit 21 can be falsely expressed by d×Slot, the radius Rdd of the shaft unit 21 can be obtained by dividing this by $2\pi$, that is, according to d×Slot/$2\pi$. Therefore, the stator obtained in this preferred embodiment is one which satisfies the following expression (2).

$$\text{Scu} > 2 \times (\text{Rin}-\text{Rdd}) \times d = 2 \times \{\text{Rin}-(d \times \text{Slot}/2\pi)\} \times d = 2 \cdot \text{Rin} \cdot d - \text{Slot} \cdot d^2/2\pi \quad (2)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots and the diameter of the coil wire, respectively.

Figure 24:
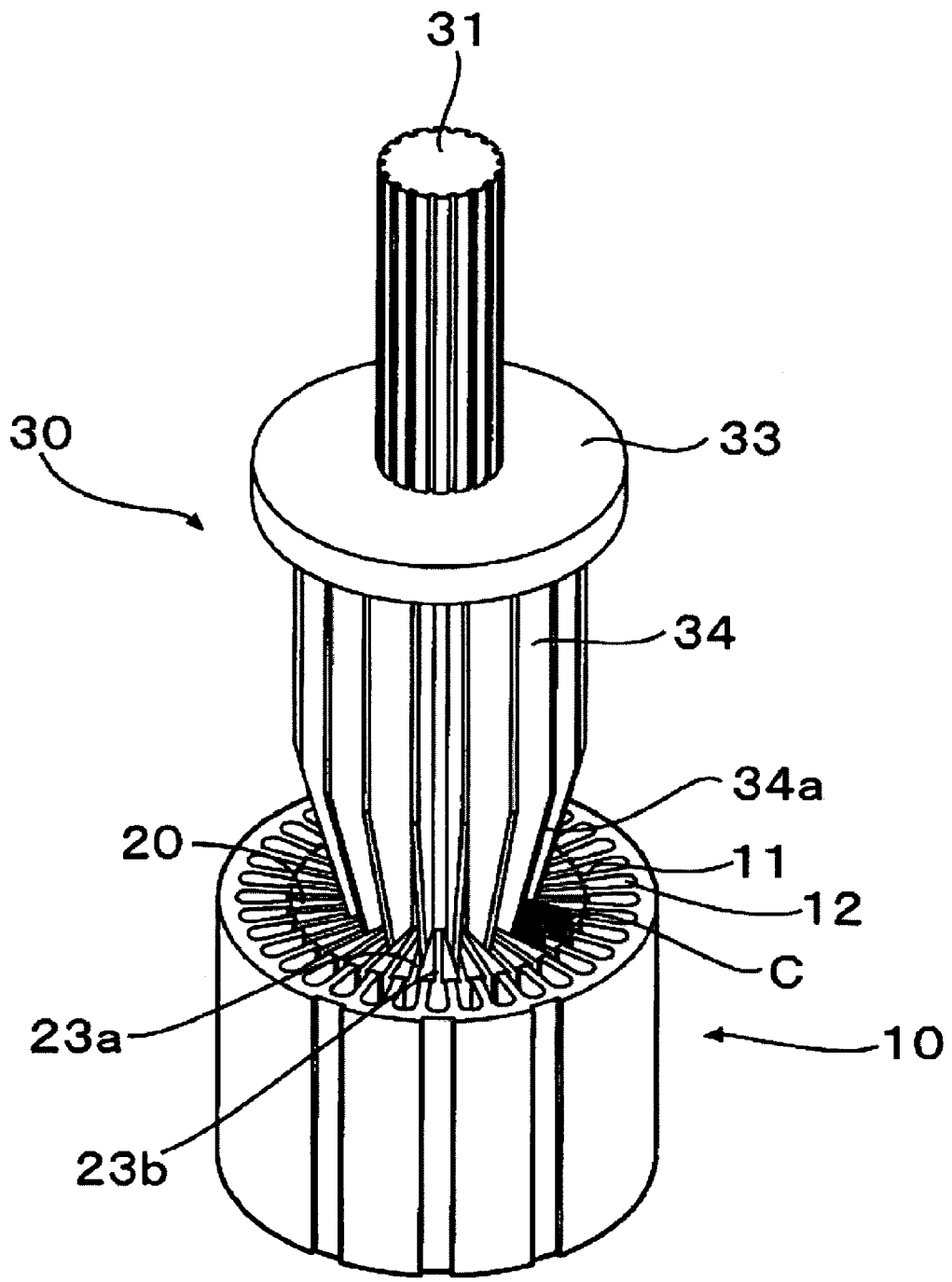
FIG. 24 is a perspective view showing a state where the manufacturing device is assembled.

FIGS. 23 and 24 show another example of the device for manufacturing the stator of the present invention. The same reference numerals are attached to the substantially same components as those of the preferred embodiments shown in FIGS. 1 and 2 and their descriptions are omitted.

This manufacturing device comprises a jig 20 almost cylindrical as a whole, which is inserted in the inner perimeter of the stator core 10. The jig 20 comprises a shaft unit 21 at the center, a hole 22 provided at the center of the top end surface of this shaft unit 21 and a plurality of holding grooves 23 radiantly formed from the outer perimeter of the shaft unit 21 toward the cylindrical outer perimeter of the shaft unit 21. The holding grooves 23 comprises a first holding groove 23*a* formed with a pitch integer times as (double in this preferred embodiment) that of the slot 12 of the stator core 10 and a second holding groove 23*b* formed with the same pitch as the first holding groove 23*a*, which is between two holding grooves 23*a*.

Although in the case of this example, the first holding groove 23*a* and the second holding groove 23*b* are alternately formed in equal intervals, it is sufficient if the first holding grooves 23*a* and the second holding grooves 23*b* are formed with pitch integer times that of the slot 12 of the stator core 10 and an interval between the first holding groove 23*a* and the second holding groove 23*b* is not especially limited. Although in this preferred embodiment the holding grooves 23 are radiantly formed from the outer perimeter of the shaft unit 21 of the jig 20 toward the radius direction, the holding grooves 23 can be, for example, in a curve, such as in a spiral and the like or formed in a inclination against the radial direction. In this case, the number of coil sides that can be accommodated in the holding grooves can be increased.

One side Ca and the other side Cb of the coil C are inserted in the first holding groove 23a and in the second holding groove 23b. The coils C are inserted in the adjacent first holding groove 23a and second holding groove 23b of the jig 20 and arrayed along the perimeter of the jig 20.

As shown in FIG. 24, the pressing jig 30 is installed on the upper section of the jig 20 in a state where the jig 20 is inserted in the inner perimeter of the stator core 10, and is rotated and positioned in such a way that the holding groove 23 on the side in which the coil C is inserted can be positioned in a corresponding slot 12. Specifically, the shaft bottom end 35 of the pressing jig 30 is inserted in the hole 22 of the jig 22 and the jig 20 is rotated and positioned in such a way that the pusher 34 can be positioned in the holding groove 23 holding the side in which the coil C is inserted.

In this state by sliding the ring 33 of the pressing jig 30 downward along the shaft 31, each pusher 34 is inserted in a corresponding holding groove 23 and by taper 34a of the pusher 34, the corresponding side of the coil C held by the holding groove 23 is pushed out to the outside radius side and is inserted in the corresponding slot 12.

Figure 25:
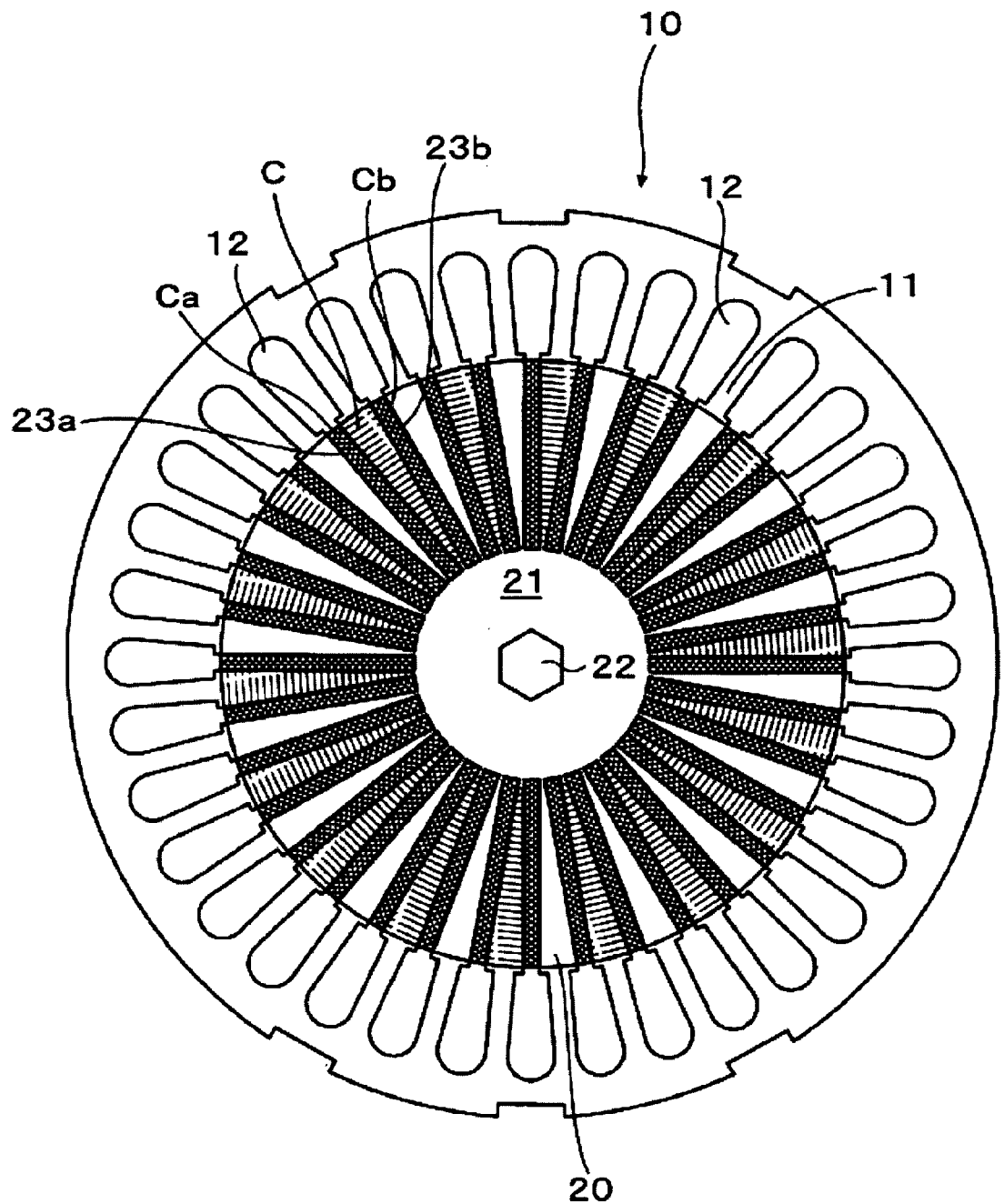
FIG. 25 is a top view showing a state where the jig holding a coil is inserted in the inner perimeter of the stator core in the preferred embodiment of the manufacturing method for manufacturing the stator according to the present invention using the manufacturing device.

FIGS. 25~34 show a manufacturing example of a stator according to another preferred embodiment of the present invention using the above-described manufacturing device, As shown in FIG. 25, one side Ca of the coil C is inserted in the first holding groove 23a of the jig 20 and the other side Cb of the coil C is inserted in the second holding groove 23b adjacent the first holding groove 23a. Thus, a plurality of coils C is arrayed along the perimeter of the jig 20.

Then, the jig 20 holding the coils C in the holding grooves 23 is inserted in the inner perimeter of the stator core 10. FIG. 25 shows this state. The jig 20 is rotated and positioned in such a way that each holding groove 23 can match the corresponding slot 12 of the stator core 10. In this state, the pressing jig 30 shown in FIGS. 23 and 24 is installed in the upper section of the jig 20, and is rotated and positioned in such a way that the pusher 34 can match the first holding groove 23a.

Figure 26:
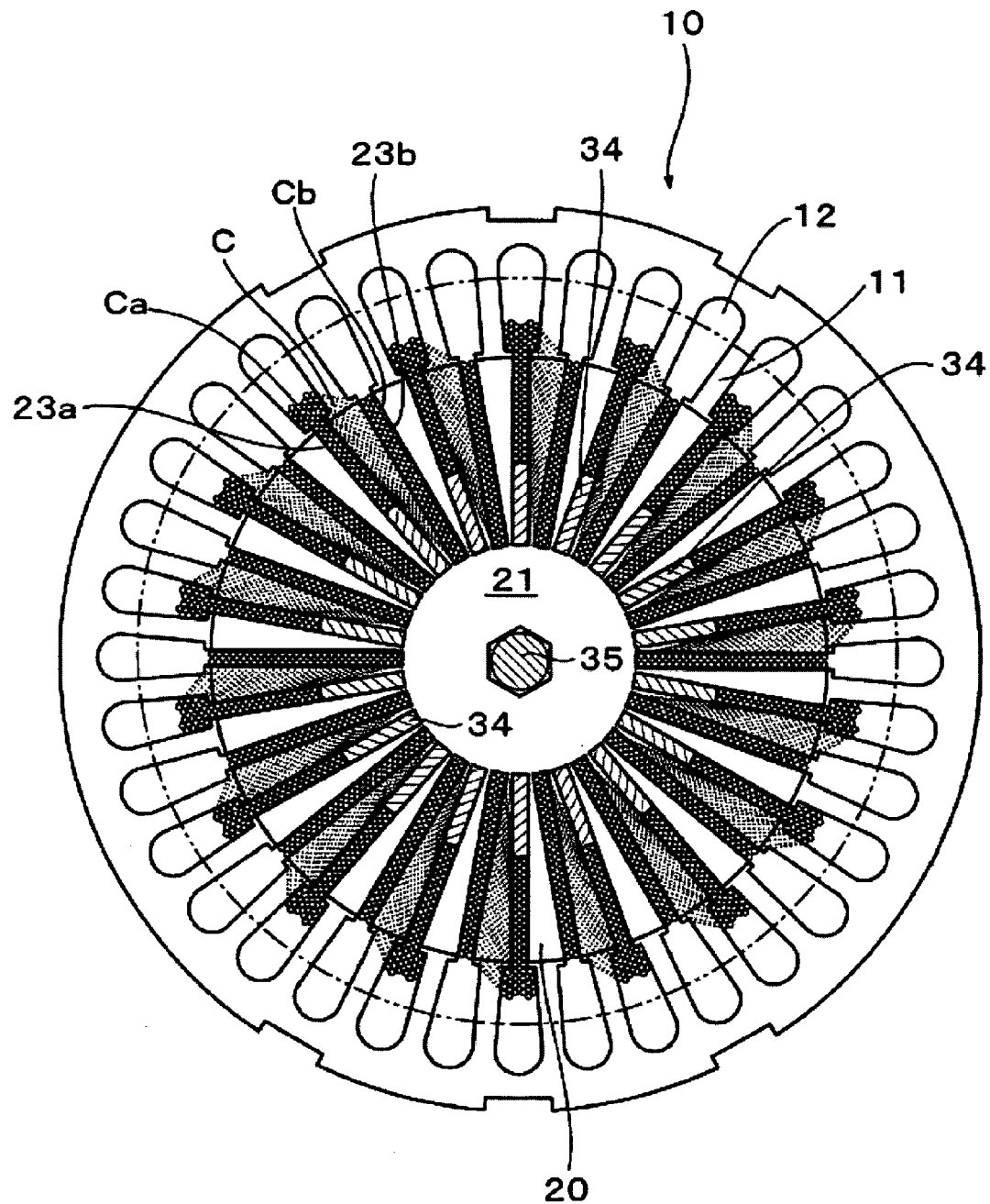
FIG. 26 is a top view showing a state where the pusher of the pressing jig is inserted in the holding groove of the jig and one side of the coil is inserted in the slot in the preferred embodiment.
Figure 27:
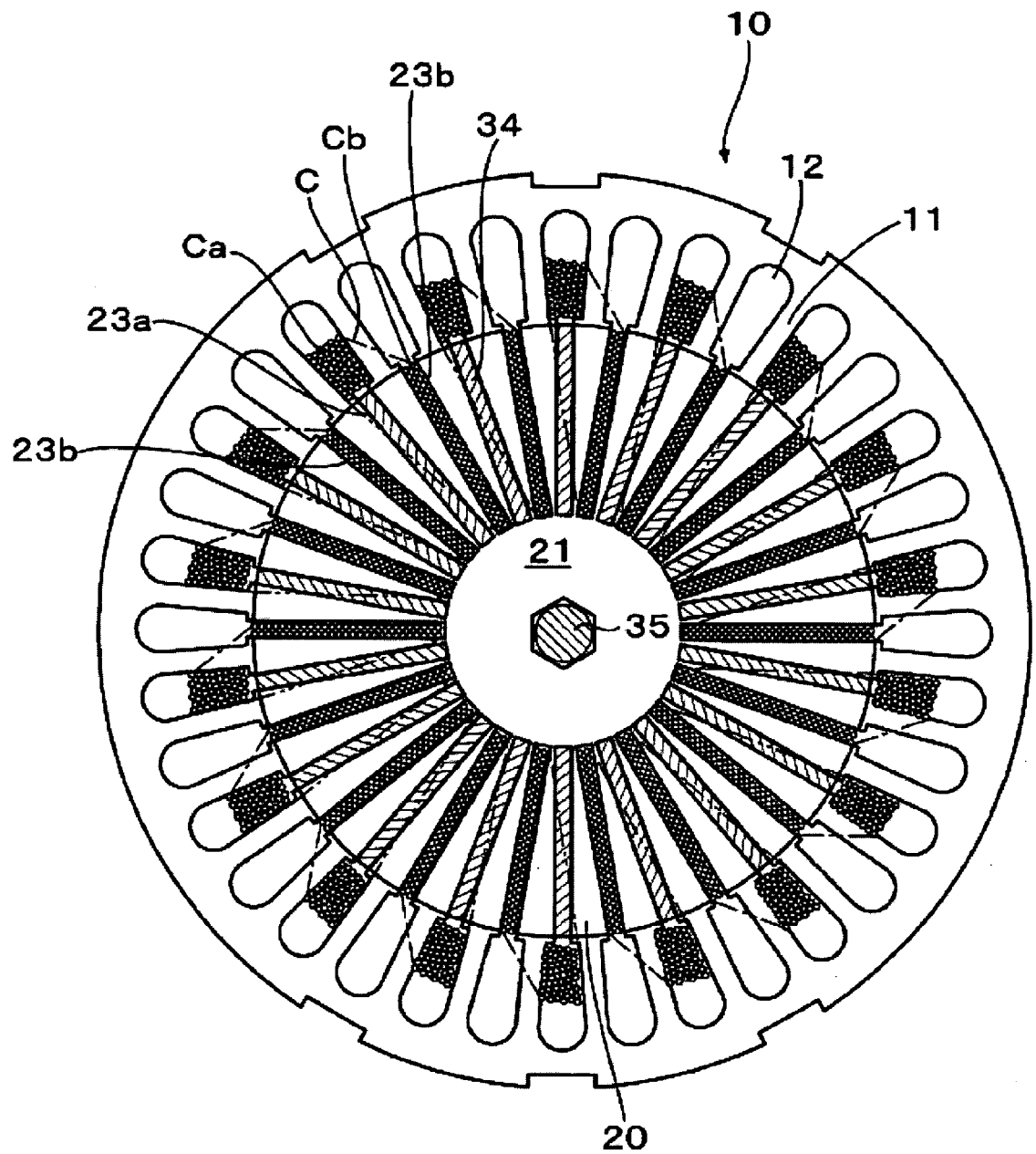
FIG. 27 is a top view showing a state where the pusher is further pushed and one side of the coil is completely inserted in the slot in the preferred embodiment.

Then, the ring 33 is slid downward against the shaft 31 and pusher 34 is inserted in the first holding groove 23a first from the bottom end. Then, as shown in FIG. 26, one side Ca of the coil C inserted in the first holding groove 23a is pushed out to the outside radius side by the taper 34a of the pusher 34 and is inserted in the slot 12 of the stator core 10. FIG. 27 shows the state where one side Ca of the coil C is completely inserted in the corresponding slot 12 thus.

Figure 28:
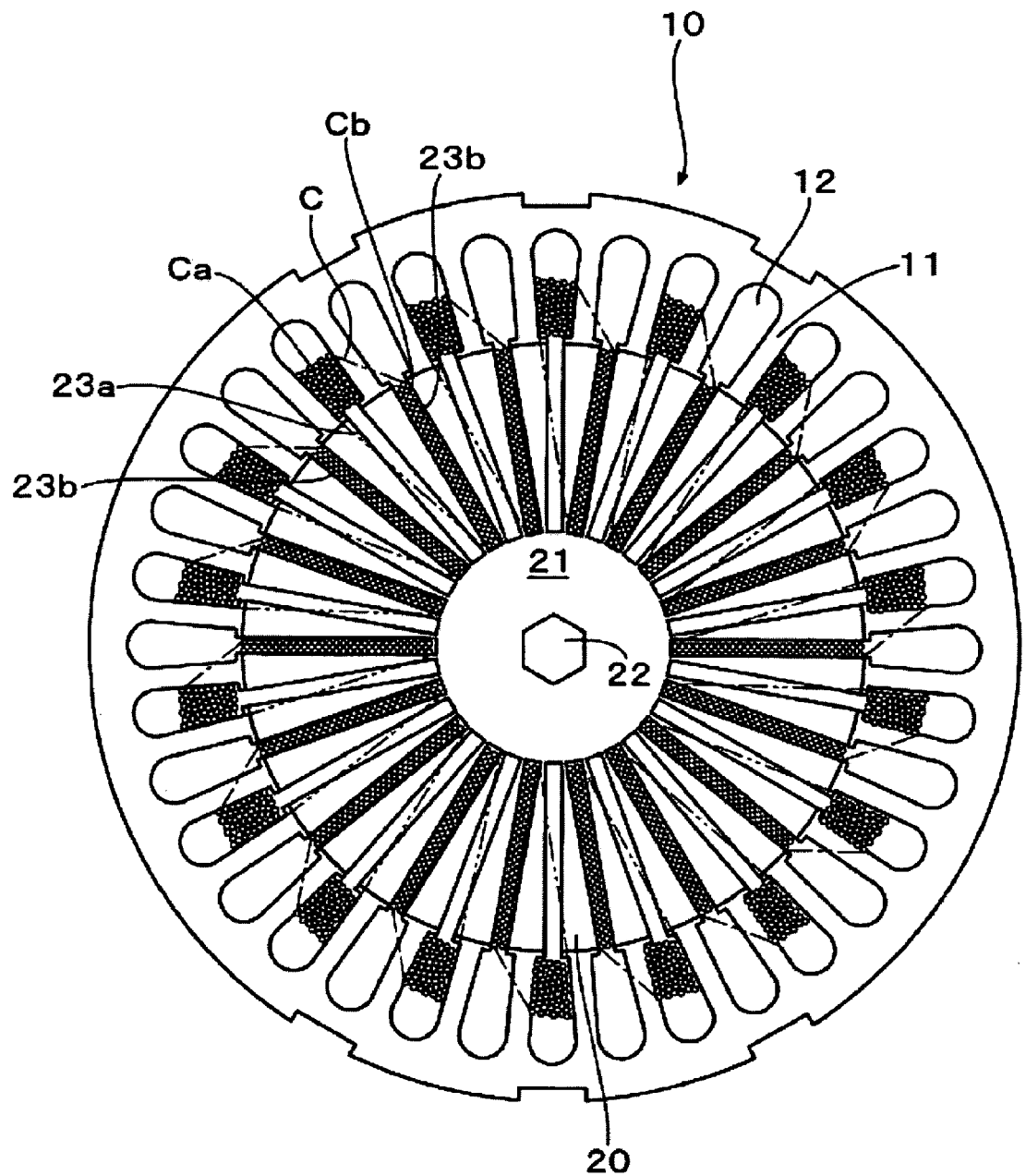
FIG. 28 is a top view showing a state where the pusher is removed in the state shown in FIG. 27.

Then, as shown in FIG. 28, the ring 33 of the pressing jig 30 is lifted and the pusher 34 is removed from the first holding groove 23a. Although the subsequent work can be done as the pressing jig 30 is installed in the upper section of the jig 20, the pressing jig 30 can also be removed from the jig 20 temporarily.

Figure 29:
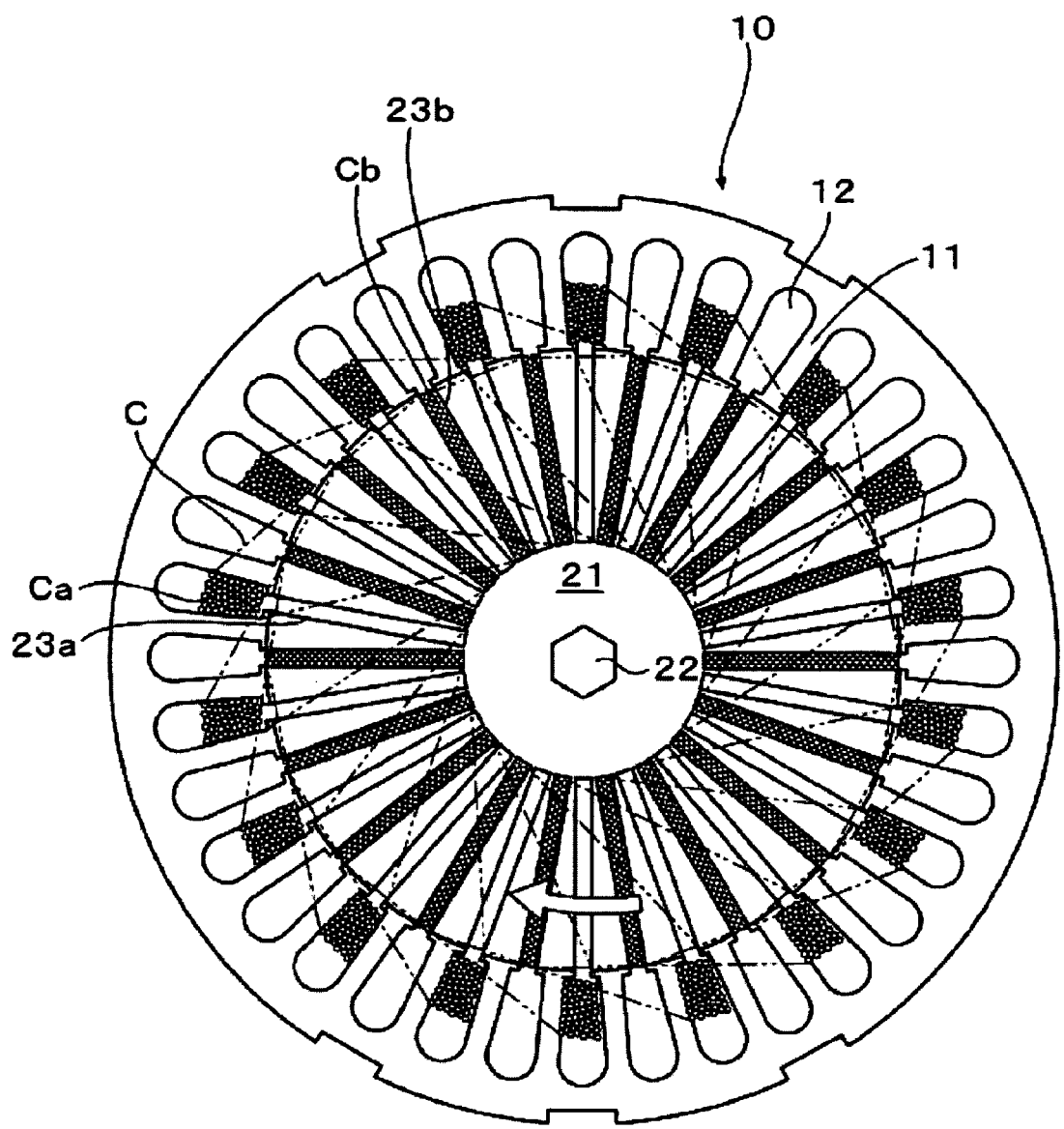
FIG. 29 is a top view showing a state where the jig is rotated by a prescribed angle in such a way that the second holding groove for holding the other side of the coil may be positioned in a prescribed slot.

After removing the pusher 34 thus, as shown in FIG. 29, the jig 20 is rotated by a prescribed angle and positioned in such a way that the other side Cb of the coil C can match the sixth slot 12 ahead from one in which the one side Ca is inserted.

Figure 30:
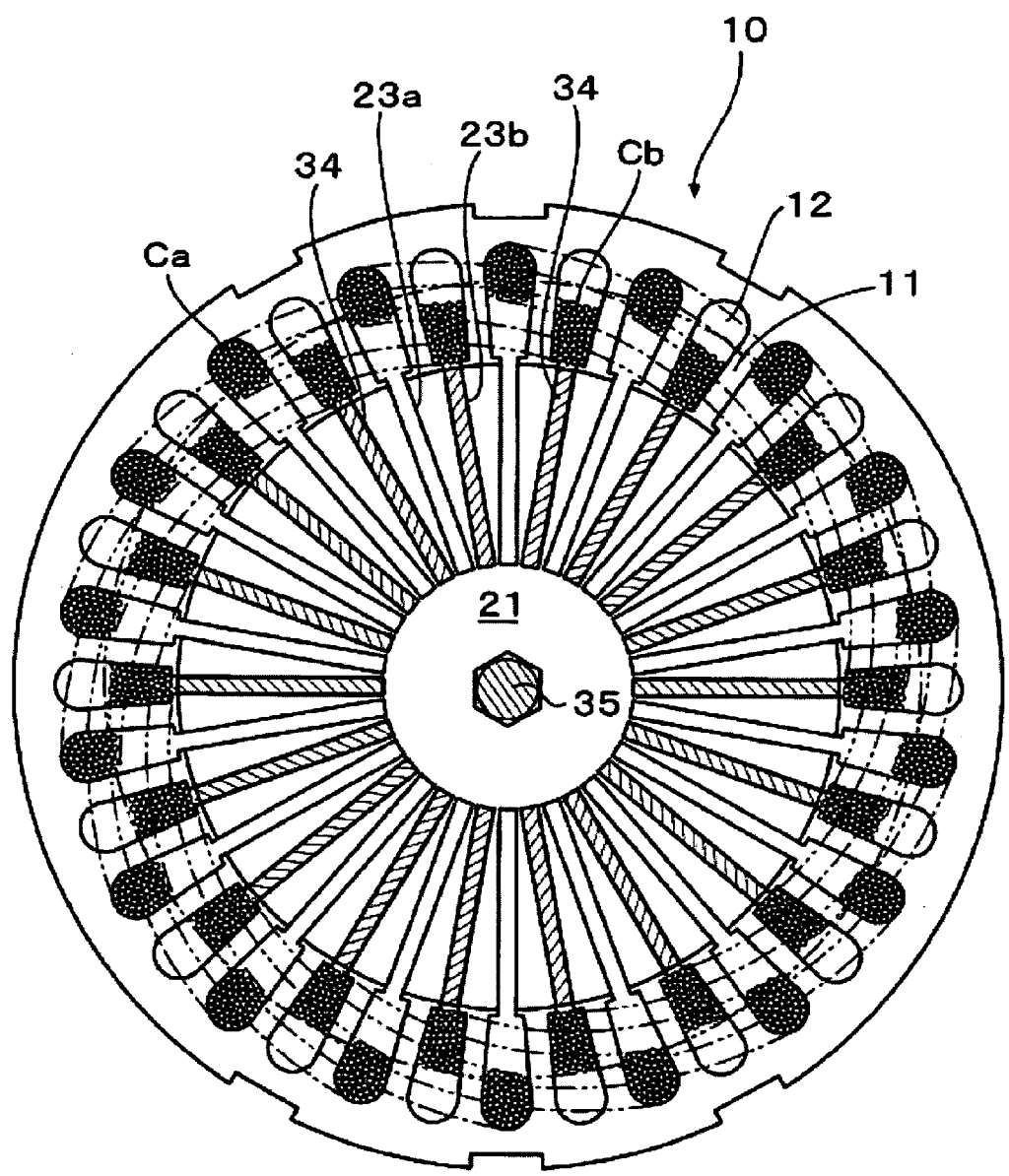
FIG. 30 is a top view showing a state where the pusher is inserted in the second holding groove and the other side of the coil is inserted in a corresponding slot.

Then, as shown in FIG. 30, the pusher 34 is rotated and positioned in such a way as to match the second holding groove 23b this time, the ring 33 is slid downward against the shaft 31 in that state and the pusher 34 is inserted in the second holding groove 23b first from its bottom end. As a result, the other side Cb of the coil C inserted in the second holding groove 23b is pushed out to the outside radius and is inserted in the slot 12.

Thus, the coil C is inserted with one side Ca and the other side Cb of are inserted in one slot 12 and the sixth slot ahead from the slot, respectively. Since this insertion work is simultaneously applied to a plurality of coils C, the coils C are inserted in such a way that their coil ends may form a spiral when viewed from the end surface of the stator core 10.

Figure 31:
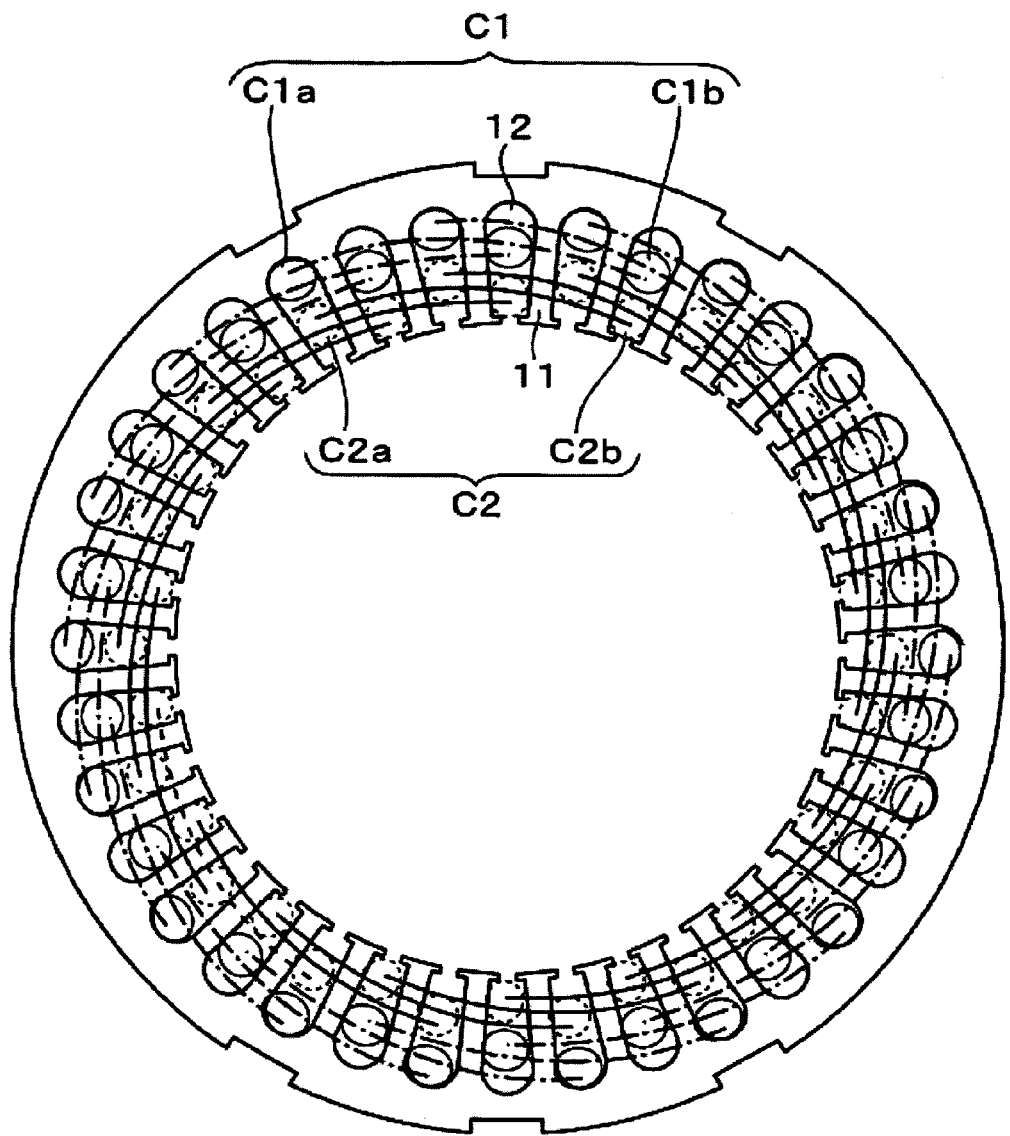
FIG. 31 shows a state where the inserting operation is repeated twice in the preferred embodiment.

Then, in this preferred embodiment, the above-described inserting operation is repeated twice. As a result, as shown in FIG. 31, one side C1a or the other side C1b of the coil C1 inserted in the first process is inserted in the outside radius side of the slot 12 and one side C2a or the other side C2b of the coil C2 inserted in the second process is inserted in the inside radius side of the slot 12. Specifically, one sides C1a and C2a of the coils C1 and C2 are overlapped inside and outside and inserted in the slot 12 in which coils are inserted from the first holding groove 23a of the jig 20 and the other sides C1b and C2b of the coils C1 and C2 are overlapped inside and outside and inserted in the slot 12 in which coils are inserted from the second holding groove 23b of the jig 20.

Figure 33:
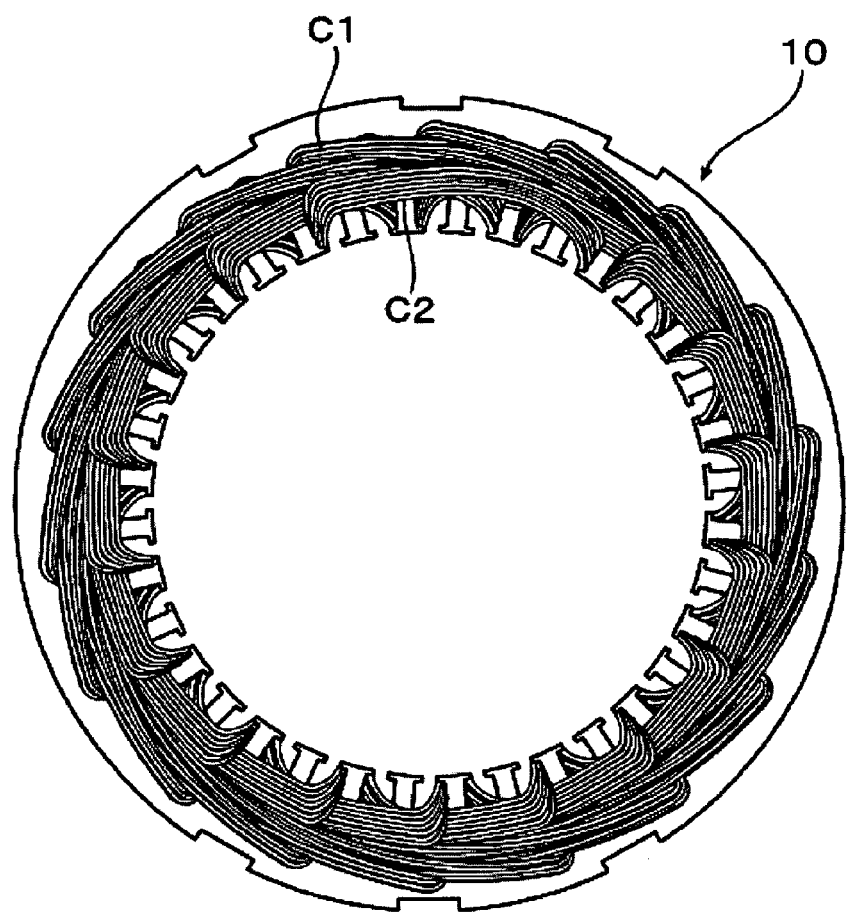
FIG. 33 is a top view showing the shape of the end surface of the stator obtained in the preferred embodiment.

In the stator formed thus, as shown in FIGS. 31 and 33, the coil ends of the coils C1 inserted in the first process are formed in a spiral on the outside radius side and similarly the coil ends of the coils C2 inserted in the second process are formed in a spiral in its inside.

Figure 32:
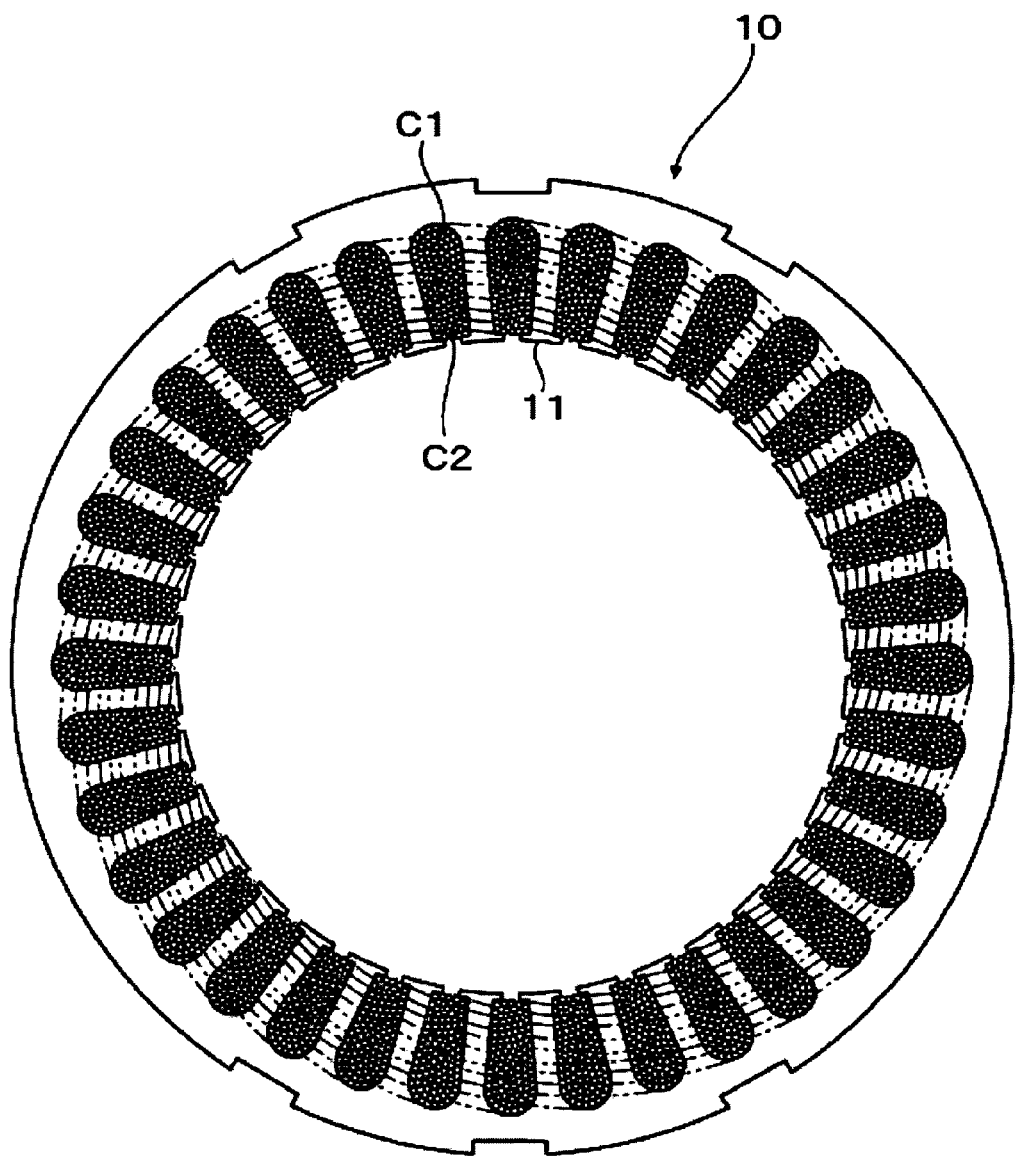
FIG. 32 is the cross section view of the coil filled in the slot of the stator core obtained in the preferred embodiment.

According to this preferred embodiment, even when coils C sufficient to fill one slot 12 cannot be inserted in the holding groove 23 of the jig 20, by repeating the inserting operation twice, as shown in FIG. 32, sufficient coils C can be inserted. The number of the insertion processes is not limited to twice and it can be also repeated three times or more.

Since in each of the loop of the coils C1 and loop of the coils C2 overlapped in a spiral, one of one side of each coil is inserted in each slot 12, the coils in the radius direction uniformly overlap and their coil ends becomes more uniform and compact. Therefore, the coil occupancy ratio in the slot becomes further higher and the coil ends become further shorter, thereby obtaining a higher-performance stator.

FIG. 34 is the side view of the stator manufactured thus. In this way, the coil ends of the coil C projected from each end of the stator core 10 have fairly low height and become uniform across the entire perimeter.

Since the other side Cb is inserted after one side Ca of the coil C held by the jig 20 is inserted and is rotated and positioned, the coil C is appropriately expanded in the perimeter direction and is inserted by the rotation/positioning. Since the coil C is inserted from the inside radius side against the inner teeth of the stator core 10 differently from a normal method of inserting a coil from one end toward the other end of the stator core, the coil C is appropriately expanded in the perimeter direction and is inserted. Therefore, the coil ends can be reduced.

Since in this stator too, coils C are partially overlapped and arrayed in the perimeter direction, cogging-torque unevenness becomes very little and vibration and noise can be remarkably reduced when using this stator for a motor. Since the coil ends are compact and uniformly project, the stator core 10 and a motor using it can be made compact.

If as to this stator, the total sectional area Scu of the coil wires W that can be inserted in the slot 12 is studied with reference to FIG. 22, the result is as follows. Specifically, as described earlier, if it is assumed that the coil wires W are aligned in a row in the holding groove 23 when the total coil sectional areas inserted in the slot 12 of the stator core 10, the inside radius of the stator core 10, the radius of the shaft unit 21, the number of slots and the diameter of the coil wire are Scu, Rin, Rdd, Slot and d, respectively, the total sectional area of the coil wires W that can be inserted in the holding groove 23 becomes at most (Rin−Rdd)×d, which is the maximum total sectional area of the coil wires W that can be inserted in the slot 12 from one holding groove 23.

Since in this preferred embodiment, the coil wires W held in one holding groove 23 are inserted in one slot 12 by one inserting operation, the maximum total sectional area of the coil wires W that can be inserted in the slot 12 by one inserting operation (a series of inserting operations shown in FIGS. 25~30) becomes (Rin−Rdd)×d.

However, since in this preferred embodiment a stator in which the coils C overlapped in a spiral are inserted in such a way as to form a multiple loop by repeating the above-described inserting operation twice is targeted, in the stator obtained in this preferred embodiment, the total sectional area of the coil wires W inserted in the slot 12 becomes at least larger than the total sectional area of the coil wires W calculated according to the above-described (Rin−Rdd) ×d. Since the perimeter of the shaft unit 21 can be falsely expressed by d×Slot, the radius Rdd of the shaft unit 21 can be obtained by dividing this by 2π, that is, according to d×Slot/2π. Therefore, the stator obtained in this preferred embodiment is one which satisfies the following expression (3).

$$Scu > (Rin-Rdd) \times d = \{Rin-(d \times Slot/2\pi)\} \times d = Rin \cdot d - Slot \cdot d^2/2\pi \quad (3)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots and the diameter of the coil wire, respectively.

FIGS. 35~39 show a manufacturing example of a stator according to another preferred embodiment of the present invention.

In this preferred embodiment, one set of the first holding groove 23a and second holding groove 23b of the holding groove 23 of the jig 20 are provided in relation to the slot 12 of the stator core 10. Specifically, the number of the holding grooves is double that of the jig 20 shown in FIG. 25 and the like. In other words, each of the first holding grooves 23a and the second holding grooves 23b are arrayed with the same pitch as that of the slot 12. As a result, since the farther toward the inside radius the holding groove 23 is positioned, the narrower its space becomes remarkably, the holding groove 23 is formed in such a way that the groove width on the inside radius side of each holding groove 23 may become narrower than the groove width on the outside radius side. When the strength of the jig 20 can be secured sufficiently, when the stator core 10 and the jig 20 are sufficiently large and the space can be secured even if the number of the holding grooves is doubled and the like, there is no need to narrow the groove width on the inside radius side of the holding groove 23. The coil C is inserted and held with one side Ca and the other side Cb of it inserted and held in the first holding groove 23a and the second holding groove 23b adjacent the first holding groove 23a, respectively. Thus, the same number of coils C as that of the slots 12 of the stator core 10 are arrayed along the perimeter of the jig 20.

Figure 35:
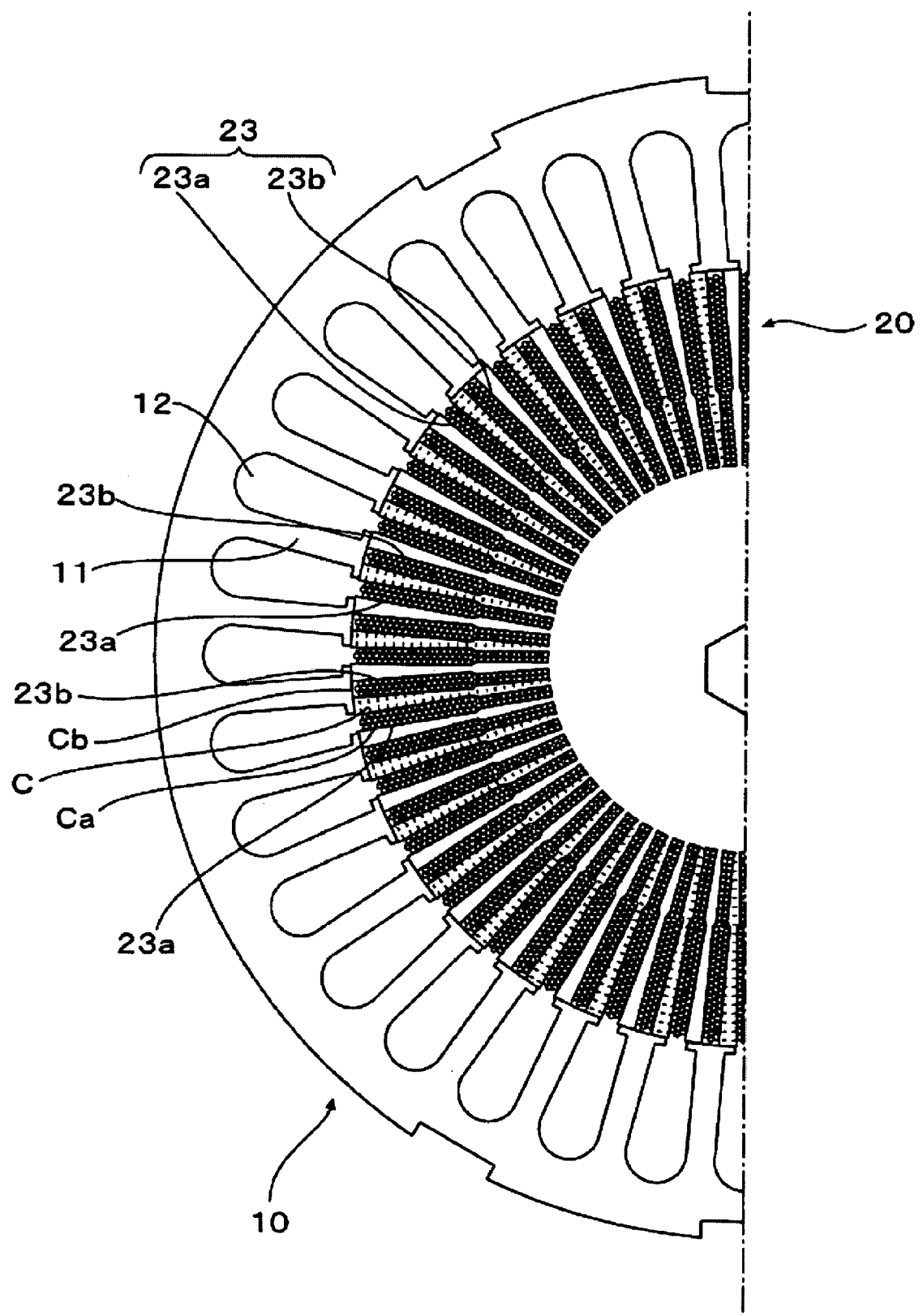
FIG. 35 is the partially enlarged top view of another preferred embodiment of the manufacturing method for manufacturing the stator according to the present invention.

FIG. 35 shows the state where this jig 20 is inserted and disposed in the inner perimeter of the stator core 10 and is rotated and positioned in such a way as to match the first holding groove 23a with each corresponding slot 12. In this state, one side Ca of the coil C held in the first holding groove 23a can be inserted in the corresponding slot 12 using the earlier-described pushing means, such as the pressing jig 30 shown in FIG. 1 and the like.

Figure 36:
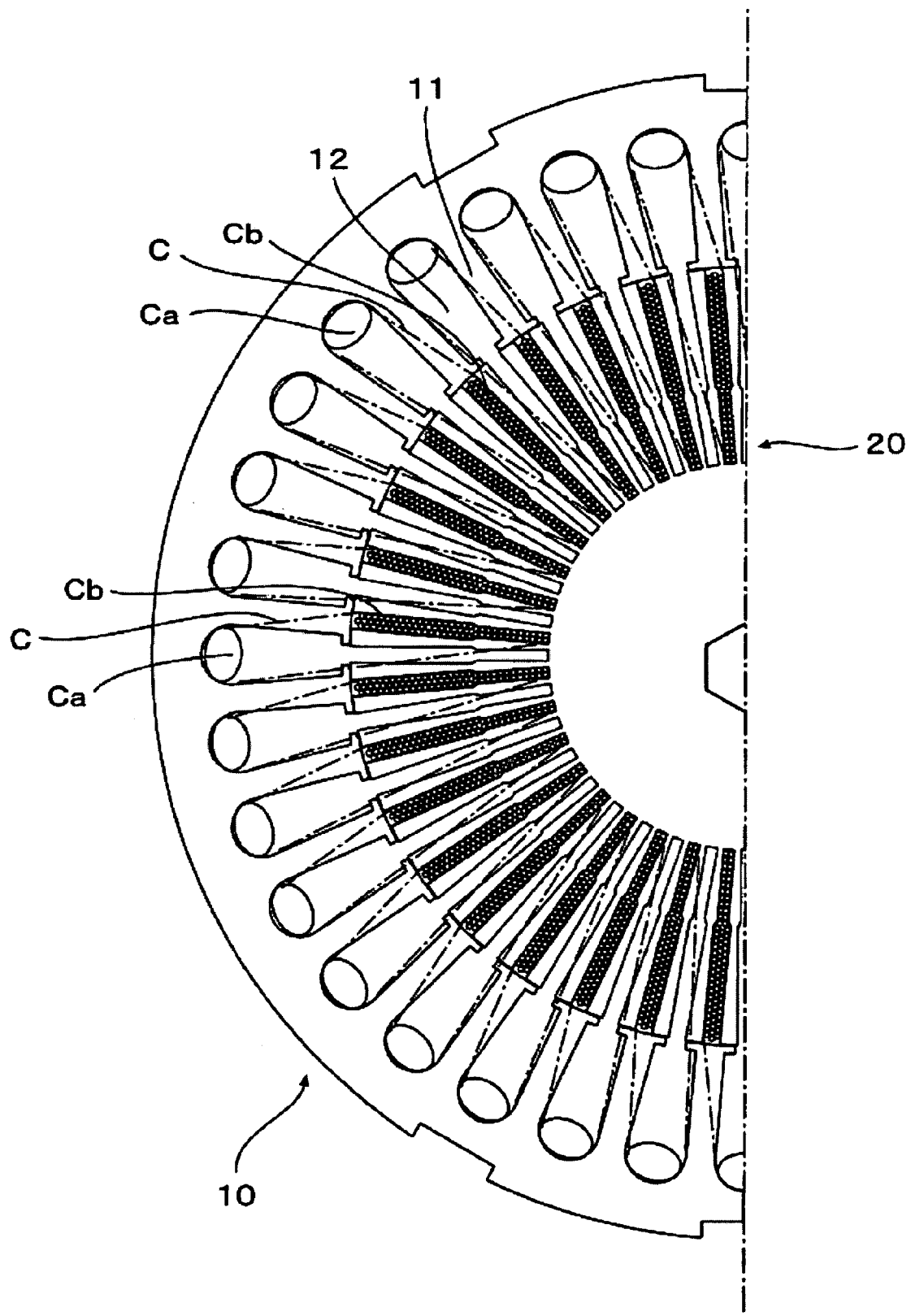
FIG. 36 is a partially enlarged top view showing a state where one side of the coil is inserted in the slot in the preferred embodiment.

FIG. 36 shows the state where one side Ca of the coil C is inserted in each corresponding slot 12. Specifically, one sides Ca of the corresponding coils C are inserted in all the slots 12 of the stator core 10.

Figure 37:
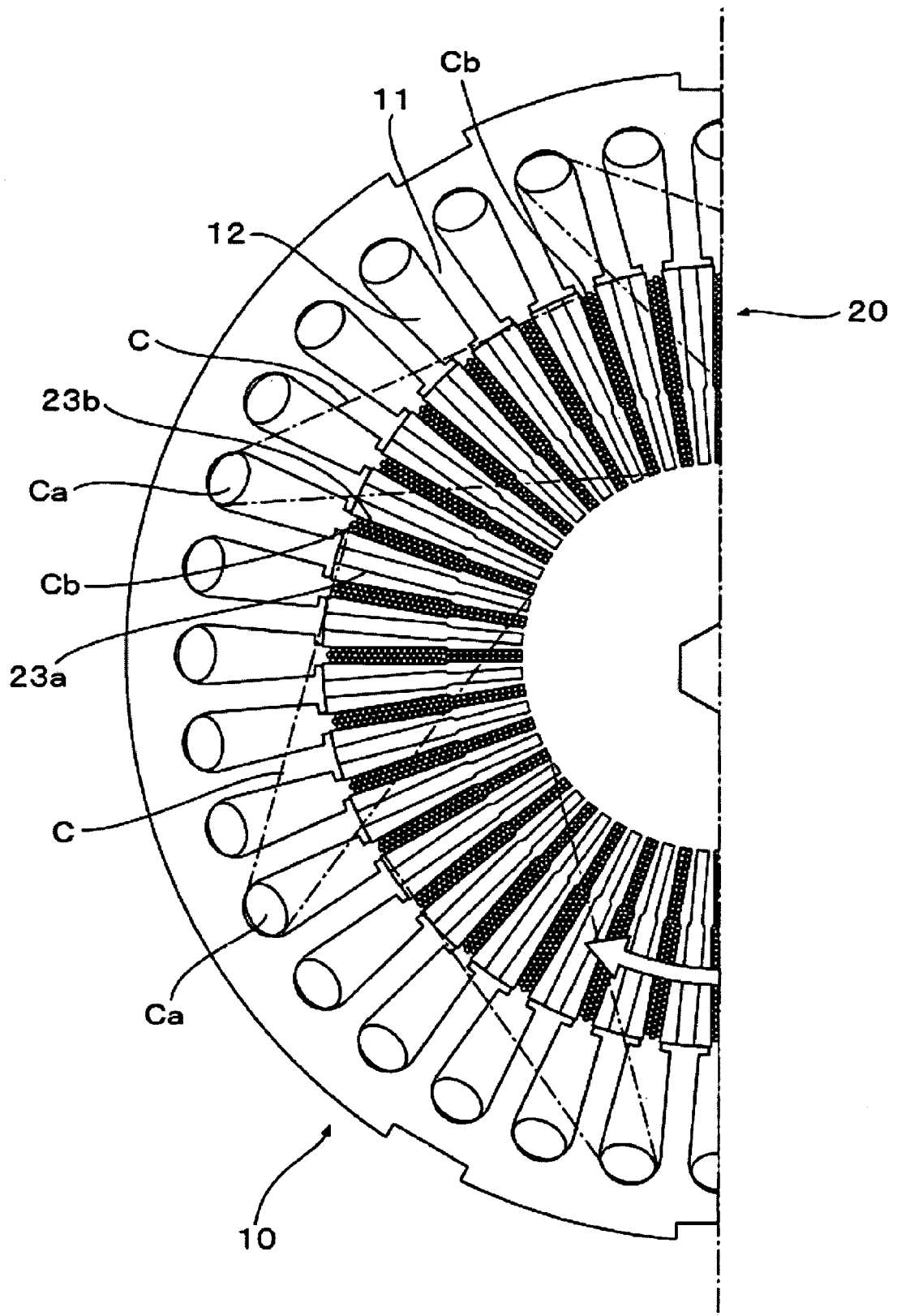
FIG. 37 is a partially enlarged top view showing a state where the second holding groove holding the other side of the coil is rotated and positioned in such a way as to match a corresponding slot in the preferred embodiment.
Figure 38:
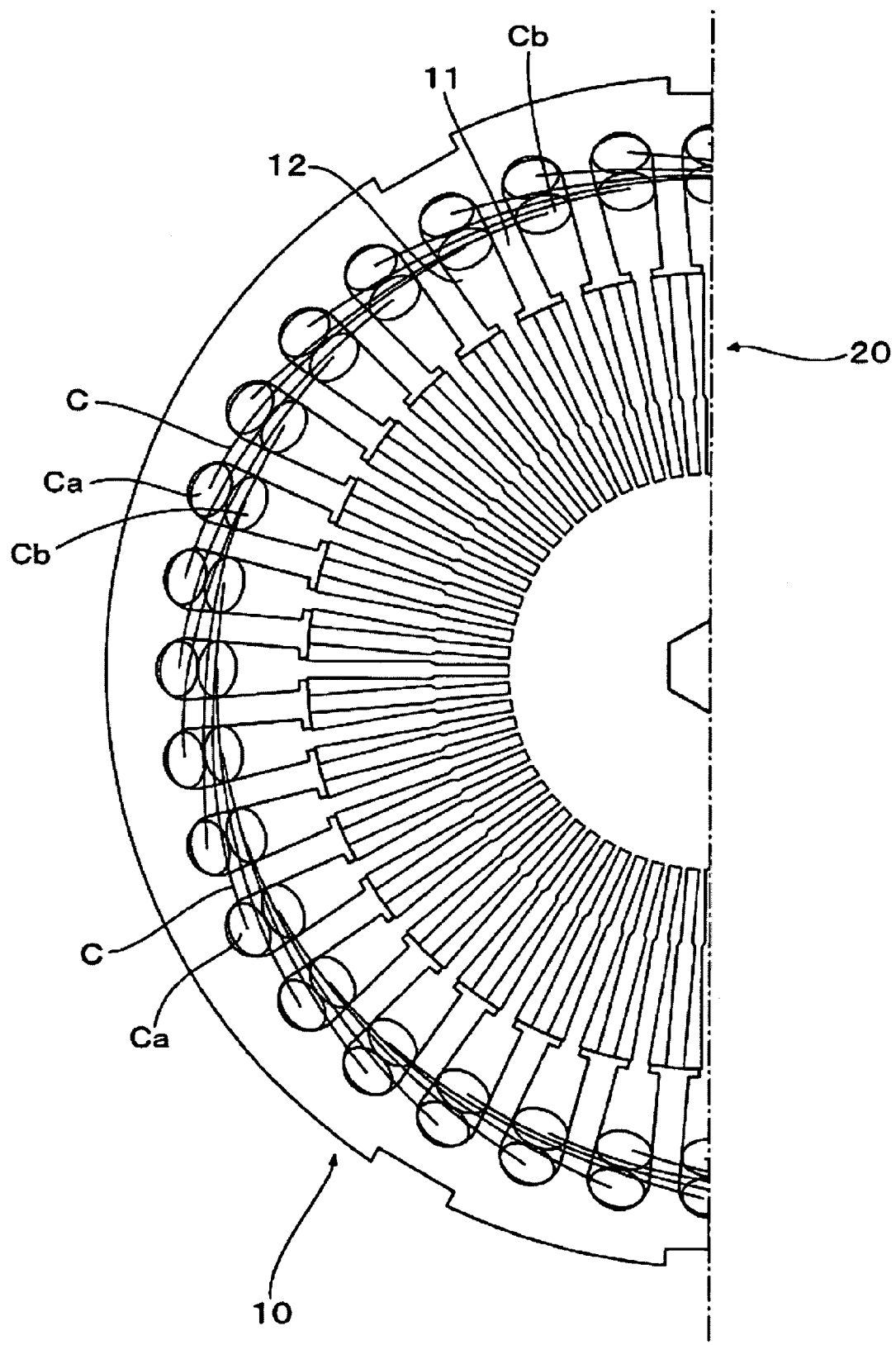
FIG. 38 shows a state where the other side of the coil is inserted in the corresponding slot in the preferred embodiment.

Then, as shown in FIG. 37, the jig 20 is rotated by a prescribed angle and is positioned in such a way that the second holding groove 23b holding the other side Cb of the coil C can match a prescribed slot 12, the sixth slot 12 ahead from one in which the one side Ca is inserted, in the case of this preferred embodiment. In this state, the other side Cb of the coil C held in the second holding groove 23b is pushed out to the outside radius side and is inserted in a corresponding slot 12 using a pushing means, such as the earlier-described pressing jig 30 again. As a result, as shown in FIG. 38, one side Ca of the coil C is inserted in the outside radius side of each slot 12 and the other side Cb of another coil C is inserted in the inside radius side of the slot 12. Thus, two coils are inserted in one slot 12. Thus, coils each with one side Ca and the other side Cb positioned in the outside and inside radius sides, respectively, form coil ends overlapped in a spiral on the end surface of the stator core 10.

Figure 39:
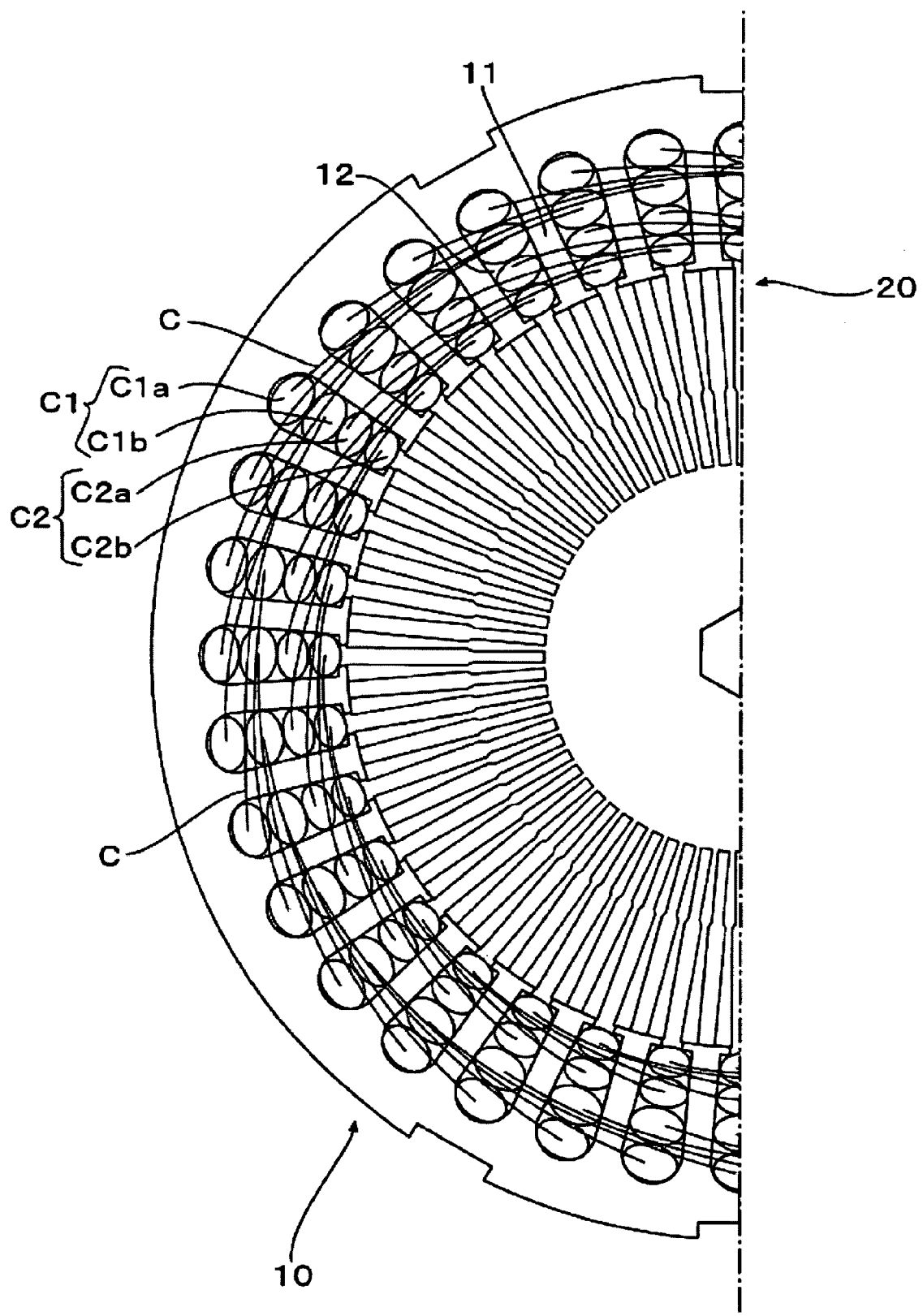
FIG. 39 shows a state where the inserting operation is repeated twice in the preferred embodiment.

Then, in this preferred embodiment, the above-described inserting operation is repeated twice. As a result, as shown in FIG. 39, one side C1a and the other side C1b of the coil C1 inserted in the first process are inserted in the outside radius side of the slot 12 and one side C2a and the other side C2b of the coil C2 inserted in the second process are inserted in the inside radius side of the slot 12. Specifically, four coils C1a, C1b, C2a and C2b in total are overlapped inside and outside and inserted in the slot 12 of the jig 20. The coil ends of the coils C1 inserted in the first process are formed in a spiral on the outside radius side and similarly the coil ends of the coils C2 inserted in the second process are formed in a spiral on the inside radius side. Thus, the coil ends are doubly formed in a spiral.

According to this preferred embodiment, even when coils C sufficient to fill one slot 12 cannot be inserted in the holding groove 23 of the jig 20, by repeating the inserting operation twice, sufficient coils C can be inserted. The number of the insertion processes is not limited to twice and it can be also repeated three times or more.

Figure 40:
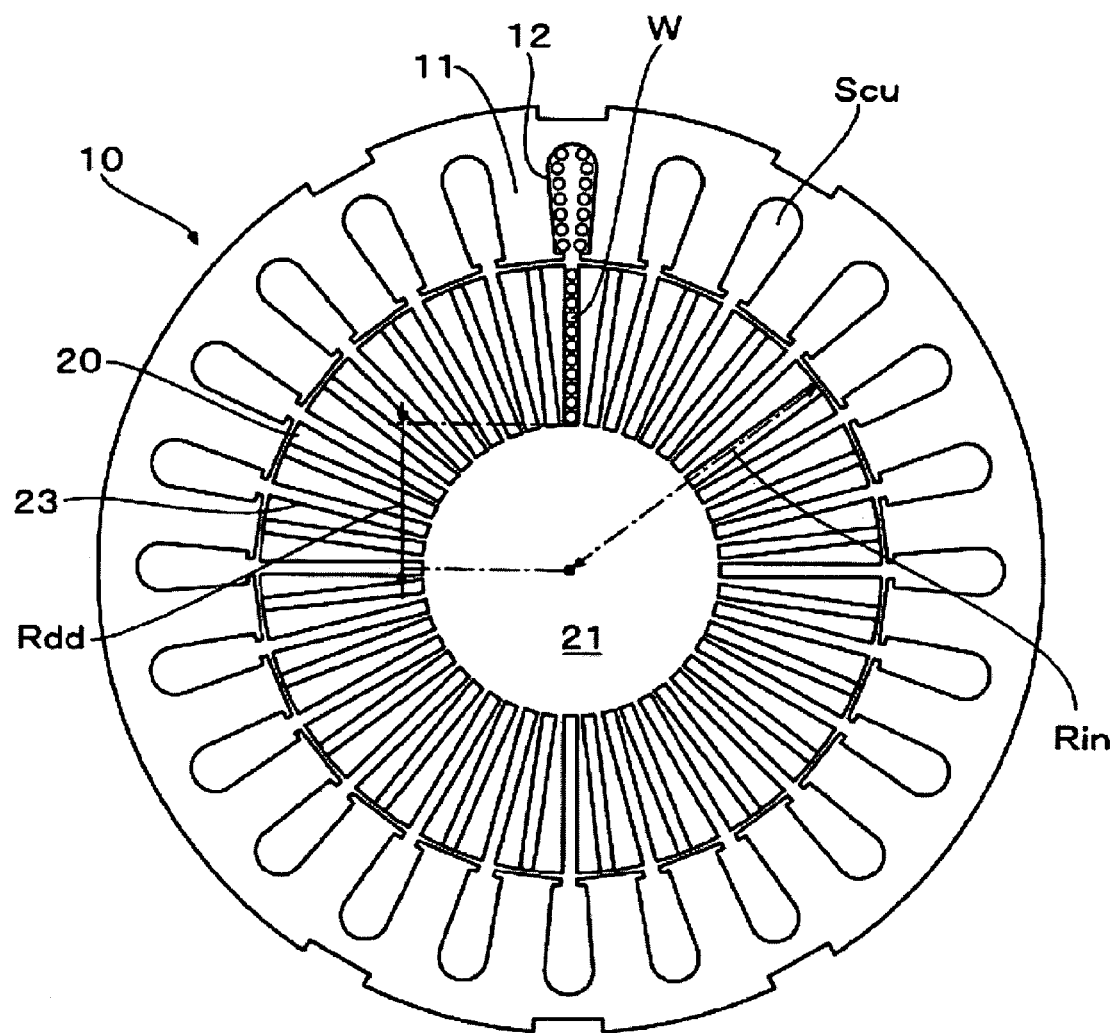
FIG. 40 shows a relationship between the holding groove of the jig and the slot of the stator core in the preferred embodiment.

If as to this stator, the total sectional area Scu of the coil wires W that can be inserted in the slot 12 is studied with reference to FIG. 40, the result is as follows. Specifically, as described earlier, if it is assumed that the coil wires W are aligned in a row in the holding groove 23 when the total coil sectional areas inserted in the slot 12 of the stator core 10, the inside radius of the stator core 10, the radius of the shaft unit 21, the number of slots and the diameter of the coil wire are Scu, Rin, Rdd, Slot and d, respectively, the total sectional area of the coil wires W that can be inserted in the holding groove 23 becomes at most (Rin−Rdd)×d, which is the maximum total sectional area of the coil wires W that can be inserted in the slot 12 from one holding groove 23.

Since in this preferred embodiment, the coil wires W held in two holding groove 23 are inserted in one slot 12 by one inserting operation, the maximum total sectional area of the coil wires W that can be inserted in the slot 12 by one inserting operation (a series of inserting operations shown in FIGS. 35~38) becomes 2×(Rin−Rdd)×d.

However, since in this preferred embodiment a stator in which the coils C overlapped in a spiral are inserted in such a way as to form a multiple loop by repeating the above-described inserting operation twice is targeted, in the stator obtained in this preferred embodiment, the total sectional area of the coil wires W inserted in the slot 12 becomes at least larger than the total sectional area of the coil wires W calculated according to the above-described 2×(Rin−Rdd)×d. Since the perimeter of the shaft unit 21 can be falsely expressed by 2×d×Slot, the radius Rdd of the shaft unit 21 can be obtained by dividing this by 2π, that is, according to d×Slot/π. Therefore, the stator obtained in this preferred embodiment is one which satisfies the following expression (4).

$$Scu>2\times(Rin-Rdd)\times d=2\times\{Rin-(d\times Slot/\pi)\}\times d=2\cdot Rin\cdot d-2\cdot Slot\cdot d^2/\pi \qquad (4)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots and the diameter of the coil wire, respectively.

Figure 41:
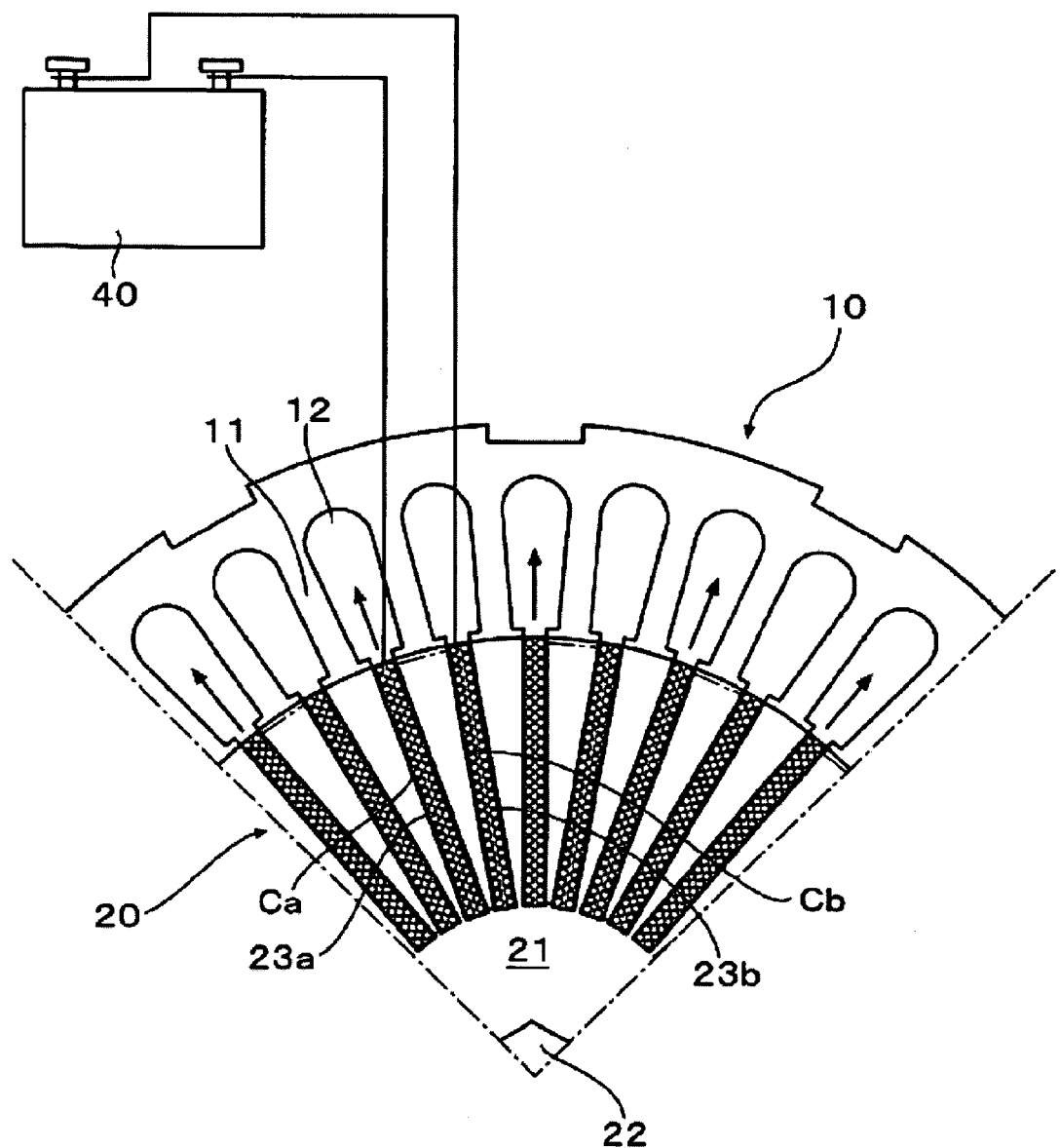
FIG. 41 shows another example of the pushing means in each of the above-described preferred embodiments.
Figure 42:
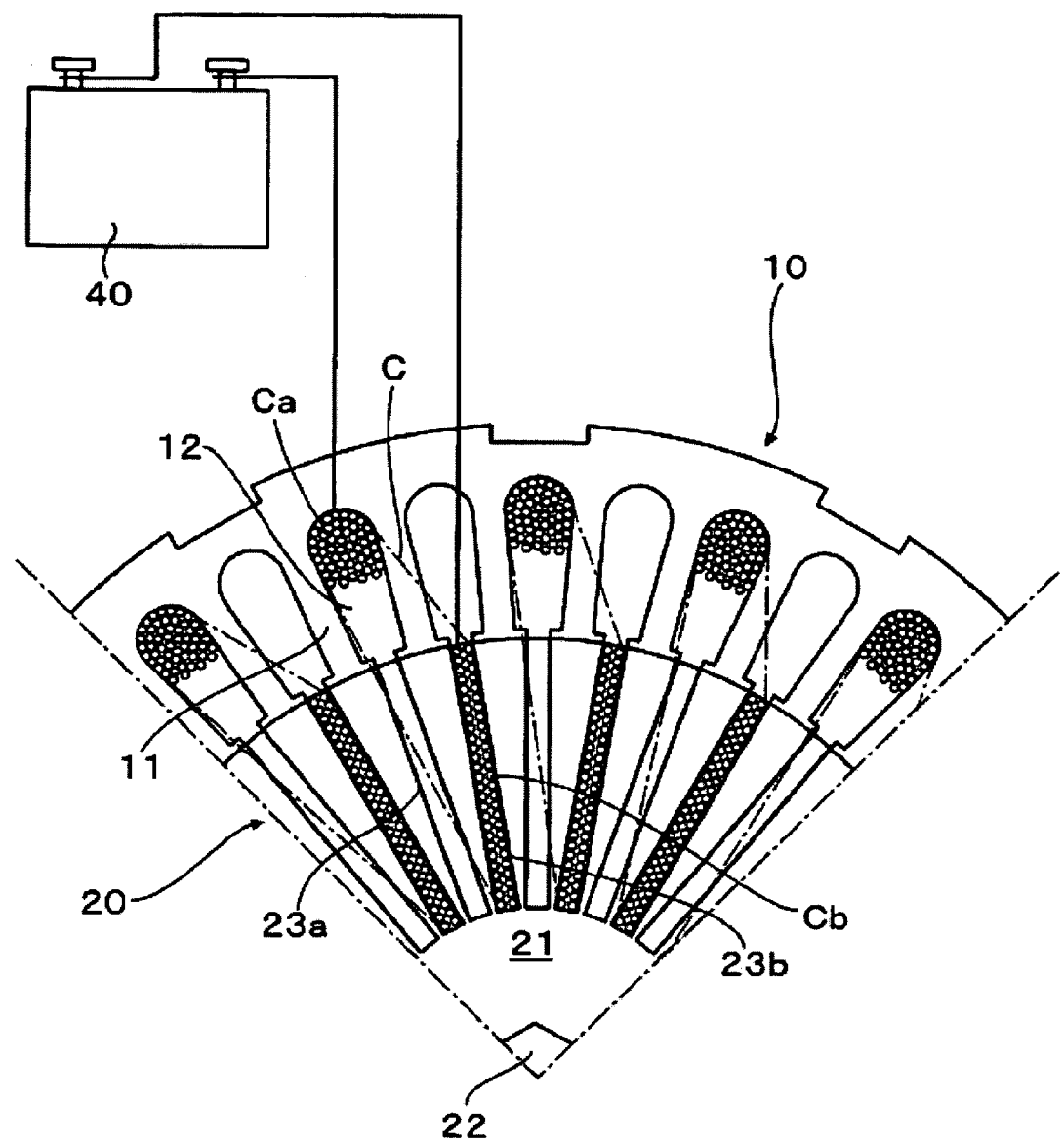
FIG. 42 shows a state where one side of the coil is inserted by the pushing means.

FIGS. 41 and 42 show another example of the pushing means for the coil C in the above-described manufacturing example.

In this example, the jig 20 is made of, for example, non-magnetic material, such as aluminum and the like, a power supply 40 is connected to each end of the coil C and current is passed through the coil inserted and held in the holding groove 23 of the jig 20. In the state shown in FIG. 41, the other side Cb of the coil C inserted in the second holding groove 23b is provided with a stopper, which is not shown in FIG. 41, in the exit of the second holding groove 23b to prevent the other side Cb from being pushed out to the outside radius side. When rapid transient current is passed through the coil C in this state, repulsive force generated due to eddy current acts to push out the coil C to the outside radius side.

As a result, as shown in FIG. 42, one side Ca of the coil C is inserted in the corresponding slot 12. Then, current is temporarily cut, the jig 20 is rotated by a prescribed angle against the stator core 10 and is positioned in such a way that the other side Cb of the coil C can be positioned in a prescribed slot 12, for example, in the sixth slot 12 ahead from it. Then, by releasing the stopper of the second holding groove 23b and passing current through the coil C as described earlier, this time the other side Cb can be inserted in a corresponding slot 12. Thus, since the coil can be pushed out to the outside radius side only by passing current, the structure of the manufacturing device can be simplified and the coils can be rapidly inserted.

Figure 43:
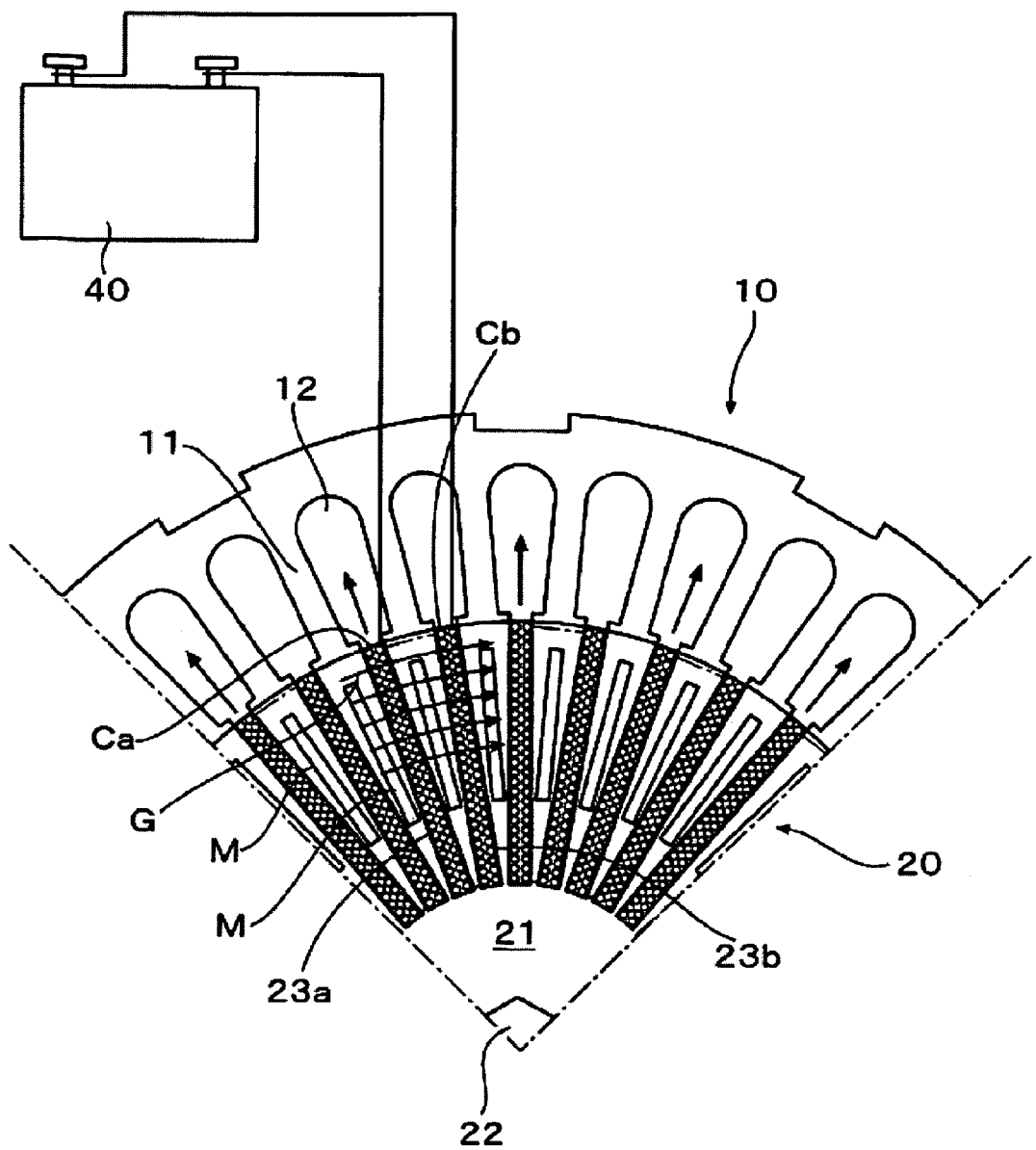
FIG. 43 shows another example of the pushing means in each of the above-described preferred embodiments.
Figure 44:
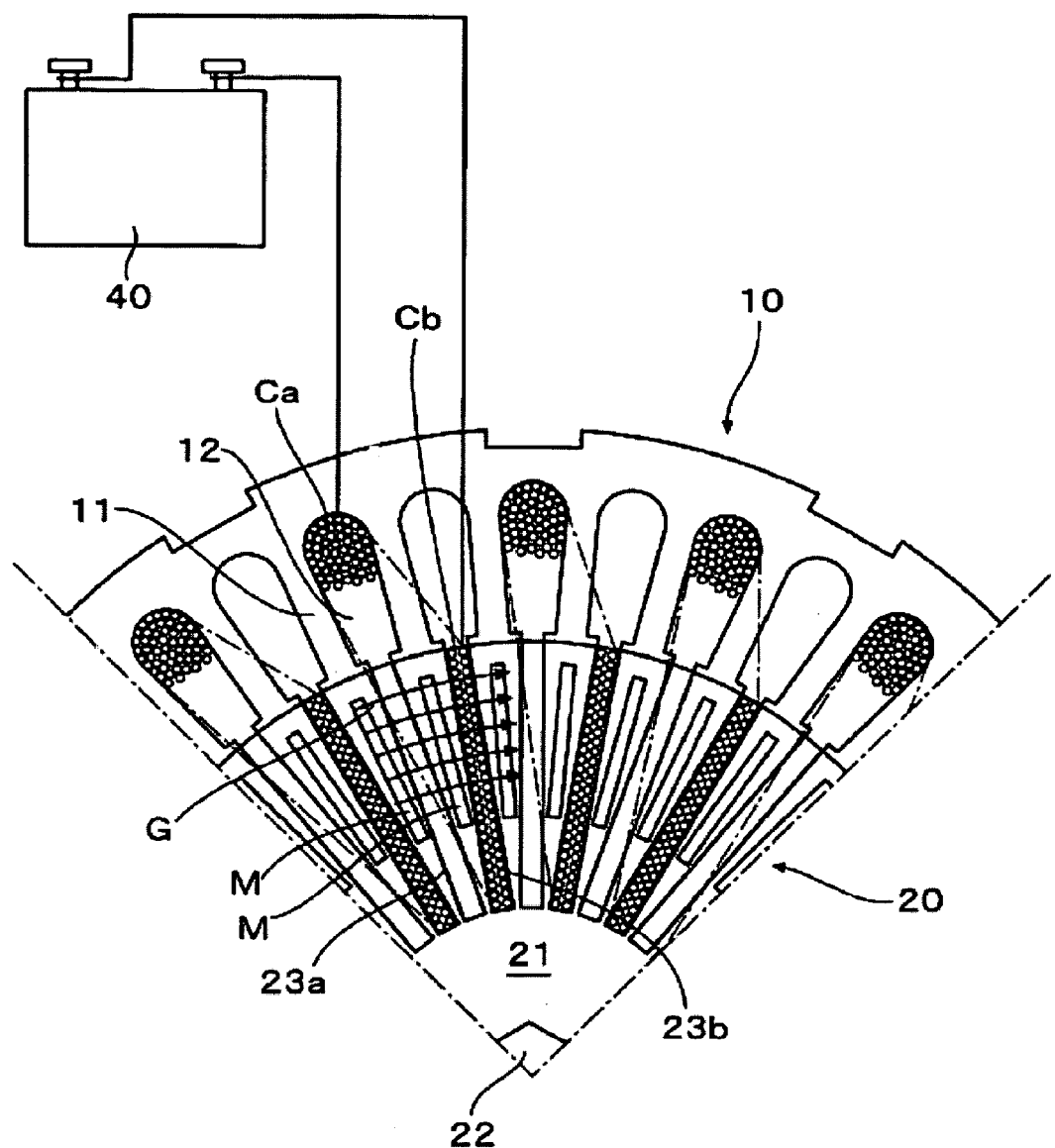
FIG. 44 shows a state where one side of the coil is inserted by the pushing means.

FIGS. 43 and 44 show another example of the pushing means for the coil C.

In this example, a permanent magnet M is laid and disposed in each radial separator wall positioned between the holding grooves 23 of the jig 20 and a magnetic field G crossing each holding groove 23 in the perimeter direction are formed by this permanent magnet M. When current is passed through the coil C using the power supply 40 in this state, Lorentz force is generated to act to generate force pushing to the outside radius side and force pushing to the inside radius side in one side and the other side, respectively, of the coil C to act.

In the state shown in FIG. 43, force pushing to the outside radius side and force pushing to the inside radius side act in one side Ca and the other side Cb, respectively, of the coil C. As a result, as shown in FIG. 44, one side Ca of the coil C is inserted in a corresponding slot 12 and the other side Cb continues to be inserted in the second holding groove 23b.

Thus, after one side Ca of the coil C is inserted in the slot 12, the jig 20 is rotated by a prescribed angle against the stator core 10 and is positioned in such a way that the second holding groove 23b inserting the other side Cb of the coil C can be located in a prescribed slot.

Then, as described earlier, after the second holding groove 23b is disposed in the prescribed slot 12, the power supply 40 is switched over to pass current in a direction the reverse of the above this time. Then, fore pushing to the outside radius side acts in the other side Cb of the coil C to insert the other side Cb in a corresponding slot 12.

Figure 45:
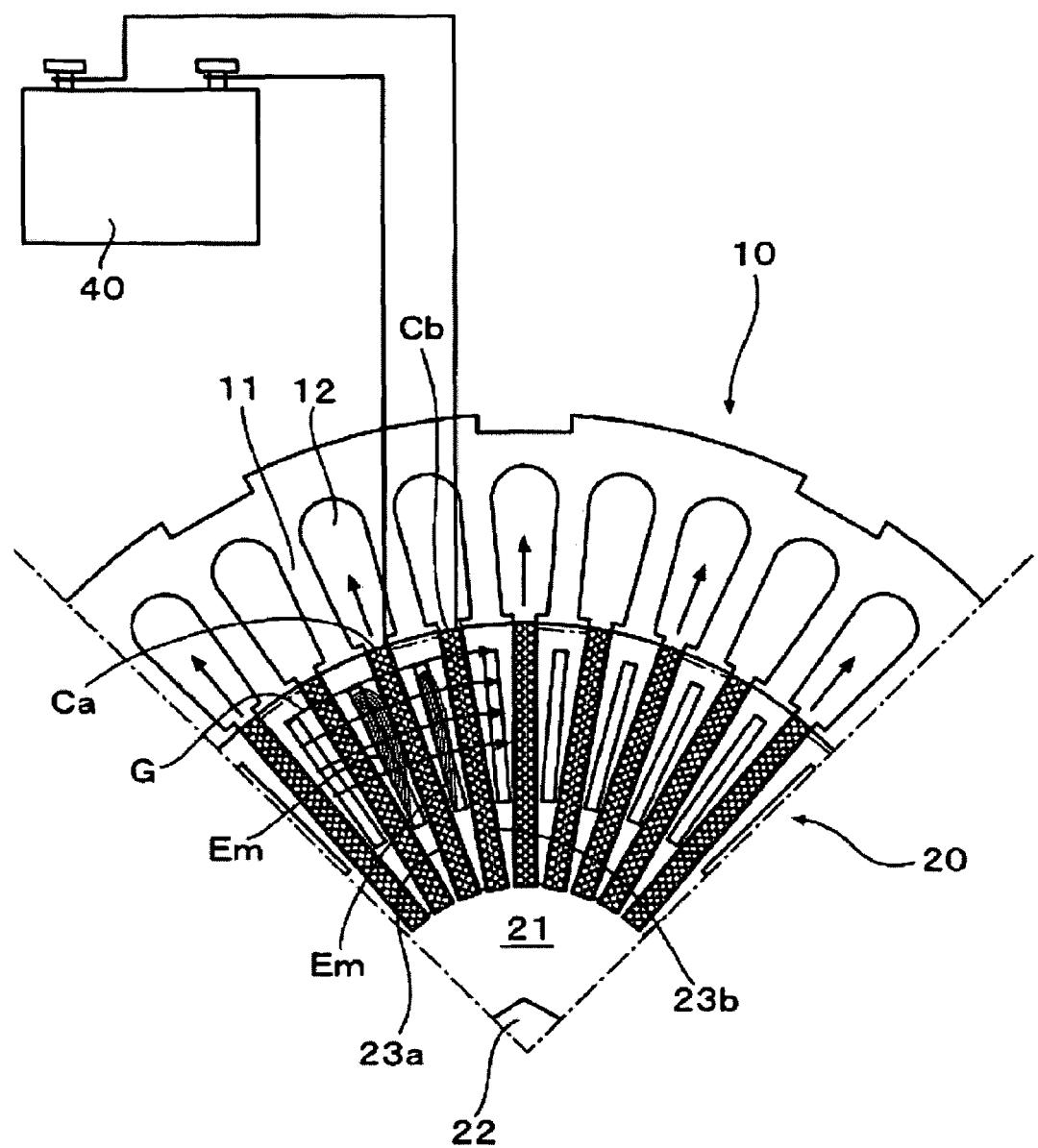
FIG. 45 shows another example of the pushing means in each of the above-described preferred embodiments.
Figure 46:
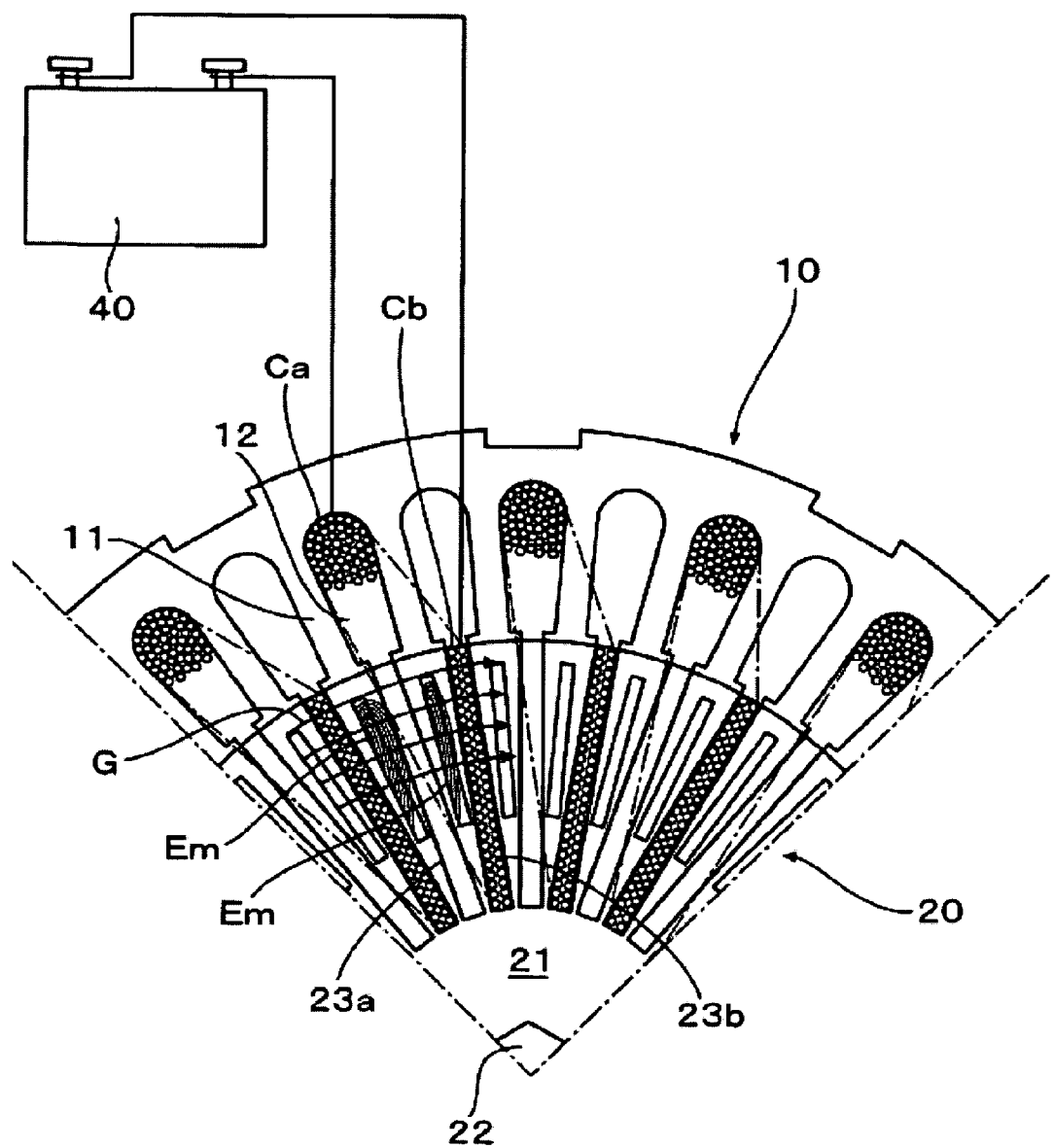
FIG. 46 shows a state where one side of the coil is inserted by the pushing means.

FIGS. 45 and 46 show another example of the pushing means for the coil C.

This example is basically the same as that shown in FIGS. 43 and 44 except for that in this example, an electro-magnet Em is used instead of the permanent magnet M. Specifically, an insertion groove extending the shaft direction is formed on the separator wall formed between the holding grooves 23 in advance, the electromagnet Em is inserted in this insertion groove and by passing current through this electro-magnet Em from a power supply circuit, which is not shown in FIGS. 45 and 46, the magnetic field G crossing each holding groove 23 in the perimeter direction is formed. Therefore, by passing current through the coil C in this state, as in the above-described preferred embodiment, force pushing to the outside radius side and force pushing to the inside radius side can be generated to act in one and the other sides, respectively, of the coil C. Thus, as in the above-described preferred embodiment, each coil can be inserted in slot 12.

Alternatively, when the other side Cb is inserted in the slot 12 after one side Ca is inserted in the slot 12, current can be passed through the electro-magnet Em in a direction the reverse of the above instead of passing current through the coil C in the opposite direction and the direction of the magnetic field G can be reversed.

FIG. 45 shows the state where one side Ca of the coil C is pushed out to the outside radius side and FIG. 46 shows the state where the one side Ca is inserted in the slot 12.

Figure 47:
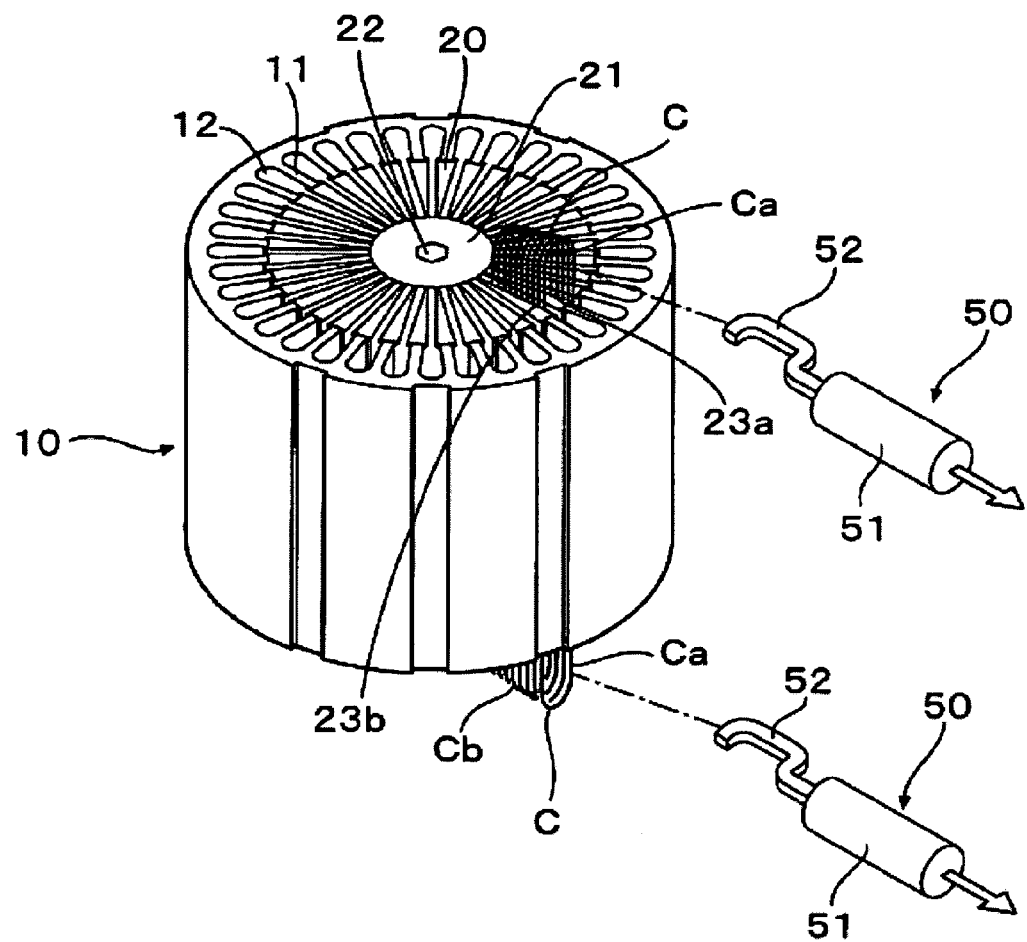
FIG. 47 shows another example of the pushing means in each of the above-described preferred embodiments.
Figure 48:
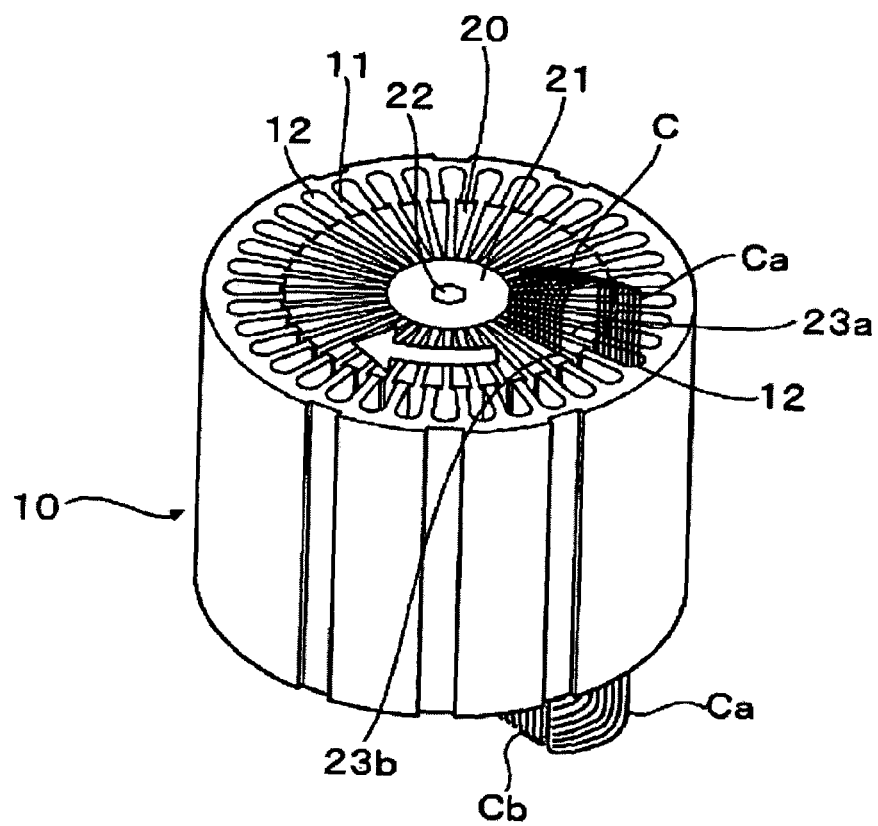
FIG. 48 shows a state where one side of the coil is inserted by the pushing means.
Figure 49:
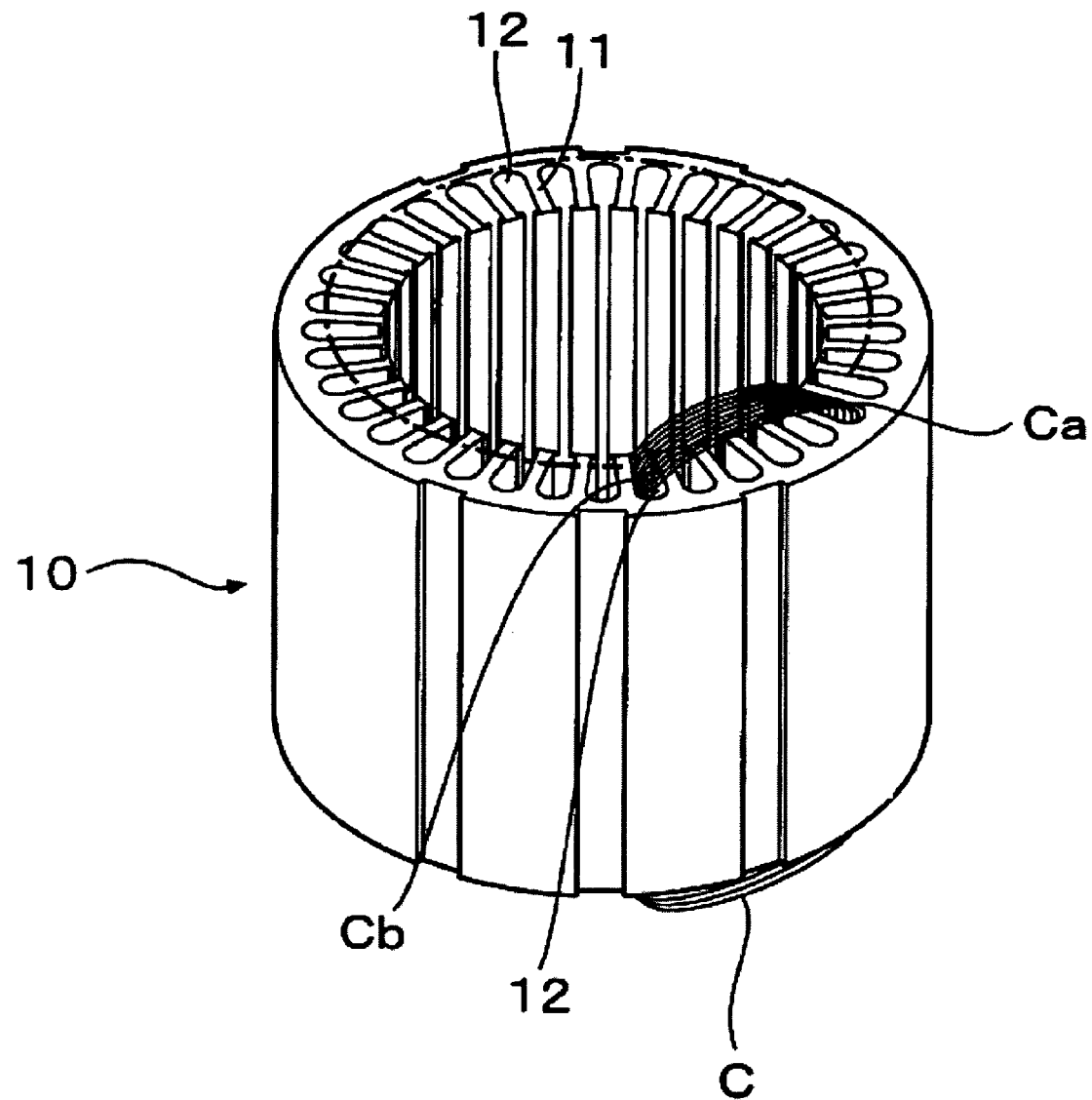
FIG. 49 is a perspective view showing a state where both sides of the coil are inserted in the slots of the stator core by the pushing means.

FIGS. 47~49 show another example of the pushing means for the coil C.

In this example, a pulling device 50 is used for the pushing means for the coil C. The pulling device 50 is disposed on each end surface of the stator core 10 and comprises an arm 51 provided in the neighborhood of this each end surface in such a way as to advance and retreat in the radius direction and a hook 52 attached to the tip of this arm 51. After the arm 51 is made to advance in the inside radius direction of the stator core 10 and the hook 52 is hung on either side of the coil C, by making the arm 51 retreat in the outside radius direction, the side of the coil C can be pulled out to the outside radius side. By hanging the side of the coil C on the hook 52 and pulling it to the outside radius side using a pair of pulling devices 50 disposed in the vicinity of each end surface of the stator core 10, the coil C is pushed in the corresponding slot 12 of the stator core 10 from the holding groove 23.

Although FIG. 47 shows only one pair of pulling devices 50, actually a pair of pulling devices 50 are disposed in a radial shape in the outer perimeter of the stator core 10 in relation to each coil C. Although FIG. 47 shows only one coil C, actually a plurality of the coils C is aligned in a row along the perimeter of the jig 20.

FIG. 48 shows the state where one side Ca of the coil C is inserted in the slot 12 by the above-described pulling devices 50. After one side Ca of the coil C is inserted in the slot 12 thus, the jig 20 is rotated by a prescribed angle and is positioned in such a way that the second holding groove 23b holding the other side Cb of the coil C can match a prescribed slot 12. In that state, by pulling out the other side Cb of the coil C to the outside radius side by the above-described pulling devices 50 again, the other side Cb of the coil C can be inserted in a corresponding slot 12 from the second holding groove 23b.

FIG. 49 shows the state where both sides Ca and Cb of the coil C are inserted in corresponding slots 12 thus. Although FIGS. 48 and 49 show only one coil C, actually a plurality of coils C are held by the jig 20 and the inserting operation of each coil C is simultaneously performed by a plurality of sets of pulling devices 50 arrayed in a radial shape.

Figure 50:
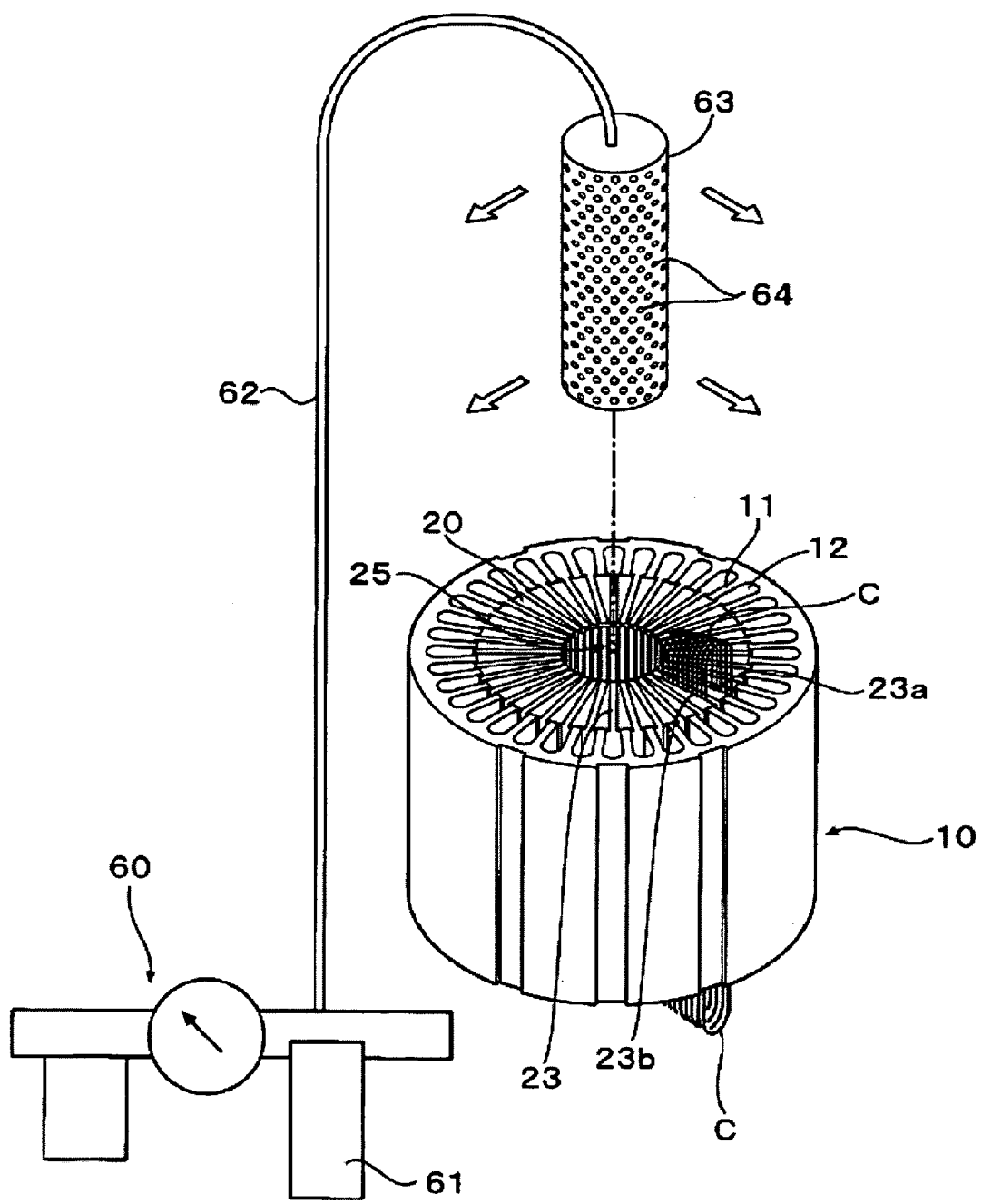
FIG. 50 shows another example of the pushing means in each of the above-described preferred embodiments.

FIG. 50 shows another example of the pushing means for the coil C.

In this example, an air compressor device 60 is used for the pushing means for the coil C. The air compressor device 60 comprises an air compressor 61 for sending compressed air, a tube 62 for supplying this air and a nozzle 63 mounted to the tip of this tube 62. The nozzle 63 forms a cylindrical shape and many jet holes 64 are formed on the perimeter surface. The jig 20 is provided a hole 25 at the center and the nozzle 63 is inserted in this hole 25. A slit-shaped opening which is connected through the hole 25 is formed at their inside radius side ends of the holding grooves 23 of the jig 20. Therefore, by disposing the nozzle 63 in the hole 25 of the jig 20 and supplying compressed air to the nozzle 63 through the tube 62 using the air compressor 61, the compressed air is blown out from the jet holes 64 of the nozzle 63, the compressed air is sent out from the opening on the inside radius side of the holding groove 23 of the jig 20 and the coil C held in the holding groove 23 is inserted in a prescribed slot 12. This air compressor device 60 can be also used together with each of the above-described pushing means.

FIGS. 51~55 show a manufacturing example of a stator according to another preferred embodiment of the present invention.

Figure 51:
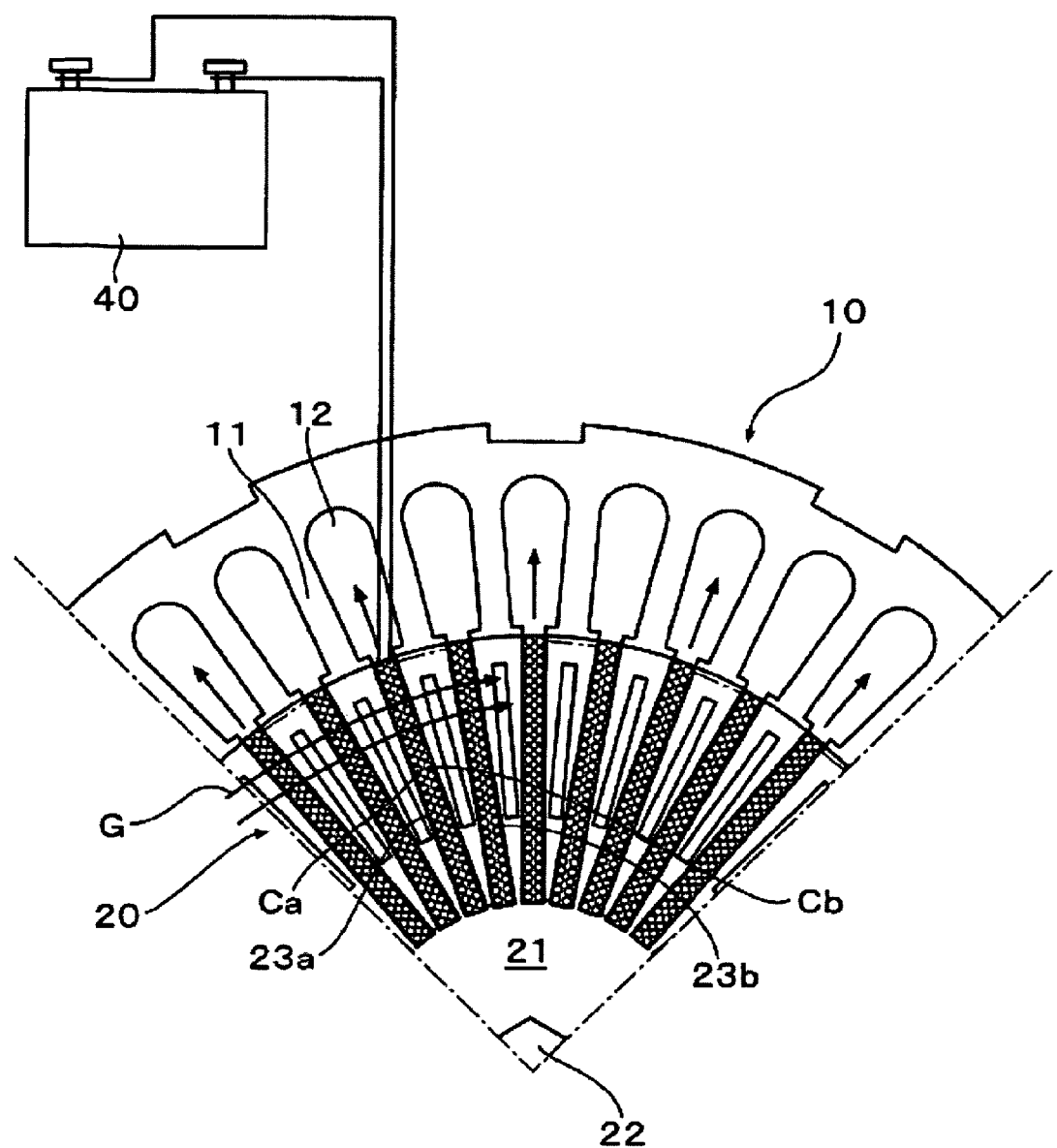
FIG. 51 is the partially enlarged top view of another preferred embodiment of the manufacturing method for manufacturing the stator according to the present invention.

In this example, the pushing means shown in FIGS. 43 and 44 is used. Specifically, as shown in FIG. 51, each permanent magnet M is laid and disposed in the radiant separator wall positioned between every two holding grooves 23 of the jig 20 and a magnetic field G crossing each holding groove 23 in the perimeter direction is formed by this permanent magnet M.

The same number of the holding grooves 23 of the jig 20 as the slots 12 of the stator core 10 are formed with equal pitch. Then, in this example, one side Ca and the other side Cb of the coil C are inserted in one holding groove 23 together. Specifically, one side Ca of the coil C is arrayed on one side of the holding groove 23 and the other side Cb of the coil C is arrayed on and inserted in the opposite side. Each end of the coil C is connected to the power supply 40 as described earlier.

When current is passed through the coil C by the power supply 40 in this state, Lorentz force is generated to act to generate force pushing to the outside radius side and force pushing to the inside radius side in one side and the other side, respectively, of the coil C to act. Then, in this example, one side Ca and the other side Cb are pushed to the outside and inside radius sides, respectively. As a result, as shown in FIG. 52, one side Ca of the coil C is inserted in the corresponding slot 12 of the stator core 10.

Figure 53:
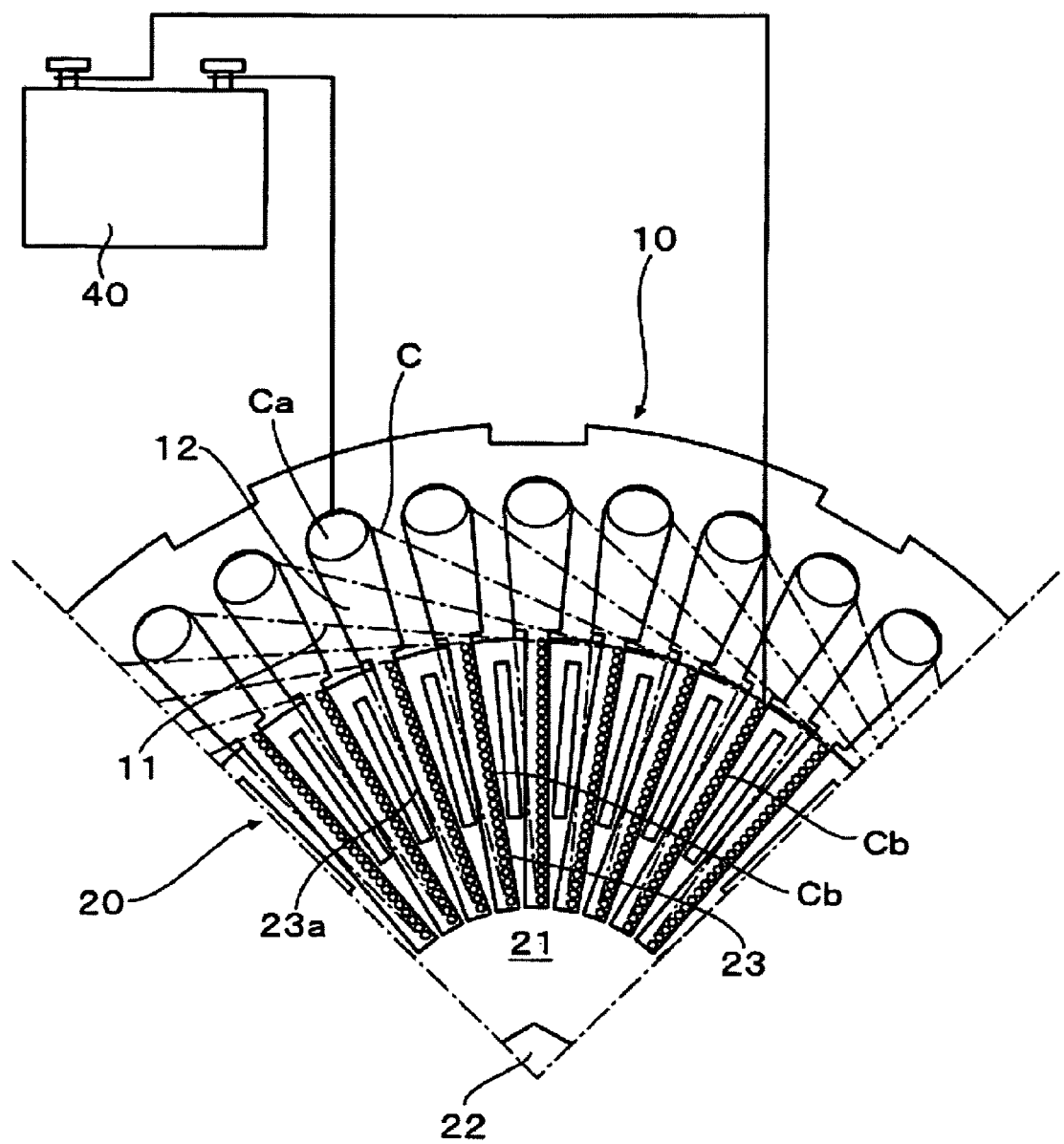
FIG. 53 is a partially enlarged top view showing a state where the holding groove holding the other side of the coil is rotated and positioned in such a way as to match a corresponding slot in the preferred embodiment.
Figure 54:
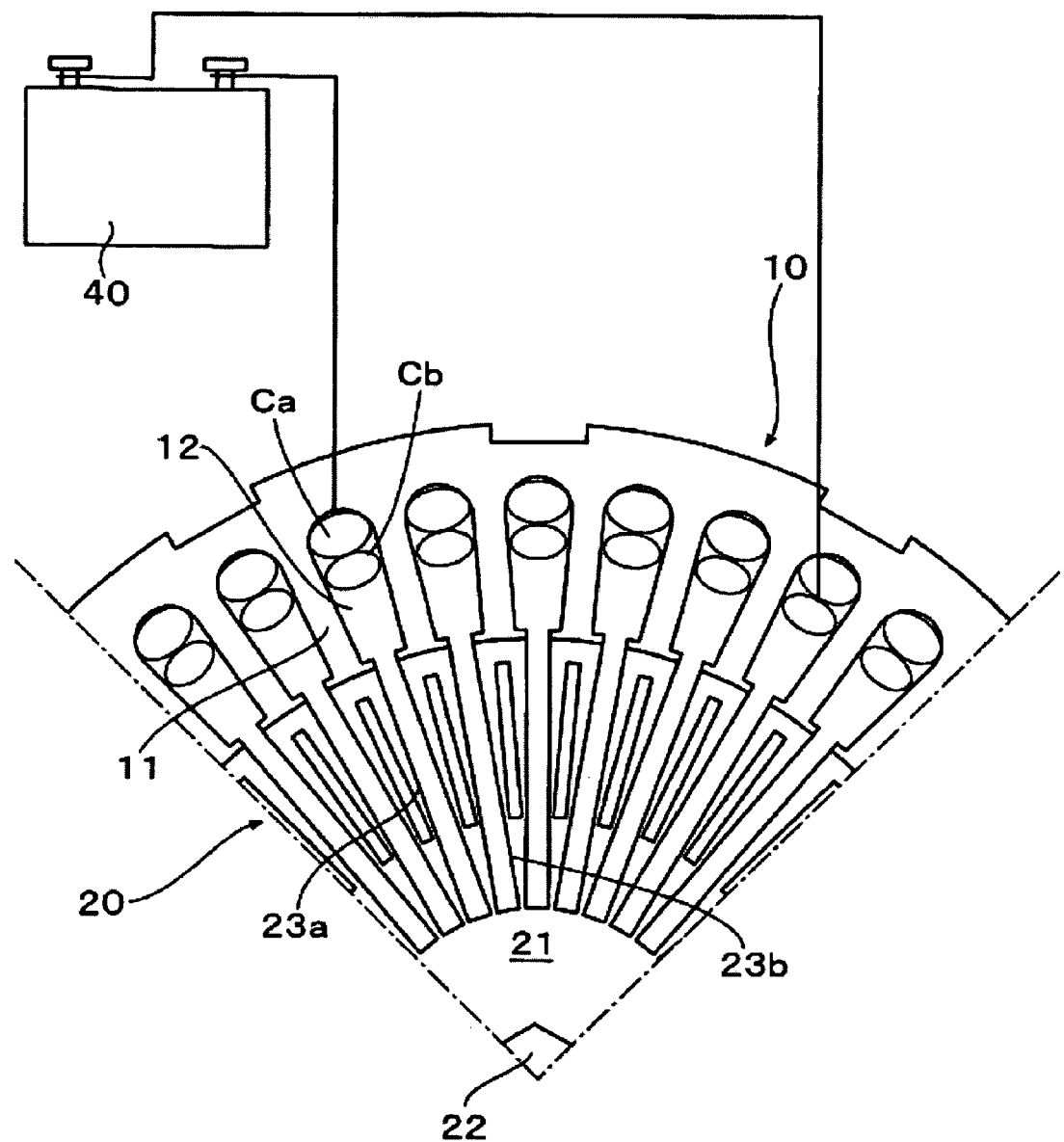
FIG. 54 shows a state where the other side of the coil is inserted in the corresponding holding groove in the preferred embodiment.

Then, as shown in FIG. 53, the jig 20 is rotated against the stator core 10 and in this example is positioned in such a way the holding groove 23 can be matched in the sixth slot ahead from one shown in FIG. 53. FIG. 54 shows this state. In the state shown in FIG. 54, when current is passed through the coil C in a direction the reverse of the above this time, force pushing to the outside radius side the reverse of the above is generated to act in the other side Cb of the coil C, which is left in the holding groove 23.

As a result, as shown in FIG. 54, the other side Cb of the coil C is inserted in the corresponding slot 12 of the stator core 10. Thus, one side Ca of one coil C and the other side Cb of another coil C are disposed and inserted in the outside and inside, respectively, in each slots. Since this insertion work is simultaneously applied to a plurality of coils C, the coils C are inserted in such a way that their coil ends can form a spiral when viewed from the end surface of the stator core 10.

Figure 55:
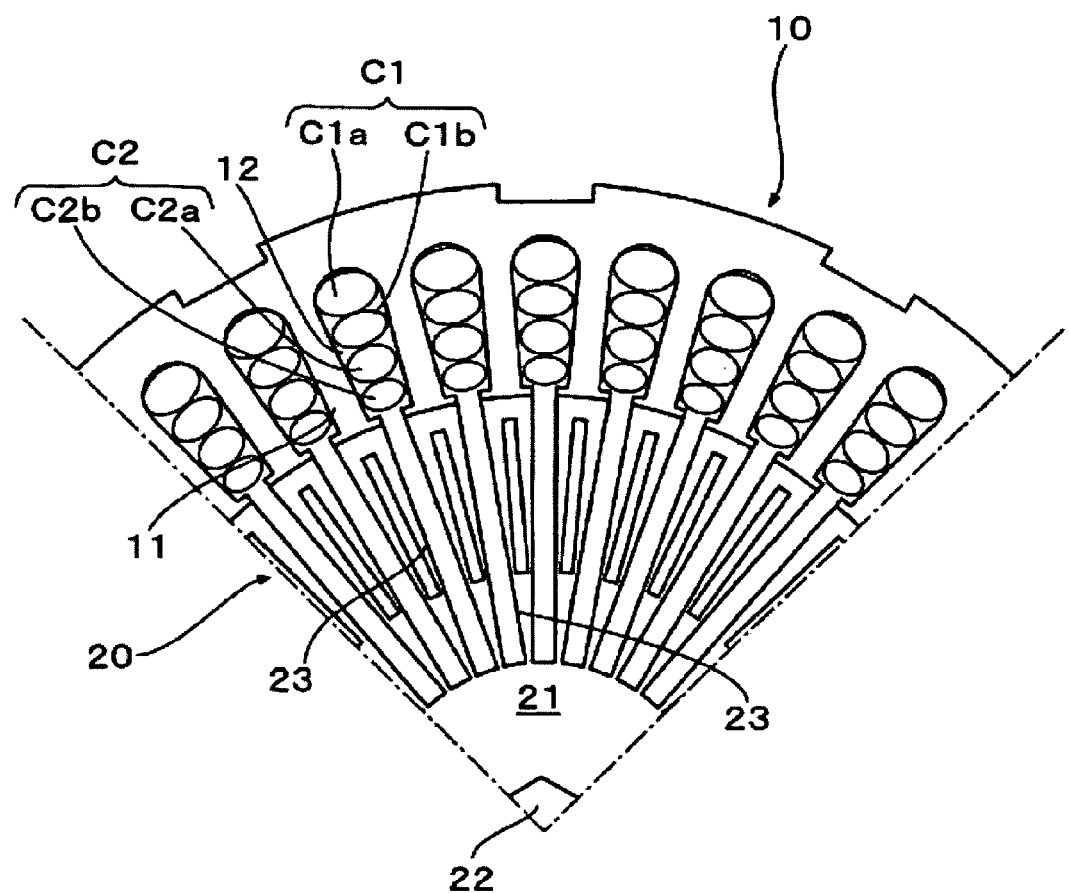
FIG. 55 shows a state where the inserting operation is repeated twice in the preferred embodiment.

Then, in this preferred embodiment, the above-described inserting operation is repeated twice. As a result, as shown in FIG. 55, one side C1a and the other side C1b of the coil C1 inserted in the first process are inserted in the outside radius side of the slot 12 and one side C2a and the other side C2b of the coil C2 inserted in the second process are inserted in the inside radius side of the slot 12. Specifically, one side C1a and the other side C1b of the coil C1 and one side C2a and the other side C2b of the coil C2 are overlapped outside and inside and inserted in each slot 12 of the stator core 10 and when viewed from the end surface of the stator core 10, a loop in which a plurality of coils C are overlapped in a spiral is doubly formed.

Figure 56:
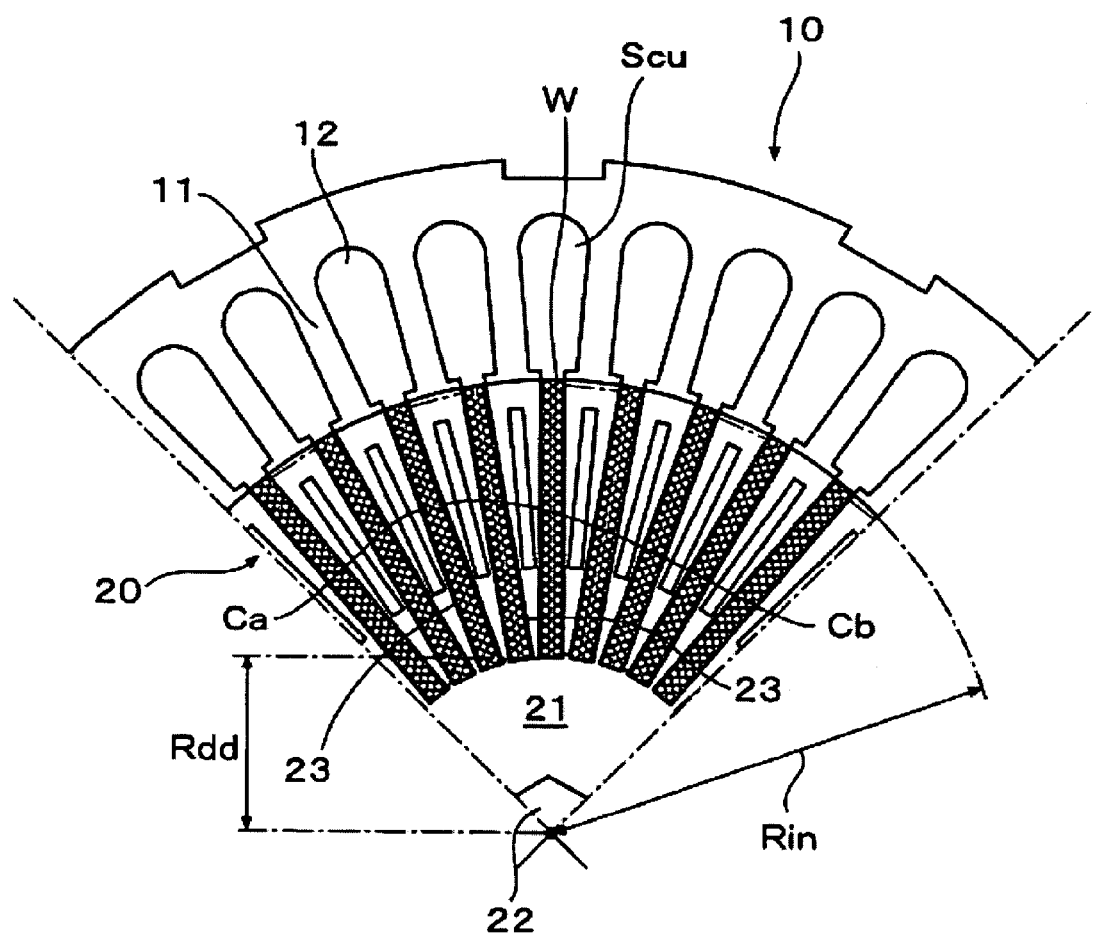
FIG. 56 shows a relationship between the holding groove of the jig and the slot of the stator core in the preferred embodiment.

If as to this stator, the total sectional area Scu of the coil wires W that can be inserted in the slot 12 is studied with reference to FIG. 56, the result is as follows. Specifically, as described earlier, if it is assumed that the coil wires W are aligned in two rows, specifically, each of one side of Ca and the other side Cb are aligned in a row in the holding groove 23 when the total coil sectional areas inserted in the slot 12 of the stator core 10, the inside radius of the stator core 10, the radius of the shaft unit 21, the number of slots and the diameter of the coil wire are Scu, Rin, Rdd, Slot and d, respectively, the total sectional area of the coil wires W in the case where the coil wire W in one row inserted in the holding groove 23 is inserted in the slot 12 becomes at most (Rin−Rdd)×d.

Since in this preferred embodiment, the coil wires W held in two rows are inserted in one slot 12 by one inserting operation (a series of inserting operations shown in FIGS. 51~54), the maximum total sectional area of the coil wires W that can be inserted in the slot 12 by one inserting operation becomes 2×(Rin−Rdd)×d.

However, since in this preferred embodiment a stator in which the coils C overlapped in a spiral are inserted in such a way as to form a multiple loop by repeating the above-described inserting operation twice is targeted, in the stator obtained in this preferred embodiment, the total sectional area of the coil wires W inserted in the slot 12 becomes at least larger than the total sectional area of the coil wires W calculated according to the above-described 2×(Rin−Rdd)×d. Since the perimeter of the shaft unit 21 can be falsely expressed by 2×d×Slot, the radius Rdd of the shaft unit 21 can be obtained by dividing this by $2\pi$, that is, according to d×Slot/$\pi$. Therefore, the stator obtained in this preferred embodiment is one which satisfies the following expression (4).

$$\text{Scu} > 2 \times (\text{Rin} - \text{Rdd}) \times d = 2 \times \{\text{Rin} - (d \times \text{Slot}/2\pi)\} \times d = 2 \cdot \text{Rin} \cdot d - \text{Slot} \cdot d^2/\pi \quad (4)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots 12 and the diameter of the coil wire, respectively.

FIGS. 57 and 58 show another preferred aspect for manufacturing a stator according to the present invention.

In this aspect, when one side Ca of the coil C is inserted in the slot 12 of the stator core 10, the jig 20 is rotated by a prescribed angle and the holding groove 23b holding the other side Cb is positioned in a prescribed slot 12, the coil ends projecting from the stator core 10 and both ends of the jig 20 are pressed in the shaft direction toward the jig 20 by a pair of a rotation auxiliary jig 70.

Specifically, as shown in FIG. 57, the rotation auxiliary jig 70 comprises a support shaft 71 to be inserted in the hole 22 of each end surface of the jig 20, a cylinder 72 mounted on this support shaft 71 in such a way as to be slid and a flange-shaped pressing plate 73 mounted at the jig 20 side end of this cylinder 72. By sliding the cylinder 72 and the pressing plate 73 along the support shaft 71 as shown by an arrow in FIG. 57, the coil ends are pressed in the shaft direction.

In FIG. 58, T represents the thickness the stator core 10 and the jig 20. FIG. 58A shows the state where the coil ends of the coil C are not pressed. In FIG. 58A the coil C forms a loop extending by length L1 in the shaft direction of the stator core 10 and the jig 20 and the coil ends project long. However, FIG. 58B shows the state where the coil ends of the coil C are pressed by the pressing plate 73 of the rotation auxiliary jig 70. In FIG. 58B the length L2 in the shaft direction of the coil C becomes short and the coil C is expanded in width as shown by an arrow in FIG. 58B.

As a result, when the jig 20 is rotated against the stator core 10 and the loop of the coil C is pushed wider, the coil C is expanded in width since the pressing plate 73 of the rotation auxiliary jig 70 presses the coil ends. In this case, since the coil C is expanded against its stiffness, force applied to the jig 20 can be reduced to prevent the separator wall of the holding grooves 23a and 23b of the jig 20 from deforming.

FIGS. 59~62 show a manufacturing example of a stator according to another preferred embodiment of the present invention. Although in FIGS. 59~62, the coil C is inserted only one holding groove 23 and a slot 12 corresponding to it to make simplify the description, actually the coil is inserted in all the holding grooves 23 and the slots 12.

In this preferred embodiment, half the number of the holding grooves 23 of that of the slots 12 of the stator core 10 are formed on the outer perimeter of the jig 20.

Figure 59:
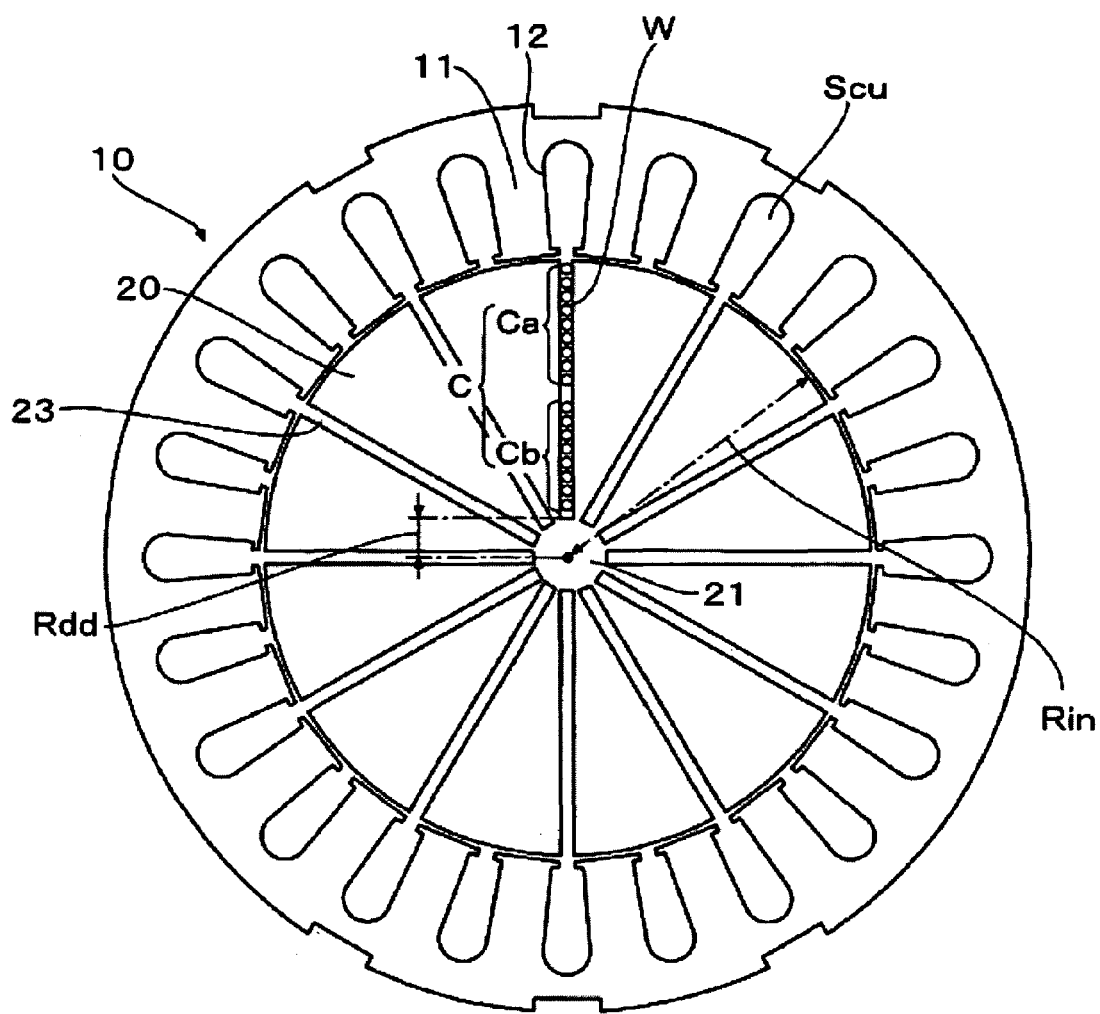
FIG. 59 shows a state where both sides of the coil are inserted in the holding grooves in the manufacturing example of the stator in another preferred embodiment of the present invention.

Then, as shown in FIG. 59, the coil wires W of the coil C are inserted in a row and also both sides Ca and Cb of the coil C are divided and inserted in the same holding groove 23 in the radius direction. Each holding groove 23 is disposed in relation to the slot 12 of the stator core 10.

Figure 60:
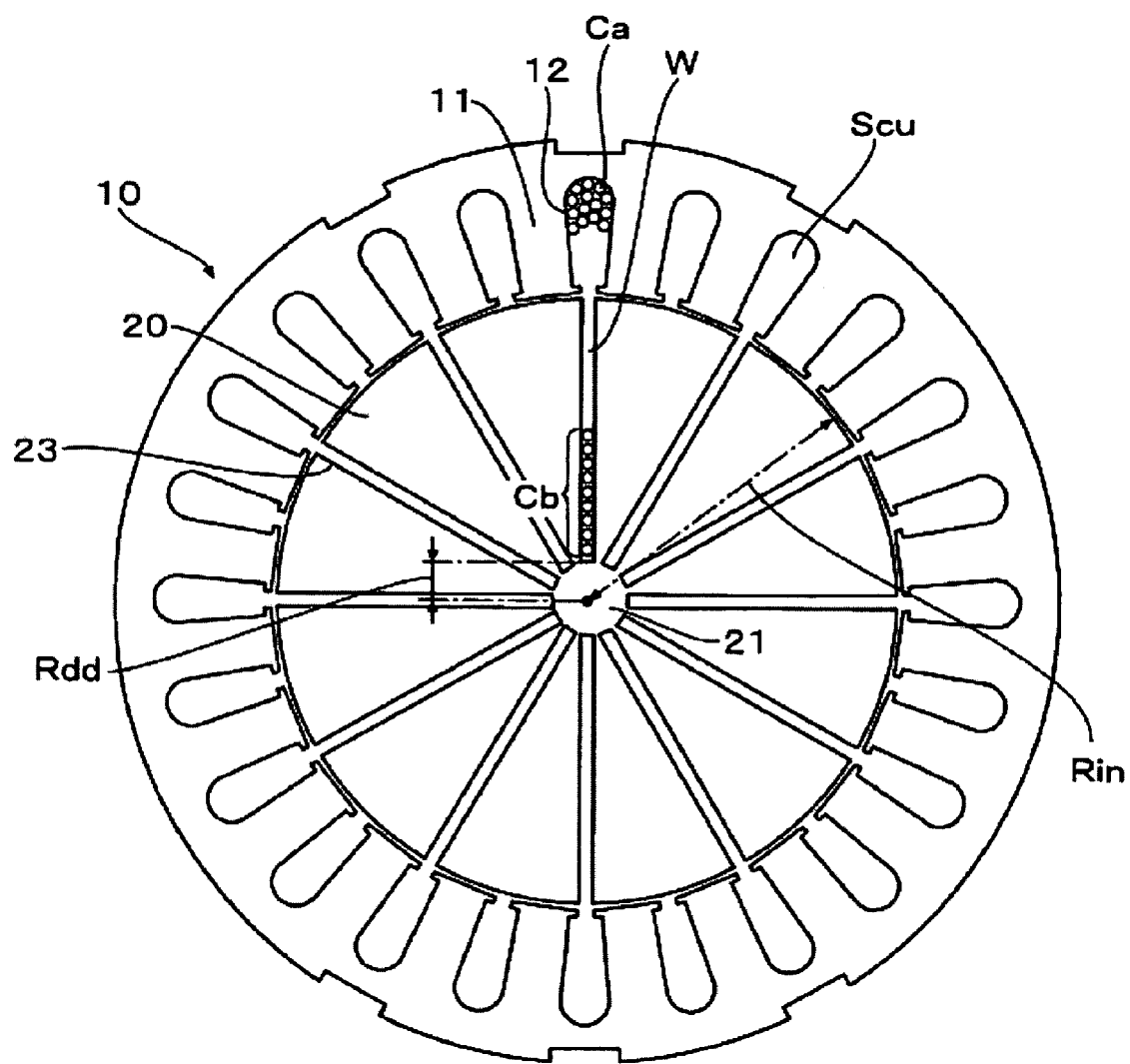
FIG. 60 shows a state where one side of the coil is inserted in a corresponding slot from the holding groove in the preferred embodiment.

In this state, as shown in FIG. 60, one side Ca of the coil positioned on the outside radius side is inserted in a corresponding slot 12 with the other side Cb of the coil held in the holding groove 23, by the pulling device 50 with the hook 52 shown in FIGS. 47~49, by the Lorentz force shown in FIGS. 51~55 and the like.

Then, as shown in FIG. 61, the jig 20 is rotated in a prescribed direction by a prescribed angle and is positioned in such a way that the other side Cb of the coil C held in the holding groove 23 can match a prescribed slot 12. In the case of this preferred embodiment, it is rotated in such a way that the holding grove 23 holding the other side Cb can match the sixth slot 12 ahead from one holding one side Ca.

Figure 62:
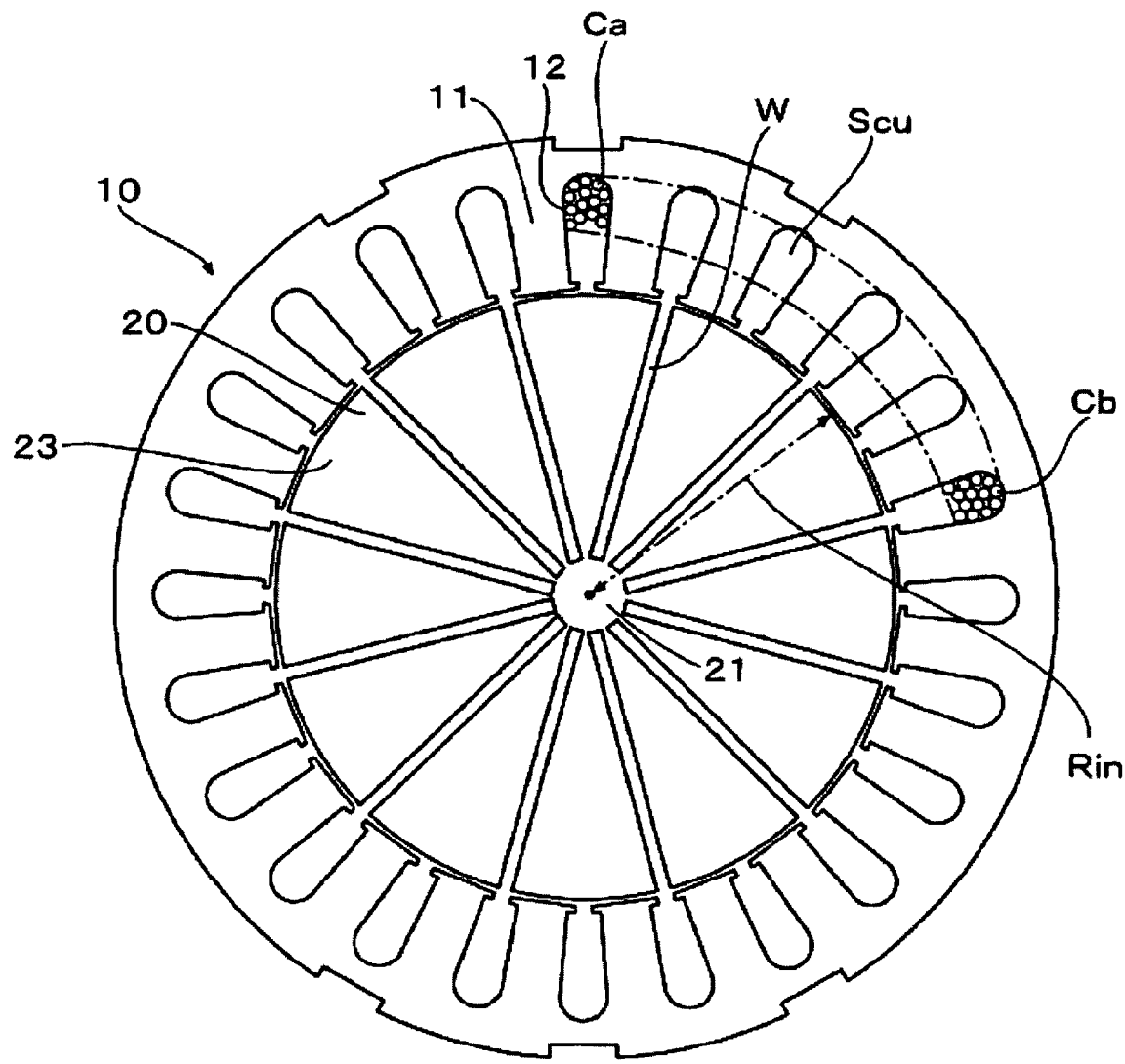
FIG. 62 shows a state where the other side of the coil remaining in the holding groove is inserted in a corresponding slot in the preferred embodiment.

Then, as shown in FIG. 62, the other side Cb of the coil left in the holding groove 23 is inserted in the slot 12. Thus, the coil C can be inserted in prescribed two slots 12.

Furthermore, by repeating the above-described inserting operation twice or more, finally two or more sides Ca or Cb of the coil C are inserted in each slot 12, which is omitted in FIG. 62. Thus, a stator core 10 in which the coils C overlapped in a spiral form a multiple loop can be obtained as shown in FIGS. 13 and 21.

In this preferred embodiment, the amount of the coil wires W that can be inserted in the slot 12 by one operation becomes half the amount of the coil wires W aligned in one holding groove 23 in a row. Therefore, the total sectional area of the coil wires W that can be inserted by one operation becomes (Rin−Rdd)×d/2. Then, since a stator core 10 inserted in such a way that the coils C overlapped in a spiral can form a multiple loop to form is targeted by repeating the above-described operation twice or more, the total sectional area of the coil wires W inserted in the slot 12 becomes larger than one calculated according to the above-described expression.

Since the perimeter of the shaft unit 21 can be falsely expressed by d×(Slot/2), the radius Rdd of the shaft unit 21 can be obtained by dividing this by $2\pi$, that is, according to d×Slot/$4\pi$. Therefore, the stator obtained in this preferred embodiment is one which satisfies the following expression (5).

$$Scu > (Rin-Rdd) \times d/2 = \{Rin-(d \times Slot/4\pi)\} \times d/2 = Rin \cdot d/2 - Slot \cdot d^2/8\pi \qquad (5)$$

Remarks) In the above-described expression, Scu, Rin, Rdd, Slot and d represent a total coil sectional area inserted in the slot 12 of the stator core 10, the inside radius of the stator core 10, the radius of the shaft unit 21, the number of slots 12 and the diameter of the coil wire, respectively.

In each of the above-described manufacturing examples, the coil C can be also held in the slot 12 by electro-magnetic attraction force. For example, by continuing to pass current through the coil C after one side Ca (C1a, C2a) is inserted, one side Ca (C1a, C2a) can be pushed to the stator core 10 being a magnetic material. However, in the case of pushing by Lorentz force, current must be passed in such a direction as to prevent the other side Cb (C1b, C2b) from being pushed out of the holding groove 23b. In the case of using an electro-magnet Em, current passed through the electro-magnet must be stopped to cancel the magnetic field G. Thus, one side Ca (C1a, C2a) can be held in the slot 12.

By continuing to pass current through the coil C after the other side Cb (C1b, C2b) is inserted, one side Ca (C1a, C2a) and the other side Cb (C1b, C2b) can be also held in the slot 12 surely.

By continuing to pass current through the coil C when rotating and positioning the jig 20 after one side Ca (c1a, C2a) is inserted, one side Ca (C1a, C2a) can be suppressed from coming out of the slot 12 by the rotary force of the jig 20 and also is suppressed from being pinched between the stator core 10 and the jig 20. In the case of pushing by Lorentz force, by passing current in such a direction as to prevent the other side Cb (C1b, C2b) from coming out of the holding groove 23b, the other side Cb (C1b, C2b) can be further surely held in the holding groove 23b. Thus, the other side Cb Cb (C1b, C2b) can be suppressed from coming out of the holding groove 23b by the rotary force of the jig 20 and can be suppressed from being pinched between the stator core 10 and the jig 20.

In this case, it is sufficient if current to be passed to generate the electro-magnetic attraction force is one whose repulsive force generated in the coil C due to eddy current is negligible. For example, it is sufficient to be alternate or direct current of 20 Hz or less.

Although in each of the above-described preferred embodiments, the other side Cb (C1b, C2b) is inserted in the sixth slot 12 ahead from one in which one side Ca (C1a, C2a) is inserted, it is not limited to the sixth slot ahead from it.

What is claimed is:

1. A stator in which coils are overlapped in a spiral when viewed from an end surface of a stator core after each of one sides of a plurality of coils wound in advance is inserted in a slot of a stator core and each of the other sides of the plurality of coils is inserted in a different slot, wherein, a loop of the coils overlapped in a spiral is piled in two layers or more in the radius direction of the stator core; when a sectional area of a groove for holding coils on a jig for inserting the coils in a slot of the stator core is set as a prescribed value, a total coil sectional area inserted in the slot of the stator core is larger than an integral multiple of the prescribed value; and the sectional area of the groove is determined on the basis of an inside radius of the stator core.

2. The stator according to claim 1, wherein if the total coil sectional area inserted in a slot of the stator core, an inside radius of the stator core, the number of slots and a diameter of a coil wire are Scu, Rin, Slot and d, the following expression (1) is satisfied:

$$Scu > Rin \cdot d - Slot \cdot d^2/4\pi. \quad (1)$$

3. The stator according to claim 1, wherein if the total coil sectional area inserted in a slot of the stator core, an inside radius of the stator core, the number of slots and a diameter of a coil wire are Scu, Rin, Slot and d, the following expression (2) is satisfied:

$$Scu > 2 \cdot Rin \cdot d - Slot \cdot d^2/\pi. \quad (2)$$

4. The stator according to claim 1, wherein if the total coil sectional area inserted in a slot of the stator core, an inside radius of the stator core, the number of slots and a diameter of a coil wire are Scu, Rin, Slot and d, the following expression (3) is satisfied:

$$Scu > Rin \cdot d - Slot \cdot d^2/2\pi. \quad (3)$$

5. The stator according to claim 1, wherein if the total coil sectional area inserted in a slot of the stator core, an inside radius of the stator core, the number of slots and a diameter of a coil wire are Scu, Rin, Slot and d, the following expression (4) is satisfied:

$$Scu > 2Rin \cdot d - 2 \cdot Slot \cdot d^2/\pi. \quad (4)$$

6. The stator according to claim 1, wherein if the total coil sectional area inserted in a slot of the stator core, an inside radius of the stator core, the number of slots and a diameter of a coil wire are Scu, Rin, Slot and d, the following expression (5) is satisfied:

$$Scu > Rin \cdot d/2 - Slot \cdot d^2/8\pi. \quad (5)$$

7. The stator according to one of claims 1~6, wherein an one-layer loop of the coils overlapped in a spiral forms a loop in which one of one side of each coil constituting the one-layer loop is inserted in each slot.

* * * * *